US008249925B2

(12) United States Patent
Broms et al.

(10) Patent No.: US 8,249,925 B2
(45) Date of Patent: Aug. 21, 2012

(54) METHODS, SYSTEMS, AND COMPUTER PROGRAM PRODUCTS FOR MANAGING ORGANIZED BINARY ADVERTISING ASSET MARKETS

(75) Inventors: Todd J. Broms, New York, NY (US); Amihai Ulman, Brooklyn, NY (US)

(73) Assignee: Managed Audience Share Solutions LLC, Brooklyn, NY (US)

( * ) Notice: Subject to any disclaimer, the term of this patent is extended or adjusted under 35 U.S.C. 154(b) by 0 days.

(21) Appl. No.: 13/281,020

(22) Filed: Oct. 25, 2011

(65) Prior Publication Data

US 2012/0041835 A1    Feb. 16, 2012

Related U.S. Application Data

(63) Continuation of application No. 13/162,179, filed on Jun. 16, 2011.

(60) Provisional application No. 61/398,259, filed on Jun. 23, 2010.

(51) Int. Cl.
*G06Q 30/00* (2012.01)
(52) U.S. Cl. .................. 705/14.1; 705/37; 705/36 R
(58) Field of Classification Search ........ 705/26.1–27.2, 705/37, 36 R, 14
See application file for complete search history.

(56) References Cited

U.S. PATENT DOCUMENTS

| | | | |
|---|---|---|---|
| 4,903,201 A | 2/1990 | Wagner | |
| 5,128,752 A | 7/1992 | Von Kohorn | |
| 5,227,874 A | 7/1993 | Von Kohorn | |
| 5,249,044 A | 9/1993 | Von Kohorn | |
| 5,855,008 A | 12/1998 | Goldhaber et al. | |
| 5,950,176 A | 9/1999 | Keiser et al. | |
| 5,960,411 A | 9/1999 | Hartman et al. | |
| 6,421,653 B1 * | 7/2002 | May | 705/36 R |
| 6,505,174 B1 | 1/2003 | Keiser et al. | |
| 6,567,850 B1 | 5/2003 | Freishtat et al. | |
| 6,766,524 B1 | 7/2004 | Matheny et al. | |

(Continued)

FOREIGN PATENT DOCUMENTS

WO    WO 02/082295 A1    10/2002

(Continued)

OTHER PUBLICATIONS

"2010 Display Advertising Study," 20 pages, Collective: The Audience Engine, United States (2010).

(Continued)

*Primary Examiner* — John Weiss
*Assistant Examiner* — Bennett Sigmond
(74) *Attorney, Agent, or Firm* — Sterne, Kessler, Goldstein & Fox PLLC

(57) ABSTRACT

Binary advertising markets are developed where personalized media such as digital and even analog advertising is delivered to and accessed by audience members enabling advertisers to buy advertising for broadcast to televisions, smartphones and other types of digital devices. The market is designed to provide participants a new way to have their orders entered, matched, executed, and settled, to manage and monitor risk characteristics of their content placement or advertising placement transactions, and any rights and positions that result from those transactions. Standardized units of exchange represented by profile access rights and display space access rights appropriately designed for their respective markets are used in both primary direct and secondary alternative markets. Processes are also implemented where an audience member receives economic benefit in exchange for confirming view of or rating an advertisement, or viewing advertisements while logged in.

22 Claims, 31 Drawing Sheets

U.S. PATENT DOCUMENTS

| | | | |
|---|---|---|---|
| 6,871,220 | B1 | 3/2005 | Rajan et al. |
| 7,006,991 | B2 | 2/2006 | Keiser et al. |
| 7,016,875 | B1 | 3/2006 | Steele et al. |
| 7,181,412 | B1 | 2/2007 | Fulgoni et al. |
| 7,260,837 | B2 | 8/2007 | Abraham et al. |
| 7,266,835 | B2 | 9/2007 | Halbert |
| 7,272,657 | B2 | 9/2007 | Allen et al. |
| 7,493,655 | B2 | 2/2009 | Brown |
| 7,606,752 | B2 | 10/2009 | Hazlehurst et al. |
| 7,729,940 | B2 | 6/2010 | Harvey et al. |
| 7,747,515 | B1 | 6/2010 | Merrin et al. |
| 7,840,975 | B2 | 11/2010 | Matheny et al. |
| 7,856,378 | B2 * | 12/2010 | Mashinsky et al. .......... 705/14.4 |
| 7,856,386 | B2 | 12/2010 | Hazlehurst et al. |
| 7,886,067 | B2 | 2/2011 | Krassner et al. |
| 7,962,363 | B2 * | 6/2011 | Patel et al. ................... 705/14.4 |
| 8,027,864 | B2 | 9/2011 | Gilbert |
| 8,027,865 | B2 | 9/2011 | Gilbert |
| 8,032,405 | B2 | 10/2011 | Gilbert |
| 2002/0013757 | A1 * | 1/2002 | Bykowsky et al. ............. 705/37 |
| 2002/0116313 | A1 * | 8/2002 | Detering ........................ 705/37 |
| 2003/0023483 | A1 | 1/2003 | Messner et al. |
| 2003/0171980 | A1 | 9/2003 | Keiser et al. |
| 2004/0049447 | A1 | 3/2004 | Keiser et al. |
| 2004/0220858 | A1 | 11/2004 | Maggio |
| 2005/0060232 | A1 | 3/2005 | Maggio |
| 2006/0129458 | A1 | 6/2006 | Maggio |
| 2006/0143110 | A1 | 6/2006 | Keiser et al. |
| 2006/0242016 | A1 | 10/2006 | Chenard et al. |
| 2006/0253330 | A1 | 11/2006 | Maggio |
| 2006/0271426 | A1 * | 11/2006 | Borgs et al. ..................... 705/14 |
| 2006/0282319 | A1 | 12/2006 | Maggio |
| 2007/0038516 | A1 * | 2/2007 | Apple et al. .................... 705/14 |
| 2007/0083885 | A1 * | 4/2007 | Harding ........................ 725/34 |
| 2007/0130005 | A1 | 6/2007 | Jaschke |
| 2007/0185794 | A1 | 8/2007 | Keiser et al. |
| 2007/0198350 | A1 | 8/2007 | O'Kelley et al. |
| 2007/0214045 | A1 * | 9/2007 | Subramanian et al. ......... 705/14 |
| 2007/0233857 | A1 | 10/2007 | Cheng et al. |
| 2007/0282733 | A1 * | 12/2007 | May ............................... 705/37 |
| 2007/0283268 | A1 | 12/2007 | Berger et al. |
| 2007/0288953 | A1 | 12/2007 | Sheeman et al. |
| 2008/0082355 | A1 | 4/2008 | Leach et al. |
| 2008/0097825 | A1 | 4/2008 | Leach et al. |
| 2008/0103903 | A1 * | 5/2008 | Flake et al. ..................... 705/14 |
| 2008/0109304 | A1 | 5/2008 | Sarelson et al. |
| 2008/0109321 | A1 | 5/2008 | Leach et al. |
| 2008/0154784 | A1 | 6/2008 | Veeraraghavan |
| 2008/0306846 | A1 | 12/2008 | Ferguson |
| 2009/0037325 | A1 | 2/2009 | Sarelson et al. |
| 2009/0055268 | A1 | 2/2009 | Knoller et al. |
| 2009/0076899 | A1 * | 3/2009 | Gbodimowo ................... 705/14 |
| 2009/0106100 | A1 * | 4/2009 | Mashinsky ...................... 705/14 |
| 2009/0119172 | A1 * | 5/2009 | Soloff ............................. 705/14 |
| 2009/0234737 | A1 | 9/2009 | Sarelson et al. |
| 2009/0248565 | A1 | 10/2009 | Chuang |
| 2009/0259551 | A1 | 10/2009 | Chenard et al. |
| 2009/0259552 | A1 | 10/2009 | Chenard et al. |
| 2009/0319372 | A1 * | 12/2009 | Makeev ..................... 705/14.55 |
| 2009/0327153 | A1 * | 12/2009 | Milne .......................... 705/36 R |
| 2010/0030683 | A1 | 2/2010 | Keiser et al. |
| 2010/0058376 | A1 | 3/2010 | Alhadeff et al. |
| 2010/0100440 | A1 | 4/2010 | Nickelson, III et al. |
| 2010/0228642 | A1 * | 9/2010 | Baker et al. ..................... 705/26 |
| 2010/0250363 | A1 * | 9/2010 | Magdon-Ismail et al. . 705/14.43 |
| 2010/0287103 | A1 | 11/2010 | Mason |
| 2010/0293046 | A1 | 11/2010 | Cooke et al. |
| 2010/0293047 | A1 | 11/2010 | Schwarz et al. |
| 2010/0293063 | A1 | 11/2010 | Atherton et al. |
| 2011/0035266 | A1 | 2/2011 | Patterson |
| 2011/0035278 | A1 | 2/2011 | Fordyce, III et al. |
| 2011/0035280 | A1 | 2/2011 | Fordyce, III et al. |
| 2011/0035288 | A1 | 2/2011 | Clyne |
| 2011/0040632 | A1 | 2/2011 | Margasahayam et al. |
| 2011/0055067 | A1 * | 3/2011 | Milne et al. ..................... 705/37 |
| 2011/0067045 | A1 | 3/2011 | Matheny et al. |
| 2011/0087519 | A1 | 4/2011 | Fordyce, III et al. |
| 2011/0087546 | A1 | 4/2011 | Fordyce, III et al. |
| 2011/0087547 | A1 | 4/2011 | Fordyce, III et al. |
| 2011/0087550 | A1 | 4/2011 | Fordyce, III et al. |
| 2011/0093324 | A1 | 4/2011 | Fordyce, III et al. |
| 2011/0093327 | A1 | 4/2011 | Fordyce, III et al. |
| 2011/0093335 | A1 | 4/2011 | Fordyce, III et al. |
| 2011/0099074 | A1 | 4/2011 | Oak |
| 2011/0125565 | A1 | 5/2011 | MacIlwaine et al. |
| 2011/0231223 | A1 | 9/2011 | Winters |
| 2011/0231225 | A1 | 9/2011 | Winters |
| 2011/0231257 | A1 | 9/2011 | Winters |
| 2011/0231258 | A1 | 9/2011 | Winters |
| 2011/0231305 | A1 | 9/2011 | Winters |

FOREIGN PATENT DOCUMENTS

| | | |
|---|---|---|
| WO | WO 2010/102104 A2 | 9/2010 |

OTHER PUBLICATIONS

"Audience Targeting Platforms: The Missing Piece in the Online Ecosystem," 16 pages, AudienceScience, Inc., United States (2010).

"Audience Targeting: State of the Industry Study What's Happening Now and What's Next," 15 pages, AudienceScience, Inc., United States (2010).

"BrightRoll Video Advertising Report," 9 pages, *BrightRoll, Inc.* (BrightRoll.com), United States (Q1: 2010).

"BSYM—Identifiers Advance Cause of Open, Automated Securities Trading—Bloomberg Open Symbology Introduces New Operational Efficiencies and Cost Reductions for the Trading Community," 9 pages, Bloomberg Finance LP (2010).

"Building Brands Online: An Interactive Advertising Action Plan," 30 pages, Bain & Company/ AudienceScience/ The Interactive Advertising Bureau (IAB), United States (Apr. 2010).

"Communications & Media—Networked Advertising Growing revenue in a highly fragmented business," 36 pages, KPMG LLC, United States (2010).

"Data Usage & Control Primer: best practices & definitions," 19 pages, The Interactive Advertising Bureau (IAB), United States (May 2010).

"Getting Real—Ad Exchanges, RTB, and the future of online advertising," 19 pages, *DeSilva + Phillips, LLC*, United States (Mar. 2010).

"IAB Internet Advertising Revenue Report—An Industry Survey Conducted by PwC and Sponsored by the Interactive Advertising Bureau (IAB)," 25 pages, *The Interactive Advertising Bureau (IAB)/ PricewaterhouseCoopers LLP*., United States (2010 First Half-Year Results).

"MasterCard's Talks with Madison Avenue," *The Wall Street Journal*, 2 pages, WSJ.com, Dow Jones & Company, Inc., United States (Oct. 2011).

"Pattern of communications and the demand for connectivity," 55 pages, Ericsson Internal, Ericsson, United States/Sweden (Sep. 2009).

"Tapestry Segmentation—Reference Guide," 96 pages, accessed at <www.esri.com/tapestry>, ESRI, United States (2009).

"The Case for a Dedicated Online Ad Management Platform—How Technology Can Help Interactive Marketers Better Integrate Search and Display Media," A Forrester Consulting Thought Leadership Paper Commissioned By Efficient Frontier, 15 pages, *Forrester Research, Inc.*, United States (Dec. 2010).

"Typical online display media order process," 1 page, NextMark, Inc. (2011).

"Visa's Blueprint for Targeted Advertising," *The Wall Street Journal*, 3 pages, WSJ.com, Dow Jones & Company, Inc., United States (Oct. 24, 2011).

Bahadur, N., et al., "Not Just Effective but Efficient: A New Blueprint for Marketing in an era of fragmented media," 7 pages, Booz Allen Hamilton Inc., United States (2007).

Ben, "How Real Time bidding, DSPs, SSPs, and Ad Exchanges Work," 3 pages, accessed at <http://www.adopsinsider.com/ad-serving/how-dsps-ssps-and-ad-exchanges-work/>, AdOpsInsider.com United States (Dec. 2010).

Berman, S.J., et al., "The end of advertising as we know it," 28 pages, IBM Global Business Services, IBM Institute for Business Value, IBM Corporation, United States (2007).

Cooperstein, D.M., "The Future of Media Measurement for Marketing Leadership Professionals—Preparing for a Convergence of Measurement Across Channels," 16 pages, Forrester Research, Inc., United States (Jan. 2010).

Frelinghuysen, J. and Joshi, A., "In Search of a premium alternative: an action plan for online brand advertising," 16 pages, Bain & Company, Inc., United States (2010).

Gluck, M. and Sales, M.R., "The Future of Television? Advertising, technology and the pursuit of audiences," 160 pages, Annenberg School for Communication, University of Southern California, Norman Lear Center, USC Annenberg, The Norman Lear Center, United States (Sep. 2008).

Hansen, C., "Mapping Digital Display Landscape: A Fundamental Guide to Data, Targeting & the Future of Display," 74 pages, accessed at <http://www.netmining.com/>, Netmining LLC, United States (2011).

Ito, M., et al., "Living and Learning with New Media: Summary of Findings from the Digital Youth Project," *The John D. and Catherine T. MacArthur Foundation Reports on Digital Media and Learning*, 58 pages, The MIT Press, United States (Nov. 2008).

Montes, E., "The First Rule of Advertising Exchanges—There are No Advertising Exchanges," *ClickZ*, accessed at <clickz.com/clilckz/.../rule-advertising-exchanges-advertising-exchanges>, ClickZ Media, United States (Oct. 2011).

Ratliff, L., "IPTV Market Tracker—Telco TV on Track to Reach 105 Million Subcribers in Five Years," 2 pages, iSuppli Corporation, United States (2009).

Simpson, P., "Advertising in a changing media landscape: The role of consumers as players in the game of advertising," University of California at Berkley, Haas School of Business, 37 pages, Deloitte Development LLC, United States (Mar. 2010).

Steel, E., "Using Credit Cards to Target Web Ads," *The Wall Street Journal*, 3 pages, WSJ.com, Dow Jones & Company, Inc., United States (Oct. 2011).

Vanboskirk, S., "US Interactive Marketing Forecasts, 2009 to 2014 for Interactive Marketing Professionals" 22 pages, Forrester Research, Inc., United States (Jul. 2009).

Velez, R., "Big Data—How New Technology is Helping Marketers Create Better Consumer Experiences," 3 pages, accessed at <http://mashable.com/2011/05/02/big-data-marketing/>, Mashable, Inc., United States (May 2011).

Wasserman, T., "Facebook Now pays Users 10 Cents to Watch Certain Ads," 8 pages, accessed at <http://mashable.com/2011/05/06/facebookfacebook-10-cents-ads/>, Mashable, Inc., United States (May 2011).

International Search Report and Written Opinion of the International Searching Authority for International Application No. PCT/US2011/040746, Korean Intellectual Property Office, Republic of Korea, mailed on Feb. 21, 2012.

* cited by examiner

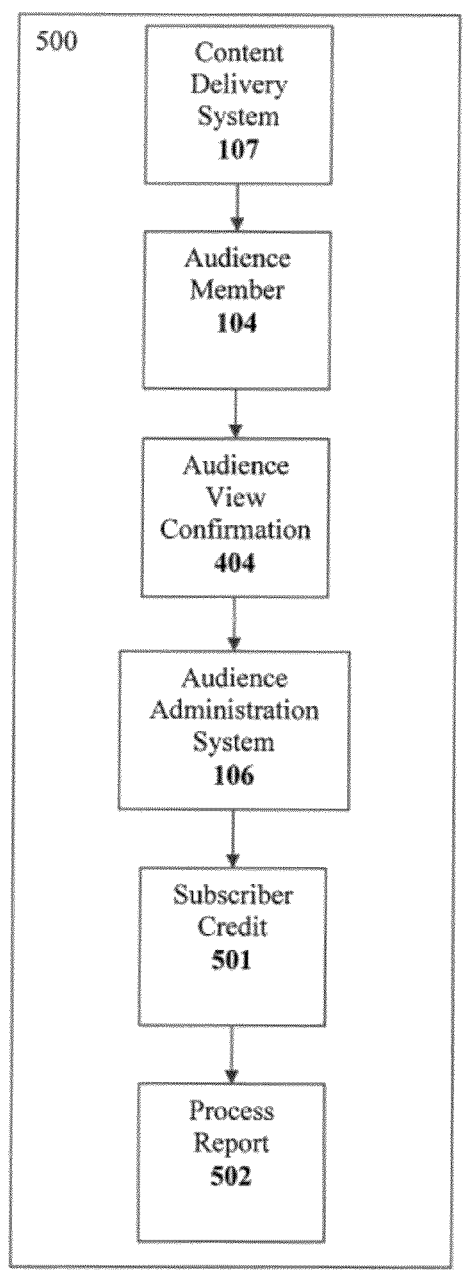

Personal Information

| | | |
|---|---|---|
| First Name | | ←—607 |
| Middle Name | | ←—608 |
| Last Name | | ←—609 |
| Address | | ←—610 |
| Social Security Number | | ←—611 |

Contact Information

612 → Email
613 → Confirm Email

Device Registration

614 → Television(s) [0 ▽]
615 → Computer(s) [0 ▽]
616 → Cell phone(s) [0 ▽]
617 → Other(s) [0 ▽]

618 ↘
Password
Confirm Password

619 ↗ [Submit]

6C

Personal Information

| | |
|---|---|
| First Name | John |
| Middle Name | M |
| Last Name | Smith |
| Address | 1776 Main Street |
| Social Security Number | 999-99-9999 |

Contact Information

| | |
|---|---|
| Email | John.smith@email.com |
| Confirm Email | John.smith@email.com |

Device Registration

Television(s) [1 ▽]
Computer(s) [2 ▽]
Cell phone(s) [1 ▽]
Other(s) [1 ▽]

Password **********
Confirm Password **********

[Submit]

Account Information

Company Name

EIN/Social Security Number

Contact Information

Name

Email

Confirm Email

Bank Account

Routing Number

Account Number

Submit

7C

Account Information

Company Name: Hyatt Hotels Corporation.

EIN/Social Security Number: 01-23456789

Contact Information

Name: John Smith

Email: J.Smith@Hyatt.com

Confirm Email: J.Smith@Hyatt.com

Bank Account

Routing Number: 111882102

Account Number: 01234567

Submit

| | | |
|---|---|---|
| Account | [ ▽ ] ← 1503 | |
| Total Account | $0.00 ← 1505 | |
| Cash Available | $0.00 ← 1507 | |
| Cash Used | $00.00 ← 1509 | |
| Symbol | [ ] ←1511 | |
| Action | [ ▽ ] ←1513 | |
| Quantity | [ ] ←1515 | |
| Price | [ 0.50 ] ←1517 | |
| | [ Place Order ] ← 1523 | |

15B

| | | |
|---|---|---|
| Account | [ Account 1 ▽ ] | |
| Total Account | $999.99 | Account 1 |
| Cash Available to | $99.99 | Account 2 |
| Cash Used | $900.00  1503B | Account N |
| Symbol | [ M3540.US.R ] | 1513B |
| Action | [ Buy at or below ▽ ] | Buy at or below |
| Quantity | [ 1000 ] | Sell at or above |
| Price | [ 0.50 ] | Sell all shares |
| | [ Place Order ] | |

Demographic
- Ethnicity: [          ]
- Income: [          ]
- Gender: [          ]  [Add Profile Screening Criteria]

Geographic
- Country: [          ]
- City: [          ]  [Add Profile Screening Criteria]

Psychographic
- Lifestyle: [          ]
- Purchase motives: [          ]  [Add Profile Screening Criteria]  [Submit]

17B

Demographic
- Ethnicity: Latino
- Income: $20,000-$30,000
- Gender: Male  [Add Profile Screening Criteria]

Geographic
- Country: US
- City: Houston  [Add Profile Screening Criteria]

Psychographic
- Lifestyle: Frugal
- Purchase motives: Value  [Add Profile Screening Criteria]  [Submit]

FIG. 20
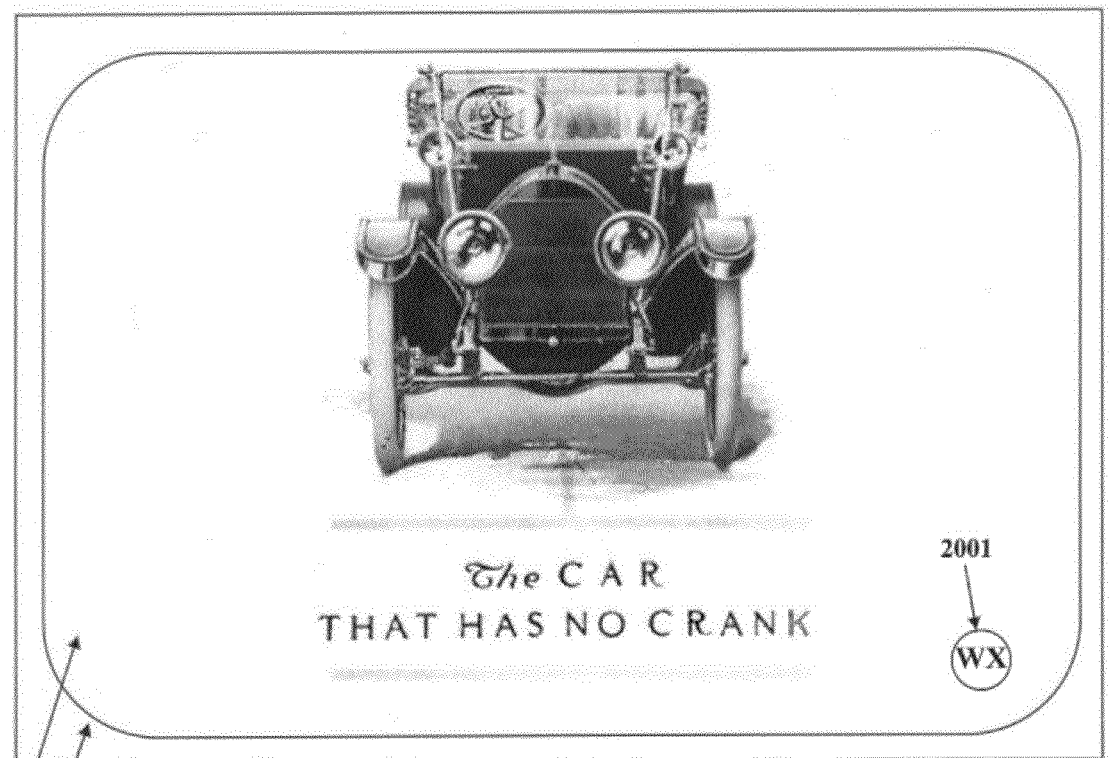
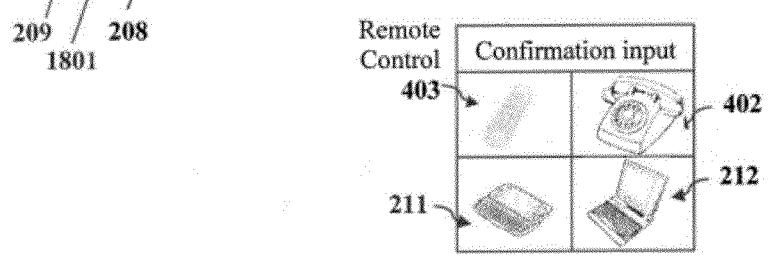

METHODS, SYSTEMS, AND COMPUTER PROGRAM PRODUCTS FOR MANAGING ORGANIZED BINARY ADVERTISING ASSET MARKETS

CROSS-REFERENCE TO RELATED APPLICATIONS

This application is a continuation of U.S. patent application Ser. No. 13/162,179, entitled "Methods, Systems, and Computer Program Products for Managing Organized Binary Advertising Asset Markets," filed Jun. 16, 2011, which in turn claims the benefit of U.S. Provisional Application No. 61/398,259, filed Jun. 23, 2010, all of which are incorporated by reference herein in their entireties.

BACKGROUND OF INVENTION

1. Field of Invention

The present invention relates to advertising, and, more particularly, to a marketplace of profile access rights and display space access rights.

2. Description of the Background Art

While advertising has changed significantly from the early days of newspapers, radio, television, and now online using the Internet, advertisers continue to have the need to track true cost efficiency, viewership, and conversion yield. Advertisers seek a universal measurement of their audience. Proof of performance is still desired by many who want confirmation that the audience has viewed or taken action on the advertising and, in the case of online ads, click-through rates are accurate. For example, print media uses tearsheets to prove advertisements have been run. Today, people interact with computer networks using many different types of technology and devices such as personal computers, smartphones, net books, tablet computers, on which large amounts of different types of content are displayed, yet the Internet has no industry-wide practice for proof of performance. Advertisers seek a way to reach target audiences independent of the media within which the advertisements or content is embedded and in a manner personalized to people of interest based upon their demographic and other characteristics. Individuals using their devices and analog processes access large amounts of advertising where market participants conduct commerce without direct compensation to the audience. In view of the above and the disclosed embodiments, systems and methods are necessary to solve these problems.

SUMMARY OF INVENTION

Embodiments of the invention include a method comprising receiving, by a computing device, an order to buy or sell at least one of a profile access right contract or a display space access right contract, wherein said profile access right contract and said display space access right contract are managed as separate assets, and fulfilling the order.

Additional embodiments of the invention include a method comprising placing, by a computing device, an order to buy or sell at least one of a profile access right contract or a display space access right contract, wherein said profile access right contract and said display space access right contract are managed as separate assets, and receiving a notification that the order has been fulfilled.

Additional embodiments of the invention include a computer-readable storage device having instructions stored thereon that, when executed by one or more computing devices, causes the one or more computing devices to perform operations comprising receiving an order to buy or sell at least one of a profile access right contract or a display space access right contract, wherein said profile access right contract and said display space access right contract are managed as separate assets, and fulfilling the order.

Additional embodiments of the invention include a computer-readable storage device having instructions stored thereon that, when executed by one or more computing devices, causes the one or more computing devices to perform operations comprising placing an order to buy or sell at least one of a profile access right contract or a display space access right contract, wherein said profile access right contract and said display space access right contract are managed as separate assets, and receiving a notification that the order has been fulfilled.

Additional embodiments of the invention include a system comprising a memory configured to store modules comprising a receiving module configured to receive an order to buy or sell at least one of a profile access right contract or a display space access right contract, wherein said profile access right contract and said display space access right contract are managed as separate assets, and a fulfilling module configured to fulfill the order, and one or more processors configured to process the modules.

Additional embodiments of the invention include a system comprising a memory configured to store modules comprising a placing module configured to place an order to buy or sell at least one of a profile access right contract or a display space access right contract, wherein said profile access right contract and said display space access right contract are managed as separate assets, and a receiving module configured to receive a notification that the order has been fulfilled, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate one or more embodiments and, together with the description, further serve to explain the principles of the invention and to enable a person skilled in the pertinent art to make and use the invention.

FIG. 5 is an overhead view of steps of a process flow for payment to audience in exchange for confirmed view, in accordance with an embodiment of the present invention.

FIGS. 6B and 6C depict features of an exemplary audience member subscription user interface, in accordance with an embodiment of the present invention.

FIGS. 7B and 7C depict features of an exemplary user interface for market participant account set up, in accordance with an embodiment of the present invention.

FIGS. 15A and 15B depict features of an exemplary profile matching user interface using matching symbols, in accordance with an embodiment of the present invention.

FIGS. 15C and 15D depict features of an exemplary profile matching user interface using saved searches, in accordance with an embodiment of the present invention.

FIGS. 17A and 17B depict features of an exemplary user interface for audience profile screening, in accordance with an embodiment of the present invention.

FIG. 20 depicts features of an exemplary subscriber user interface for traditional television systems, in accordance with an embodiment of the present invention.

Figure 1:
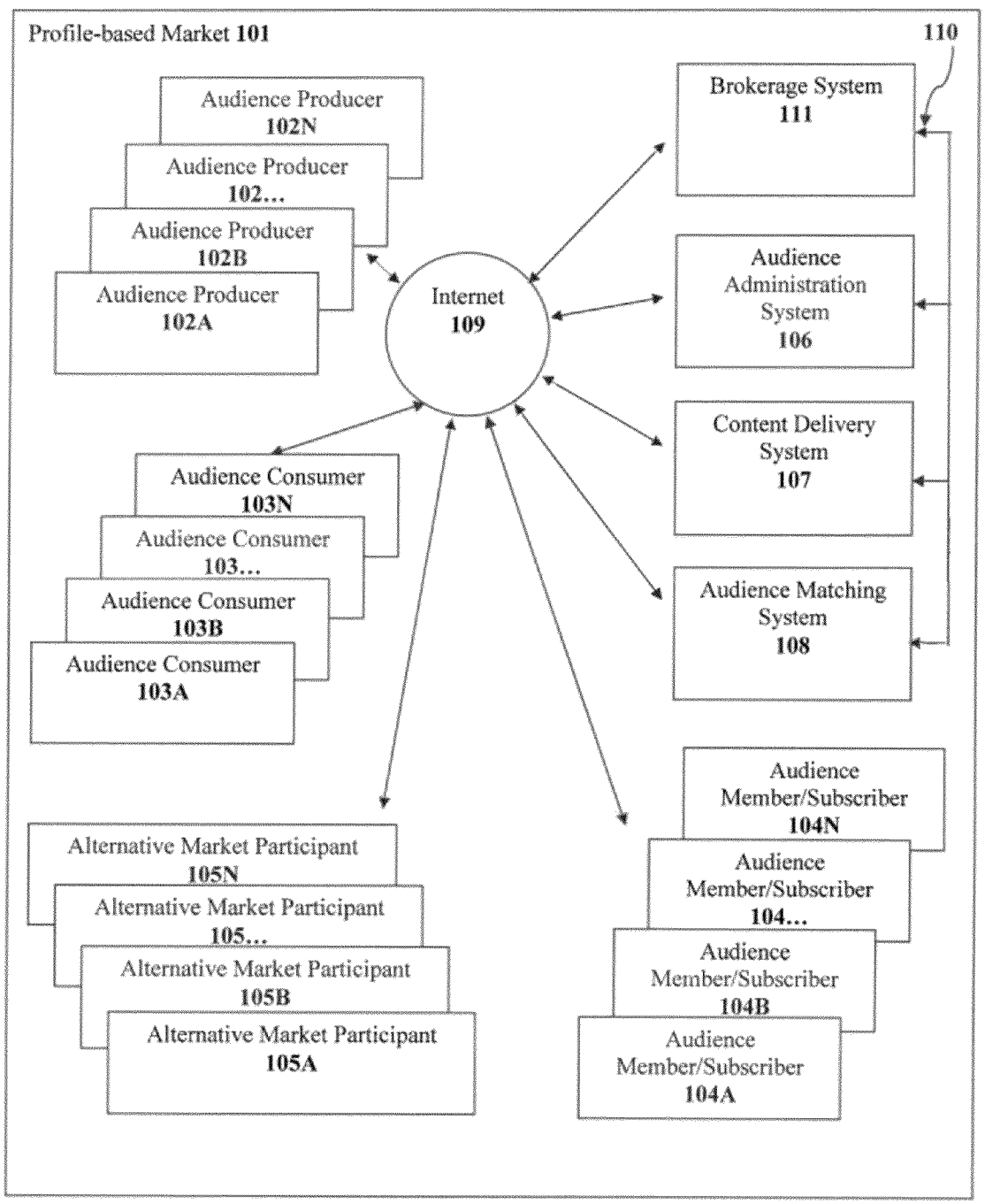
FIG. 1 is a block diagram that depicts the exemplary structure of a market, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Context and Definitions

Embodiments of the present invention, as described below, may be implemented in many different embodiments of software, hardware, firmware, and the entities illustrated in the figures. Any actual software code with a specialized control of hardware to implement the present invention is not limiting to the present invention. The present disclosure is to be considered exemplifications of the invention and is not intended to limit this invention to the specific embodiments illustrated. Thus, the operational behavior of the present invention will be described with the understanding that modifications and variations of the embodiments are possible, given the level of detail presented herein.

The exemplary embodiments consist of major and subsidiary components implemented through a variety of separate and related computer systems. These components may be used either individually or in variety of combination to achieve the objective of providing a new and improved way to enable content providers to reach their specified target audience anytime, based on real-time demand or otherwise, and anywhere without limitation of device platform or an association with content that may limit the distribution of that content. Further the disclosed embodiments provide for commercialization of organized electronic marketplaces where rights to audience profiles and display space may be traded.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. In this application, the use of "content" and "advertising" are used interchangeably to describe information that audience members "view", "read", or "listen" to and is not limiting to any form of media unless specifically stated otherwise. Furthermore, the use of the terms "content" and "advertising" describe video, audio, text, imagery or other sensory stimulus and any combination thereof, across all forms of media, apparent to one skilled in the art. Additionally, in this application, the use of "view", "listen", or "read" means any form of media consumption unless stated otherwise. Furthermore, the use of "advertising", as well as the term "ad", is not limiting and except for context have the same meaning. For example the use of "view" means an audio "advertisement" that is heard, or a text ad that is "read" without limitation.

In this application, the use of "match" and "trade", or in some instances for contextual purposes, "matching", "matched", "trading", and "traded", are all used interchangeably to describe the process whereby access to profile data and rights to display to select profiles are bought and sold. Furthermore, the use of the term "match," as well as other forms, "matching" and "matched", are not limiting. Furthermore, the use of "trade" as well as other forms, "trading" and "traded", are not limiting.

In this application, the use of "subscriber" and "audience member" may be used interchangeably. "Audience member" means any individual for whom content display is sought. "Subscriber" means a user that receives economic benefit in exchange for viewership. The term subscriber is considered by many to mean a person that purchases a product offering to a publication such as a newspaper or magazine. Furthermore, in this application, "subscriber" means one who may or may not pay subscription charges to view content.

In this application, the use of "audience member" means one or more individuals. Furthermore, without departing from the spirit, or scope of this application, the use of "audience member" and "subscriber" may be used interchangeably to describe individual profiles available within the profile-based market.

In this application, the use of "digital" and "analog" content mean any form of media, without limitation. Furthermore, without departing from the spirit or scope of this application and apparent to one skilled in the art, the use of "digital" and "analog" are used interchangeably in some instances where processes or systems described may be applicable to both environments.

Additionally, the section headings used herein are for organizational purposes only, and are not to be construed as limiting the subject matter described.

II. Introduction

Traditional Advertising

We encounter advertising throughout our daily lives delivered in print, on television, on the radio, on the Internet, and elsewhere. In the case of newspapers and magazines, we take advantage of reading news where one or more advertisements may be placed on select pages of a publication. The price that an advertiser pays to place an advertisement is generally based on the depth and type of subscriber base that the publisher can deliver. Revenue from selling advertisements impacts what publishers charge for their media, in some cases giving media away for free. Regardless of media pricing, a reader may indirectly pay for an advertisement, since placement cost is included in the advertiser's final product pricing.

Radio and analog television have long been free to viewers on the premise that viewers listen and watch advertisements delivered intermittently throughout a broadcast. The business model for radio and television is based upon the broadcaster generating revenue from selling advertisements, where the cost to the viewing public is free. In order to cover costs of production and distribution (not dissimilar to the newspaper and magazine model just referenced) a viewer indirectly pays for an advertisement since the advertising placement cost is included in an advertiser's final product pricing. Today, with the commercialization of cable TV, satellite TV, and satellite radio, many households pay charges to receive television content.

Online Advertising Models

Currently, audience markets are highly fragmented across media; devices such as televisions, personal computers, mobile phones, smartphones, and net books; and device locations. Online advertising is a common and often used form of promotion that uses the Internet to deliver marketing messages to attract customers. Online advertising transactions popularized by Google Inc. (NASDAQ: GOOG) are largely based on an auction system for the delivery of advertising to the audience available, at any given time. In such a system, markets may identify audience (to the extent possible) and deliver banner placement and keyword advertising, subject to the highest bid. These markets are spot markets delivering an audience when select parameters and demand are met, in accordance with embodiments of the present invention. Online advertising enables customization of advertisements, content, and posted websites. Examples of online advertising include contextual ads generated from search engine results, such as Google's often used Adwords product, banner ads, social network advertising, online classified advertising, advertising networks, and e-mail marketing including e-mail spam. One key benefit of online advertising is the immediate publishing of information and content, not limited by geography or time. Other examples: Yahoo! Search Marketing and AdSense enable advertisements to be shown on relevant web pages or near search results of pre-chosen keywords. Value of these markets is usually related to audience response.

A class of advertising considered unethical and perhaps illegal includes external applications which alter system settings (such as a browser's home page), spawn pop-ups, and insert advertisements into non-affiliated web pages. These applications may be labeled as spyware or adware. These applications may be designed to be difficult to remove or uninstall. Increasingly, the online user audience frequently lacks the knowledge and technical ability to protect themselves from these programs.

Existing technology allows advertisers to aggregate Internet audiences based on geo-location (reverse IP look-up), modeled segmentation based on cookie or panel data, offline sales data, registered user data and a host of other processes. It should be helpful to summarize some popular online advertising revenue models. Cost Per Mille, which is also known as Cost Per Thousand (CPM or CPT), describes the process where advertisers pay for exposure of their message to a specific audience. "Per Mille" means per thousand impressions, although a reloaded page or internal user action may not be counted. Cost Per Visitor (CPV) describes a process for the delivery of a targeted visitor to the advertiser's website. Cost Per View (CPV) describes a process where an advertiser pays for each unique user view of an advertisement, or website, usually used with pop-up ads. Cost Per Click, also known as Pay per Click (CPC or PPC), is the process where advertisers pay each time a user clicks on their listing and is redirected to their website. Payment for a listing is subject to when a click is realized. CPC allows advertisers and in some cases others to gain information about their market. CPC is designed so that, advertisers pay for the right to be listed subject to a series of keywords that direct relevant traffic to their website, and pay only when someone clicks on their listing, which links directly or indirectly to their website. Cost Per Action or Cost Per Acquisition (CPA) advertising is performance based where the publisher takes all the risk of running the ad, and the advertiser pays only for the amount of users who complete a transaction, such as a purchase or sign-up. This can be advantageous to the advertiser and disadvantageous to the site sponsor. Other models include: Cost Per Lead, Cost Per Order, Floating ad, Expanding ad, Pop-up, Video ad, Map ad, Mobile ad (SMS text), streaming video or audio, E-mail Marketing, Click Through Rate (CTR), Cost per Action (CPA), effective Cost Per Action (eCPA), Cost Per Impression or Cost Per Thousand, and contextual advertising. In no model referenced above is a payment made to a viewer in exchange for reading or viewing.

A trend that impacts audience markets is the convergence of media and devices such as smartphones, personal computers, tablets, and cell phones. This continued convergence, along with the growing ubiquity of connectivity (Wi-Fi, cable TV, satellite TV, wireless telecommunications), means that a single audience develops across all device platforms. However, except for search-based and internet advertising, including behavior based advertising, advertising markets remain fundamentally unchanged since their introduction over a generation ago. In the case of TV and analog radio, advertising markets remain fundamentally unchanged since their introduction about 70 years ago for television, and long before that for radio. Advertising that is contextual and relevant to the intended audience enables creation of better marketing campaigns and accurate reach, but the current state of audience measurement is fragmented with no unified audience measurement system. Audience measurement is considered by many to be dysfunctional, incomplete, disconnected, and confusing.

Building an Advertising Marketplace

We have recognized that developing a robust market for audiences is critical to creating efficiency and transparency in advertising markets, which represented over $500 billion in transactions globally in 2009, increasing to over $600 billion in transactions globally in 2010. In accordance with an embodiment of the present invention, a marketplace is provided that provides such efficiency and transparency, as described in further detail below.

While we take advantage of accessing advertising in its obvious forms on televisions, laptop computers, and desktop PCs when on the Internet, we also access digital advertisements and other types of content on a variety of less-obvious devices such as those found displayed on cellular telephones, smartphones, remote controls, tablet PCs, e-Readers (such as the Kindle™, Nook™, and other e-readers), game devices such as Microsoft XBox, and even within the music, video, and navigational devices of our vehicles. Therefore, modern users of digital devices manage a large volume of advertisements, in a variety of forms, some obvious and some not, accessed through a variety of devices and other mediums, such as newspapers and magazines. These advertisements are often free to viewers and/or have a direct or indirect cost to the viewer. Unfortunately, modern users of digital devices don't have an organized market, which they can access, where their time and likely interests are valued, and economic benefit of some kind is transferred to them, in exchange for viewing certain types of advertisements.

Traditional placement of advertising in newspapers, in magazines, on television, on the Internet, and the like, has been common in media for many years. Transaction mechanisms for matching and trading media content in organized electronic markets, where subscribers of precise interest are paid in exchange for viewing content, such as advertisements and other forms, at any time, have not developed over time. In conventional media markets, commitments to trade advertising space are in some instances made orally at a price that may not be binding on the parties. In other instances, commitment may be in writing, but subject to a direct trade between a seller and a buyer, with or without an agent brokering the placement. These purchase orders have not been designed as a distinct, standardized type of order that can be further electronically exchanged with other market participants.

In real estate markets, the location of a property is the primary driver of price. In advertising markets, the audience is the primary driver of price. Thus, to enhance the efficiency of the current advertising model, content consumption should have a dual pricing structure comprising rights to display and rights to audience, in accordance with an embodiment of the present invention. This allows for pricing to be determined by the size and length of the advertisement and, separately, the profile of audience members, among other parameters.

Profile Access and Display Space Access Exchange

Separation of audience rights and display rights in the cost structure of advertising enables the creation of two fungible sub-assets for each advertising opportunity, thus enabling an efficient market structure, in accordance with an embodiment of the present invention. Additionally, while advertising is a significant part of audience markets, it is not the only application.

One interesting trend in recent years has been the entry of investment firms into exotic markets—movie futures-markets, sports gambling, prediction markets, weather risk management, and carbon markets, to name a few. These trends are indicative of the market for nearly any type of structured market, where efficient markets enhance price discovery. In comparing profile-based markets to these exotic markets, it is important to note that the existing advertising market, which today is direct in nature only, where advertisements are sold and bought directly by producers and consumers, respectively or through their agents, represents about $600 billion in annual global transaction value. Developing an alternative market (where rights to place profile-based targeted advertisements are sold and bought by producers, consumers, investors, traders, or their agents), should result in a market that can grow to have significant economic influence, over time. Some important benefits for alternative market participants include liquidity for market participants, third party valuation, access to alternative markets, and inventory and value risk management.

While media companies have long sold their time and space at negotiated prices, contracts associated with these placements have not been traded on organized alternative electronic markets. We have identified that the familiarity of investors with trading stocks and other securities, and with other products traded on the Internet, suggests substantial interest in such a trading mechanism for content targeted to individual profiles of precise interest. Examples of people of precise interest follow: 1) males 21 to 30 years of age living in a certain zip code and having interest in fast automobiles, and 2) females age 21 to 40 years of age interested in home decorating, or 3) health matters for people with high cholesterol. For market participants of all types, trading rights to placement and access to persons of interest in an organized electronic manner permits media participants to take advantage of improved risk management processes, better inventory control, and even trade timing options they have not been able to obtain value for in the past. The selling practices of media markets suggest an electronic matching and exchange process, to trade rights to buy audience access and content placement, will meet the needs of these markets better than current media buying and selling practices.

The increasing sophistication and complexity of media markets, and of the advertising trading techniques used by participants in these markets, has led to growing interest in a variety of types of advertising and content, placed in direct markets including the Internet and elsewhere, around individual user behavior and interest, but not placed in alternative markets. Many believe micro-markets are in need of an efficient advertising placement mechanism that allows for economically viable placements targeted to small well defined groups of potential customers. Additionally, there is a growing recognition of the need to maintain confidentiality of placement plans and anonymity as to the identity of the content consumer (the buyer of the advertising). Anonymity of transacting parties and the confidentiality of their purchase and sale plans is preserved and accomplished most effectively with electronic market exchange systems, supported with systems and mechanisms for standardized trade terms, in accordance with an embodiment of the invention.

Informal or direct party-to-party negotiation for placement of content in over-the-counter media markets reveals information, such as the identity to the agent or audience producer, at some point in the negotiation process that a counter party might prefer to keep confidential. If the parties use standard order terms and formats, and electronic matching procedures characteristic of automated organized markets, there is no need for a seller, an agent, or any participant in the transaction to know the identity of the ultimate parties to the transaction. One advantage of concealing a party's identity is that the transaction need provide no information about the total size of the market participant's transactional intentions. Confidentiality can be assured by incorporating novel order formats, features, and matching tools into organized electronic market exchange systems.

The interest of many companies to better risk manage their costs associated with advertising and marketing has created a need for organized electronic direct and alternative markets and networks for trading rights to transmit content, whether it be video, text, audio, imagery, display ads, news, and other types targeted with pinpoint precision, to the intended audience, with or without exchange of payment to the viewer.

Exemplary Solutions

The exemplary, non-limiting embodiments disclosed herein meet the aforementioned needs by using novel order types; novel order matching processes, order designations and formats; and transaction processing features that permit the introduction of electronic transactions at negotiated prices, in organized exchange environments—direct and alternative secondary markets, in accordance with embodiments of the present invention. Some of the disclosed embodiments are designed to include payment to subscribers in exchange for their confirmed view of digital, and even analog, advertising and other content. Disclosed embodiments are designed to provide market participants with a new way to have their orders entered, matched, executed, and settled, to manage and monitor risk characteristics of their content placement or advertising placement transactions, and any rights and positions that result from those transactions. These embodiments and more are described in further detail below.

III. Marketplace Participants

As noted above, in accordance with an embodiment of the present invention, profile access rights and display space access rights are treated as separate assets. This is accomplished, in accordance with an embodiment of the present invention, by implementing a profile-based market having a standardized unit of exchange known as an audience share, representing a share of the available audience market, along with units of display space. Throughout this disclosure, an "audience share" may alternatively be referred to as "profile access rights" to clarify the breadth of information associated with a profile, and the terms may be used interchangeably. Throughout this disclosure, "profile-based" may alternatively be referred to as "binary advertising asset" to clarify the nature of a transaction or its associated transaction structure.

In an embodiment, audience share may represent standardized units of exchange that can be traded appropriately in either a direct or an alternative secondary market. In such an embodiment, assets may represent a standardized number of audience members, a standardized number of display space access rights, or both are accessible in a market whereby audience producers and audience consumers may transact.

Marketplace Overview

FIG. 1 illustrates a simplified stricture of a Profile-based Market 101, in accordance with an embodiment of the present invention. In accordance with one exemplary embodiment, the Internet 109 (or other network, as would be understood by one of ordinary skill in the art) is used to connect the various market participants and systems required for the implementation of Profile-based Market 101. The system may include servers, routers, switches, and additional equipment apparent to one of ordinary skill in the art and capable of engaging in communications protocol processing. The Audience Administration System 106, the Content Delivery System 107, and the Audience Matching System 108 may be independent computer systems incorporating a wired or wireless connection, and communicating through the Internet, an intranet, a cloud computing network, a private network (e.g., as unified in a Single Interconnected System), any combination thereof, or through any additional information. Additional details regarding an exemplary, non-limiting architecture of Audience Administration System 106, Content Delivery System 107, and the Audience Matching System 108 are described below in reference to FIG. 26.

In an embodiment, market participants may engage in order entry, transactions to match orders, execution of transactions, and settlement of transactions within the Profile-based Market 101. The Audience Producer 102 participates in the Audience Matching System 108 to sell the display space and audience share that are created subject to an Audience Member/Subscriber 104 logged in to view content created by the Audience Producer 102. To complete a transaction, the Audience Consumer 103 takes a counterparty position in the transaction with the Audience Producer 102.

As will be apparent to one of ordinary skill in the art in light of this specification, an Audience Producer 102 is any entity that is able to deliver display space and audience share for, e.g., use in advertising. The Audience Member/Subscriber 104 is a consumer of content provided by the Audience Producer 102, such as a viewer of a web page, or television show, or a newspaper reader. Audience Consumer 103, which may be an advertiser, reseller, or other entity interested in purchasing rights to access the Audience Member/Subscriber 104 being sold by Audience Producer 102, would therefore be interested in being able to bid on not just advertising space provided by an Audience Producer 102, but also particular Audience Members/Subscribers 104 viewing that advertising space.

Identifying Audience Profiles

The Audience Consumer 103 engages the Audience Matching System 108 using the Brokerage System 111 to search for the appropriate audience specifications for its content using a user interface for audience profile screening shown in FIGS. 17A and 17B, by way of non-limiting example. FIG. 17 is an example of a user interface for screening audience profiles available in the Audience Matching System 108, consistent with disclosed embodiments. Once a target audience is identified, the Audience Consumer 103 places one or more bids for any portion of the available inventory of audience shares represented by offers by one or more market participants.

In such embodiments, a user interface enables Audience Consumers 103(A-N), Audience Producers 102(A-N), and Alternative Market Participants 105(A-N) to filter the universe of all profiles within the Audience Matching System 108 that are available to transact. Further, in such embodiments, the Audience Matching System 108 may be configured to exclude certain profiles from the system's searchable universe for many reasons, including but not limited to, profile members in violation of user agreements, criminal behavior, or former subscribers whose profiles were removed prior to the search.

In an embodiment, a set of filters is provided for the user to define values that limit search returns such as to provide a list of profiles limited to those matching the criteria. In such an embodiment, any type of descriptive data may be a part of the Audience Matching System 108 data set. In such an embodiment, all descriptive data is available for filtering using the Audience Matching System 108. The Audience Matching System 108 may be connected to a plurality of outside data sources (e.g., as described above in reference to FIG. 14), that are accessed to provide additional descriptive data for profiles. The connection to an outside descriptive data provider, to filter audience profiles on the basis of any data available on any system, is enabled through the Audience Matching System 108. The Audience Matching System 108 also includes non-descriptive types of data for various administrative functions. In such embodiments, the descriptive data that forms part of a profile may include, but is not limited to, one or more of the following: name, address, phone number, age, marital status, ethnicity, occupation, house hold income, number of children, business owner, drives, owns a car, owns a motorcycle, owns a boat, owns a dog, owns a cat, owns a bird, make of car, model of car, year of manufacture of car, home ownership status, has a mortgage, age of home, local property tax, has a cell phone, has cable television in the home, has satellite television in the home, owns a computer, type of computer, interne activity, or any additional or alternate content apparent to one of skill in the art. By way of non-limiting exemplary embodiment, profiles may be stored in a database, such that the aforementioned filters can be applied by way of a query on the database, although one of ordinary skill in the relevant arts will appreciate that other mechanisms may be utilized as well.

In an embodiment, the wide variety of data available in the Audience Matching System 108 enables Audience Consumers 103(A-N) and Audience Producers 102(A-N) to match the supply of Audience Producers 102(A-N) with the demand of the Audience Consumers 103(A-N) relative to select profiles. In such an embodiment, the efficiency the Audience Matching System 108 enables Audience Producers 102(A-N) to monetize their audience on an individual level instead of an aggregate level. Similarly, Audience Consumers 103(A-N) are enabled to target their content on an individual level instead of an aggregate level.

In an embodiment, an Audience Consumer 103 is seeking to place advertisement before an audience matching its customer profile. In an example, Unilever™ is seeking placement for its Bertolli™ brand, where the audience profile sought for this advertisement includes middle income households in suburban areas, classified as a commuter household. Unilever™ found that the product offering of the Bertolli™ brand is consumed at higher rates within such households. In this example, the Unilever™ market research has shown that customer focus on the balance of value, healthiness, and convenience in these products provides a highly desirable value proposition for this profile group. Therefore, the company can enter an order to advertise, with pin-point accuracy, each of its products to the audience (group of profiles) most likely to purchase products.

Utilizing Profile Access Rights

Subject to a match, Audience Administration System 106 assigns the profile access rights to Audience Consumer 103 as the buyer and proceeds to arrange for content delivery. The Audience Administration System 106 assigns the display space and time variable to an individual Audience Member/Subscriber 104 and, in conjunction with the Content Delivery System 107, cues the appropriate content for the Audience Member/Subscriber 104 to view, in accordance with an embodiment of the present invention.

In an embodiment where the Audience Members/Subscribers 104(A-N) are offered content to view, based on the matched price of a transaction, all, some, or none of the Audience Members/Subscribers 104(A-N) may accept and view the content by signaling or triggering an action at the shown price offered to them. In some instances, one or more of the Audience Members/Subscribers 104(A-N) may not accept the offered content. In such an instance, Audience Consumers 103(A-N) may trigger an automated bid-up process that includes one or more systematic view price increases to a set limit or not.

In another embodiment, an Alternative Market Participant 105 may buy Audience Share from the Audience Producer 102 in hopes of reselling them at a higher price at a time in the future. In such an embodiment, the Alternative Market Participant 105 may not have the capacity to consume the audience share and thus does not interface with the Audience Administration System 106 or the Content Delivery System 107. In these exemplary embodiments, by way of example, and without limitation, consumption of audience share means the delivery of content by an Audience Consumer 103 for viewing by Audience Members/Subscribers 104(A-N).

Alternative Market Participants 105 (A-N), Audience Producers 102 (A-N), and Audience Consumers 103 (A-N) may enter orders to buy or sell in a market governed by a set of rules and therefore are considered to be authorized participants.

IV. Personalized Content Delivery

Delivering Content to an Audience Member/Subscriber

Figure 2:
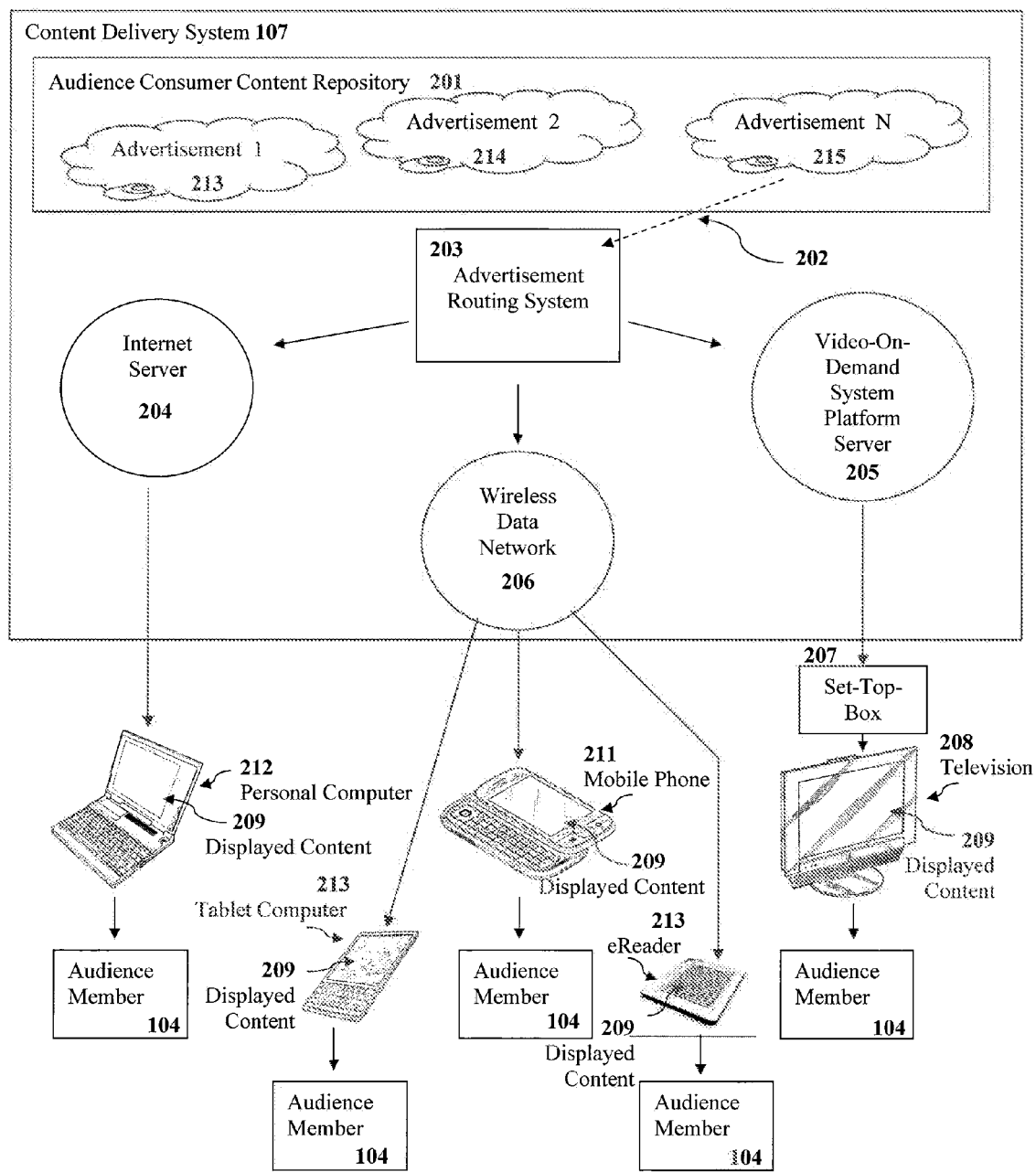
FIG. 2 depicts a process flow for the delivery of personalized content to personal devices based upon a subscriber profile, in accordance with an embodiment of the present invention.

FIG. 2 illustrates a simplified process flow for the delivery of personalized content through the Content Delivery System 107 to the Audience Member/Subscriber 104 that was a part of an audience share purchased by Audience Consumer 103, consistent with disclosed embodiments. One of ordinary skill in the art will recognize that references to a singular Audience Member/Subscriber 104 throughout this disclosure includes any one or more Audience Member/Subscribers 104 that form part of the audience share.

In an embodiment, the Audience Member/Subscriber 104 may opt-in to the Profile-based Market 101 by using a device to receive display content, including, but not limited to, a Television 208, a Personal Computer 212, or a Mobile Phone 211. In such an embodiment, Audience Administration System 106 may match the audience member profile to audience share owned by the Audience Consumer 103. For example, the Audience Consumer 103 may have an Audience Consumer Content Repository 201 comprised of Advertisements 213, 214, and 215 that it plans to display before Audience Member/Subscriber 104. In such an embodiment, the profile of the Audience Member/Subscriber 104 may match the targeted demographic of one of the Advertisements 215. The match may be identified by the Audience Administration System 106, and an order may be sent to the Content Delivery System 107 to transmit the Advertisement 215 at 202 through the Advertising Routing System 203 to the Audience Member/Subscriber 104. At or near the time of such identified match, the Audience Administration System 106 may query a database of active devices (e.g., a Television 208, a Personal Computer 212, a Mobile Phone 211, or additional or alternate type of active device) or another database, to discover which device is currently engaged by the subscriber. The Audience Administration System 106 may signal the Content Delivery System 107 to route the Advertisement 215 to the currently engaged device, e.g., a Television 208 through a Cable-based Video-on-Demand System 205, for display. In such an embodiment, by way of example, and without limitation, a Set-Top-Box 207, which may be off-board hardware based, on-board hardware based, or software based, may receive and display the Advertisement 215 on the Television 208 for view by the Audience Member/Subscriber 104. Alternatively, in such an embodiment, a Set-Top-Box 207 may receive content from the Content Delivery System 107 through the Internet 109.

In another embodiment, the Audience Administration System 106 may query the devices (e.g., a Television 208, a Personal Computer 212, and a Mobile Phone 211) or another database, within the Audience Administration System 106, to discover which device is engaged by the subscriber. The Audience Administration System 106 may signal the Content Delivery System 107 to transmit Advertisement 215 to the currently engaged device, a Personal Computer 212, through an Internet Video Server 204. In such an embodiment, content may be queued for viewing by the Audience Member/Subscriber 104, and the video or other content may be automatically presented to an Audience Member/Subscriber 104 as one or more of (i) a portion of a web site or web page, (ii) a portion of an interface displayed the Personal Computer 212, or (iii) as stand-alone content presented to the Audience Member/Subscriber 104 by one or more devices, e.g., Personal Computer 212.

In another embodiment, the Audience Administration System 106 may query the active devices (e.g., a Television 208, a Personal Computer 212, and a Mobile Phone 211) or some other database, within the Audience Administration System 106, to discover which of said devices is engaged. In such an embodiment, the Audience Administration System 106 may signal the Content Delivery System 107 to transmit Advertisement 215 to the currently engaged device, a Mobile Phone 211, through Wireless Data Network 206. In such an embodiment, by way of example, and without limitation, the advertisement queued for the Audience Member/Subscriber 104, whereby the video content may be presented to a user as one or more of (i) a portion of a web site or web page, (ii) a portion of video content presented to the user through using the Mobile Phone 211, (iii) as stand-alone content.

Figure 10:
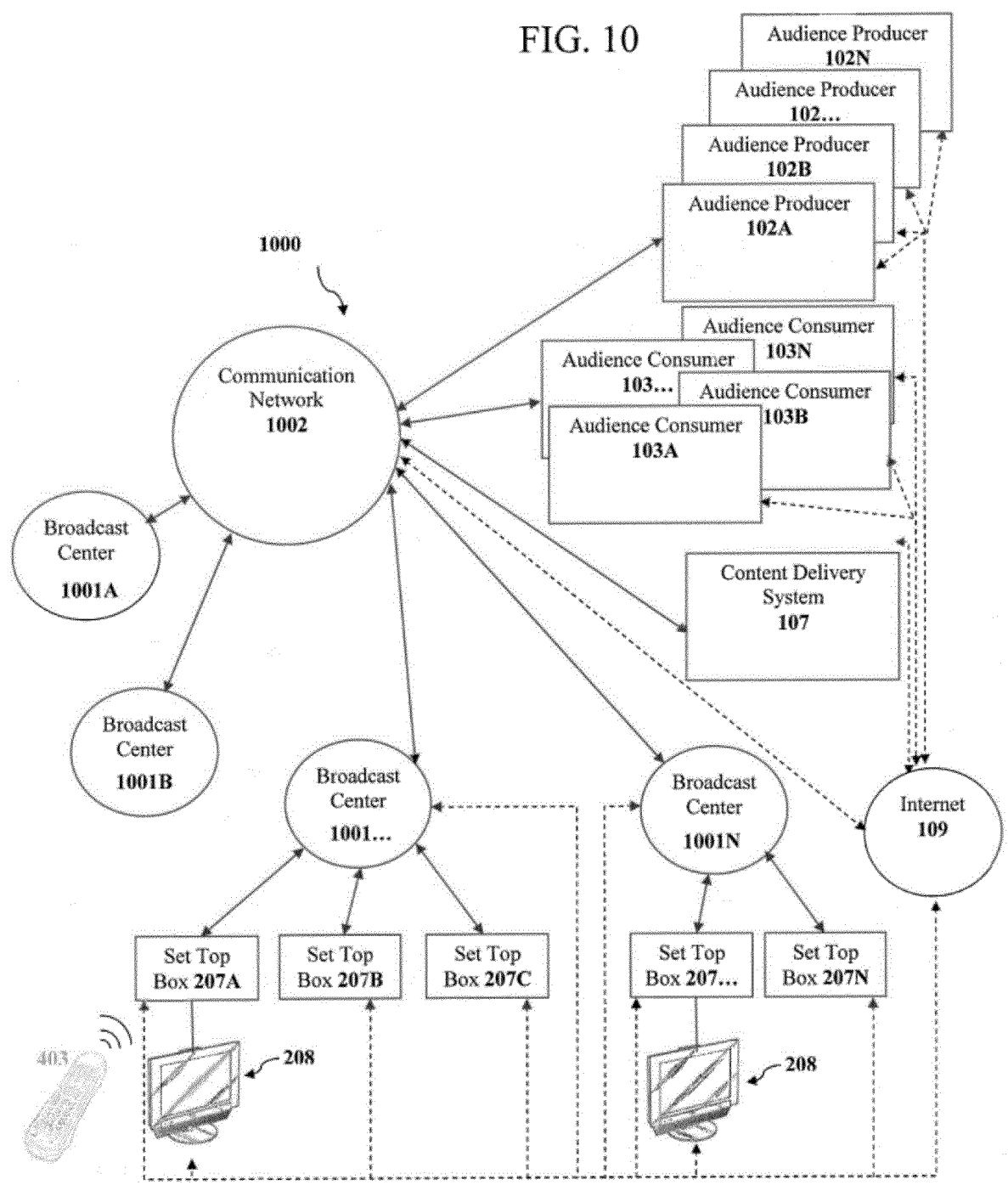
FIG. 10 illustrates features of a system for simultaneously displaying multiple content streams, in accordance with an embodiment of the present invention.

FIG. 10 is the process flow 1000 for transmitting and displaying content streams using a Communication Network 1002, consistent with disclosed embodiments. The Communication Network 1002 is embodied, for example, in an Internet 109 based video streaming system, a broadband cable network or a direct satellite broadcast (DBS) network. The network also communicates with or is embodied as other networks, such as a packet-driven network (e.g., the Internet 109). However, the disclosed embodiments are not limited to such exemplary networks, and in additional embodiments, Communication Network 1002 may include any additional or alternate network apparent to one of skill in the art.

In one configuration, the system 1000 includes a plurality of Set-Top-Boxes 207 located, for instance, at an Audience Member/Subscriber's 104 home. Set-Top-Box 207 is a consumer electronics device that serves as a gateway between a customer's Television 208 and the Communication Network 1002. In alternative embodiments, a Set-Top-Box 207 may be embodied more generally as a Personal Computer 212, an IP enabled Television 208 with integrated Set-Top-Box 207 functionality, a Mobile Phone 211, Tablet Computer 213, or any additional or alternate type of interface device capable of communications protocol processing. For example, FIG. 10 illustrates a hybrid system allowing for the transmission of display content integrated within an existing broadcast, inserted locally by the Set-Top-Box 207 using content delivered directly through the Internet 109, inserted locally by the Television 208 using content delivered directly through the Internet 109, or shown concurrently by the Television 208 using content delivered directly through the Internet 109.

In an embodiment, a Set-Top-Box 207 receives encoded video streams and other information from the Communication Network 1002 or directly through the Internet 109 and decodes the same for display on the Television 208 or other display device (such as a computer monitor or a flat panel display).

The following discussion refers primarily to the capture and transmission of video streams. However, those skilled in the art recognize that the term "video streams" also include or are associated with audio signals. Thus, where video streams and video components are specifically illustrated, audio signals and audio components are implied.

In one embodiment, each Set Top Box 207 is coupled to the Communication Network 1002 via a Broadcast Center 1001. In the context of a cable network, the Broadcast Center 1001 may take the form of a Head-end 1206, which is generally a centrally-located facility where television programs are received from a local cable TV satellite downlink or other source and packaged together for transmission to customer homes. The Communication Network 1002 is connected to a number of Broadcast Centers 1001(A-N).

The Broadcast Center 1001 may also be embodied as a satellite broadcast center within a direct satellite broadcast system. The direct broadcast system may utilize a small 18-inch satellite dish (which is an antenna for receiving a satellite broadcast: signal) or an alternative antenna configuration. Each Set-Top-Box 207 is integrated with a digital integrated receiver/decoder, which separates each channel, and decompresses and translates the digital signal from the satellite dish so that the Television 208 is enabled to display content. The Remote Control 403 is used to control the IRD with the integrated Set Top Box 207, and optionally the Television 208.

The Broadcast Centers 1001(A-N) gather content from the Content Delivery System 107 and transmit the signal to one or more satellites. Content may come to the Broadcast Centers 1001(A-N) from Audience Consumers 103 (A-N) (Ford, General Mills, or other advertisers) through the Internet 109, satellite, fiber optic cable and/or other means such as but not limited to special digital tape.

In an embodiment, Broadcast Centers 1001(A-N) are coupled directly to one another or through the Communication Network 1002, or the Internet 109. In one embodiment, content is distributed in encoded formats, such as, but not limited to, MPEG, MP3, and JPEG. The terms "MPEG,"

"MP3," and "JPEG" as used herein, contemplate all standards. Moreover, other image, audio, or video encoding/compression standards exist. Accordingly, disclosed embodiments should not be construed as being limited only to the listed types of encoding and/or compression. Any additional or alternate proprietary encoding format, open-source encoding format, or other encoding format may also be used within the scope of the disclosed embodiments.

Each Set Top Box 207 is distinguished from other network components by a unique identifier, number, code, or address, examples of which include an IP (Internet Protocol) address or a MAC (Media Access Control) address or another process, apparent to one skilled in the art without departing from the spirit or scope of the disclosed embodiments. Thus, content streams and other information are transmitted from the Communication Network 1002, Internet 109, or Content Delivery System 107 to a specific Set Top Box 207 by specifying the corresponding address, after which the Communication Network 1002 or Content Delivery System 107 routes the transmission to its destination using one or more conventional communication protocols.

The Communication Network 1002 is also preferably coupled to the Internet 109 to provide access thereto by the Set-Top-Box 207. The Internet 109 is a "network of networks" and is well known to those skilled in the art.

A Remote Control 403 is provided, in one embodiment, for convenient remote operation of the Set-Top-Box 207 and/or the Television 208. The Remote Control 403 may use infrared (IR), radio frequency (RF), Bluetooth™, Wireless USB, or other wireless technologies to transmit control signals to the Set-Top-Box 207 and the Television 208. Other remote control devices are also contemplated, such as a wired or wireless mouse controllers (not shown), a keyboard (not shown), or any additional or alternate input device apparent to one of skill in the art and appropriate to Set-Top-Box 207 and Television 208.

Figure 13:
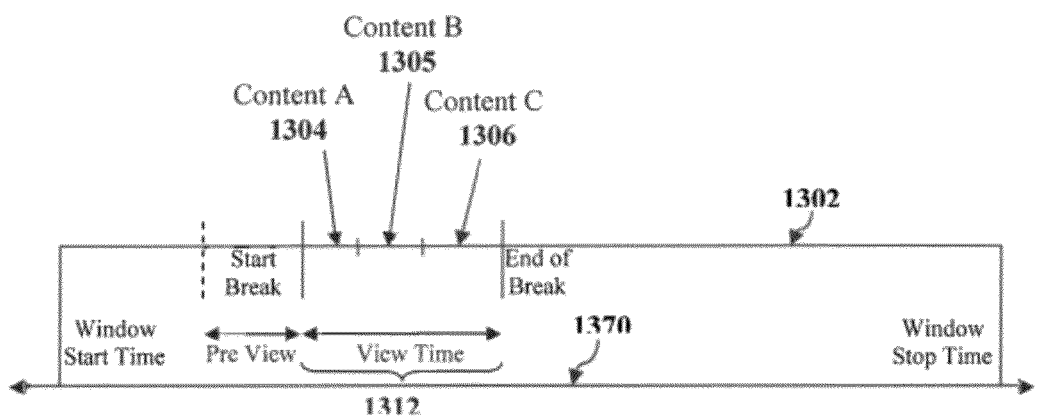
FIG. 13 illustrates exemplary sequences associated with breaks in programming streams to provide personalized advertising, in accordance with an embodiment of the present invention.

FIG. 13 illustrates a programming stream that may be provided by the network operator to a household via a network interface or by an online content provider such as Hulu™ to a device (e.g., Personal Computer 212) of Audience Member/Subscriber 104, consistent with disclosed embodiments. The Content Stream 1302 for which display content is provided comprises advertisements inserted based on the profile of the Audience Member/Subscriber 104. Audience Members/Subscribers 104(A-N) may switch between channels or content streams to select among programming options. The Content Stream 1302 comprises a break 1312, during the Content Stream 1302 time period shown. In an embodiment, during the View Time 1312 one or more content display opportunities are available whereby one or more advertisements are used to fill the View Time 1312. For example, two, three or four advertisements may be cued for the Audience Member/Subscriber 104 during a single break. The Content Delivery System 107 transmits a number of advertisements based on the View Time 1312 and content within the Content Queue 1812 of Audience Member/Subscriber 104. Furthermore, since ads selected and shown to the Audience Member/Subscriber 104 are based on the Content Queue 1812 of a single Audience Member/Subscriber 104, changing Content Stream 1302 or channels will not cause different ads to be shown.

In an embodiment, Content Streams 1302 may include a cue tone signal (or a cue message in digital networks) at a predetermined time before the beginning of each break or insertion opportunity to provide notice of upcoming breaks or insertion opportunities within a break. In such an embodiment, cue tone signals are utilized to allow content providers to insert content into a network feed. Further, some broadcasters provide window start times and window end times during which one or more breaks will occur. These start and end times define a content placement opportunity. This information may also be utilized by the Content Delivery System 107 to determine when a View Time 1312 will occur during a Content Stream 1302. Accordingly, the system is operative to monitor Content Streams 1302, for cue tone signals as well as to obtain and store information regarding window start and end times. One of ordinary skill in the relevant art will appreciate that alternate signals or processes may be utilized without departing from the spirit or scope of the disclosed embodiment, and are contemplated by this disclosure.

In an embodiment, the Content Delivery System 107 uses the cue tone data to trigger a channel change on the viewing device, e.g. Television 208, to provide the Audience Member/Subscriber 104 queued content without altering or replacing the existing broadcast signal. Once the View Time 1312 is over, the Television 208, Set-Top-Box 207, or other control device changes the channel back to the previously viewed Content Stream 1302 or program.

Premium Content Placement and Deliver

Figure 23:
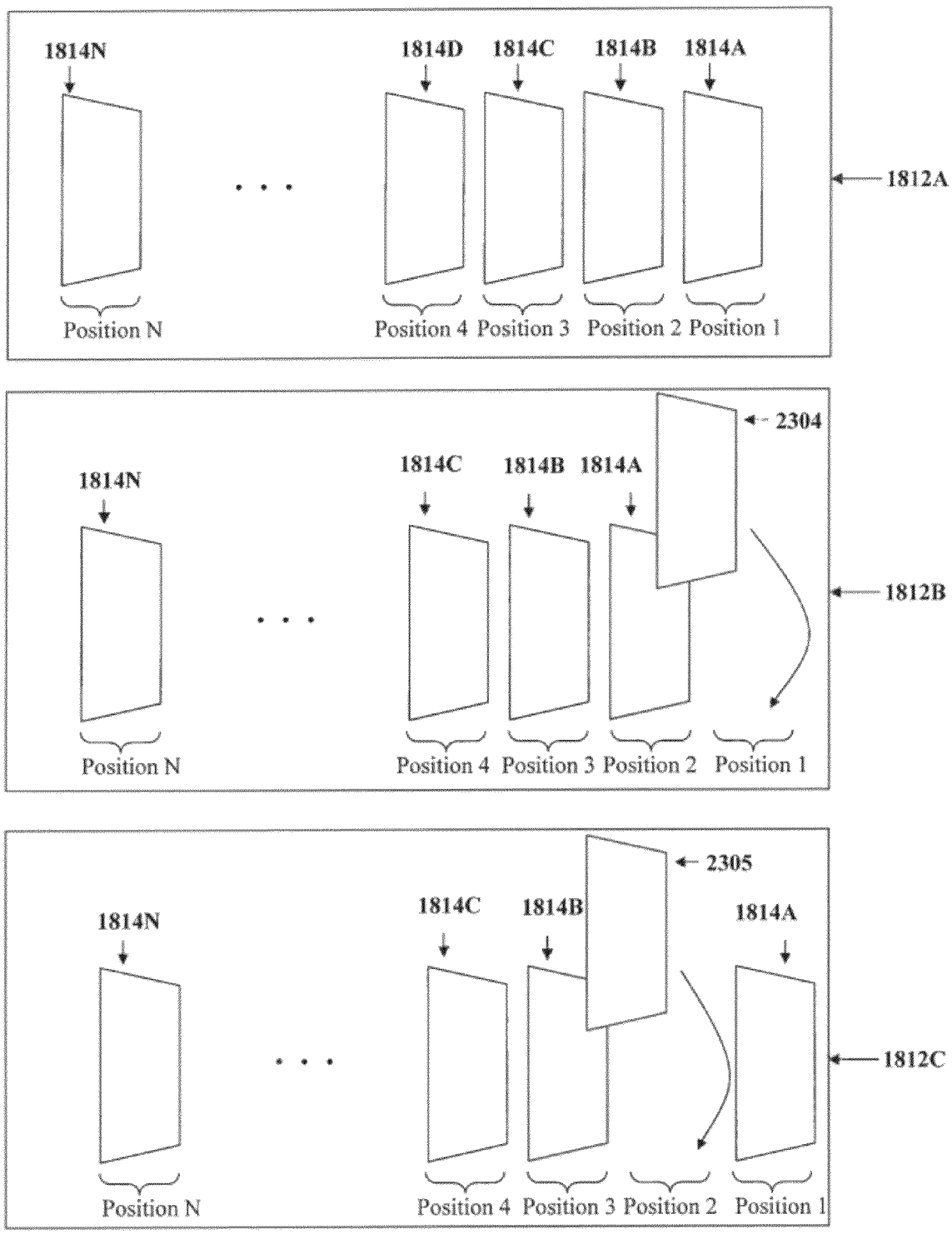
FIG. 23 depicts an illustration of the process of premium content placement in a subscriber queue, in accordance with an embodiment of the present invention.

FIG. 23 depicts an illustration of the process of premium content placement in a subscriber queue, consistent with disclosed embodiments. During the course of operation of the Profile-based Market 101, profiles are matched to audience share purchased by Audience Consumers 103(A-N). Subject to the occurrence of a match, Content 1814 is placed in the Audience Member/Subscribe 104 Content Queue 1812 for display. Content 1814(A-N) is limited to a defined number of offers such as, for example purposes 50 Content 1814(A-N) items.

FIG. 23 illustrates three variations of the Content Queue 1812, labeled 1812A, 1812B, and 1812C. 1812A illustrates a Content Queue 1812 where the Content 1814(A-N) is arranged, in an order, based on a custom order defined by the Audience Member/Subscriber 104, or without limitation, any additional or alternate order. To further enhance the opportunity for price discovery and transparency, Audience Consumers 103(A-N) are provided with an option to pay an additional fee, which may or may not increase the credit to the Audience Member/Subscriber 104, to place Content 1814 in any specified position in the Content Queue 1812, regardless of the Content 1814 display order specified by the Audience Member/Subscriber 104 or other order. 1812B illustrates the Content Queue 1812 of an Audience Member/Subscriber 104 with a profile matching an Audience Consumer's 103 recent audience share purchase. 1812B illustrates that the Audience Consumer 103 paid a placement fee to have its Content 2304 placed in the first position of the Content Queue 1812B. 1812C illustrates a process similar to 1812B, where the difference is that the Audience Consumer 103 paid a placement fee to have its Content 2305 placed in the second position in the Audience Member/Subscriber 104 Content Queue 1812.

Personalizing Information About Audience Members/Subscribers

In an embodiment, a subscriber may directly or indirectly provide information including at least one of a name, age, gender, social security number, address, and perhaps other information, from time-to-time, for participation as an audience member and subscriber. However, this embodiment is not limited to these parameters. In an additional embodiment, the address or zip code of an audience member may be the sole parameter. In such an embodiment or other embodiments, additional information may be captured, from time-to-time, based upon behavioral activities of the subscriber, or in response to replies to certain questions.

Figure 6A:
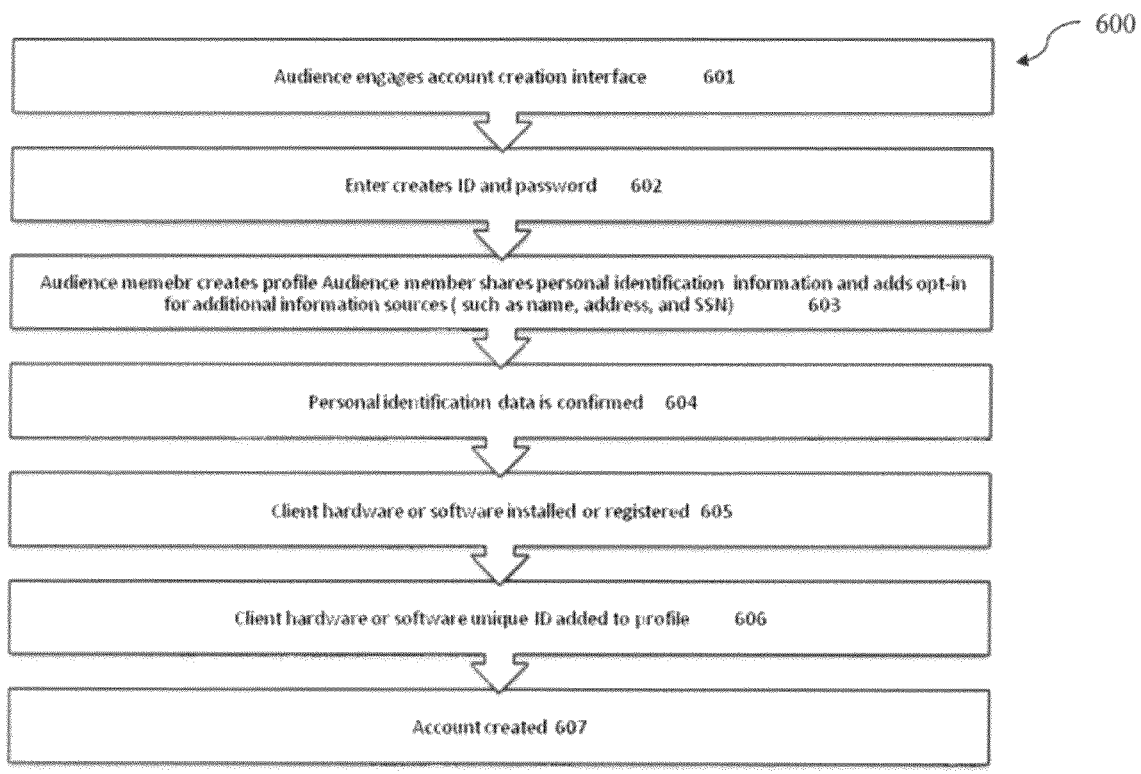
FIG. 6A is an overhead view of steps of a process flow for an individual to subscribe to become an audience member, in accordance with an embodiment of the present invention.

FIG. 6 is an illustration of the process flow 600 used by a person to create an account and participate in the Profile-based Market 101 as a subscribed Audience Member/Subscriber 104. In such an embodiment, a person creates an account to establish himself as an Audience Member/Subscriber 104 whose profile may be bid on by one or more Audience Consumers 103(A-N), for example advertisers, for the display of video or another type of content.

In an additional embodiment, using one of a plurality of processes and networks, including but not limited to the Internet 109, telephony, and cable, Audience Member/Subscribers 104 (A-N) use one of a number of devices that interface through those networks including but not limited to Mobile Phone 211, Personal Computer 212, and web sites to engage an Account Creation Interface 601. The Account Creation Interface 601 enables a person to create a Password and User Identification 602. Subsequently, the person who is now an Audience Member/Subscriber 104 creates a profile 603. The Audience Member/Subscriber 104 profile is primarily based on, but not limited to, information provided by the Audience Member/Subscriber 104, and may also contain data from third-party reporting sources. Further, the Audience Profile Data Aggregation System 1400 implements the collection of data for building the profile. Alternatively, the Audience Profile Data Aggregation System 1400 comprises querying third-party data sources for Audience Member/Subscriber 104 profile information. In such an embodiment, by way of example, and without limitation, an Audience Consumer 103 may bid on audience share comprised of Audience Member/Subscribers 104(A-N) profiles the include data on automobile brand ownership. In this example, the Audience Profile Data Aggregation System 1400 queries a third party database to determine the incidence of profiles meeting the Audience Consumer's 103 automobile brand ownership bid specifications.

In an embodiment, the Profile Creation 603 enables Audience Consumer 104 to enhance the value of its Audience Member/Subscriber 104 profiles by providing personal data, not available through the Audience Profile Data Aggregation System 1400, to enhance the granularity of Audience Member/Subscriber 104 profile with data that Audience Consumers 103 may find useful in pricing its audience share buy.

In an embodiment, standard identifiers are used to combine personal data sourced from one or more public and private databases to create an externally verifiable audience member profile. In such an embodiment, by way of example, and without limitation, a person becomes an Audience Member/Subscriber 104 by providing his social security number or other identifying information such as the last 4 numbers of his social security number that is used to link to data collected by third party organizations such as, but not limited to, LexisNexis™, Equifax™, and TransUnion™ to enhance the Audience Member/Subscriber 104 profile. In such an embodiment, other standard identifiers such as one or more credit card account credentials are used to further enhance the profile of Audience Member/Subscriber 104 by providing information about a history of transaction values of an Audience Member/Subscriber 104, and information about the associated merchants. In such an embodiment, the Audience Administration System 106 interfaces with the external data sources to confirm the Personal Identification Data 604 provided by the Audience Member/Subscriber 104 prior to authorizing the creation of the Audience Member/Subscriber 104 account. In such an embodiment, to enable transmission and confirmation of display content, Audience Member/Subscribers 104(A-N) install hardware, software, or both, or use an Internet enabled device enabling the identification and personalized delivery of Display Content 209. For example, software is installed on a computer that enables the delivery of personalized advertising on streaming video through or on sites such as YouTube.com™ and Hulu.com™. In another example, the Audience Member/Subscriber 104 uses a website to view ads in his Content Queue 1812, without insertion into other media. In yet another example, an Audience Member/Subscriber 104 installs an application on his mobile phone, network appliance, or mobile computing device to view ads in their bid queue, without insertion into other media such as, but not limited to, television shows, radio programs, or websites. In yet another example, Audience Member/Subscriber 104 utilizes a Set-Top-Box 207 connected to his Television 208 enabling the transmission of personalized advertising inserted in a television broadcast.

In an embodiment, the transmission of personalized ads to an individual audience member includes confirmation of the member's unique identification, at each instance when they interface with the Profile-based Market 101. In such an embodiment, a Client Hardware or Software Unique Identification 606 is linked to each Audience Member/Subscriber 104 account to enable audience members to consume content on any one of a number of available devices. In such an embodiment, Audience Member/Subscriber's 104 devices are linked to the account of the Audience Member/Subscriber's 104 using a unique identification for the registration of each device. For example, an Audience Member/Subscriber 104 installs as Set-Top-Box 207 for his Television 208, installs an application for his portable computing device, and installs an application on his Mobile Phone 211. In such an embodiment, Audience Member/Subscriber 104 may view all content for which executed trades match his profile. Furthermore, Audience Member/Subscriber 104 receives customized advisement while watching content on his Mobile Phone 211, watching a Television 208 show, or surfing the web. In all instances, the Audience Member/Subscriber 104 receives personalized advertising, regardless of device or platform. In such an embodiment, by way of example, and without limitation, the Audience Consumer 103 pays a premium to have its content displayed to a specified profile in a specified position in the Content Queue 1812 of the Audience Member/Subscriber 104.

Audience Member/Subscriber Information Aggregation

Figure 14:
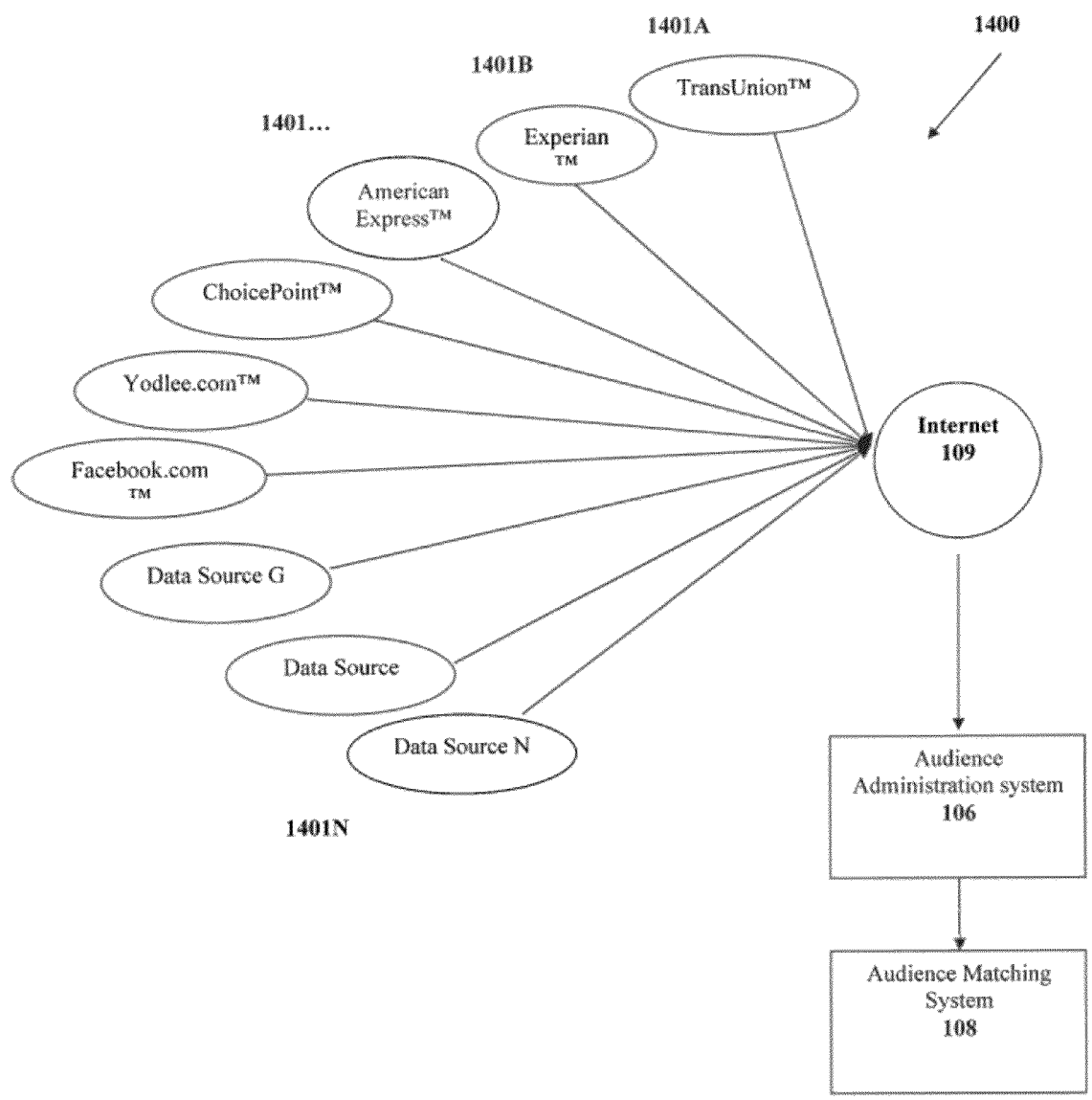
FIG. 14 illustrates features of a system for audience profile data aggregation, in accordance with an embodiment of the present invention.

FIG. 14 is an illustration of an audience profiling data aggregation system. In one embodiment, by example, and without limitation, data from one or more Data Sources 1401 (A-N) used to enhance various aspects of an Audience Member/Subscriber 104 profile are transmitted to the Audience Administration System 106, through the Internet 109 or other data network, to provide Audience Consumers 103(A-N) and Audience Producers 102(A-N) the ability to screen Audience Member/Subscriber 104 profiles using a variety of sources that provide, at least one of, economic, behavioral, social, and demographic data, consistent with disclosed embodiments. In such embodiments, Audience Member/Subscriber 104 profiles are screened using data feeds from one or more Data Sources 1401(A-N), where query requests are sent to Data Sources 1401(A-N), and data from within the Audience Administration System 106 matches Audience Member/Subscriber 104 profiles based on the screening criteria. For example, the Audience Profiling Data Aggregation System 1400 provides a mechanism for organizations that have data describing various attributes of audience populations to monetize their data by providing data feeds to Profile-based Market 101 participants.

In another embodiment, an Audience Consumer 103 seeks to place advertising before a specific audience profile to drive sales of a recently developed electronic device for music aficionados. The Audience Consumer 103 may seek to target an audience profile with high levels of personal income, a history of being early-adopters of innovative products, and known to be interested in consumer electronics related to the playback of music. In such an embodiment, the Audience Producer 103 develops screening criteria comprised of the Audience Profile Data Aggregation System's 1400, income data, from the Audience Administration System 106, electronics consumption data from ChoicePoint™, and personal interest data from Facebook™. With the screening criteria defined and the screen run, the Audience Consumer 103 identifies the incidence of the desired audience share.

Confirmation of Viewership

Figure 4:
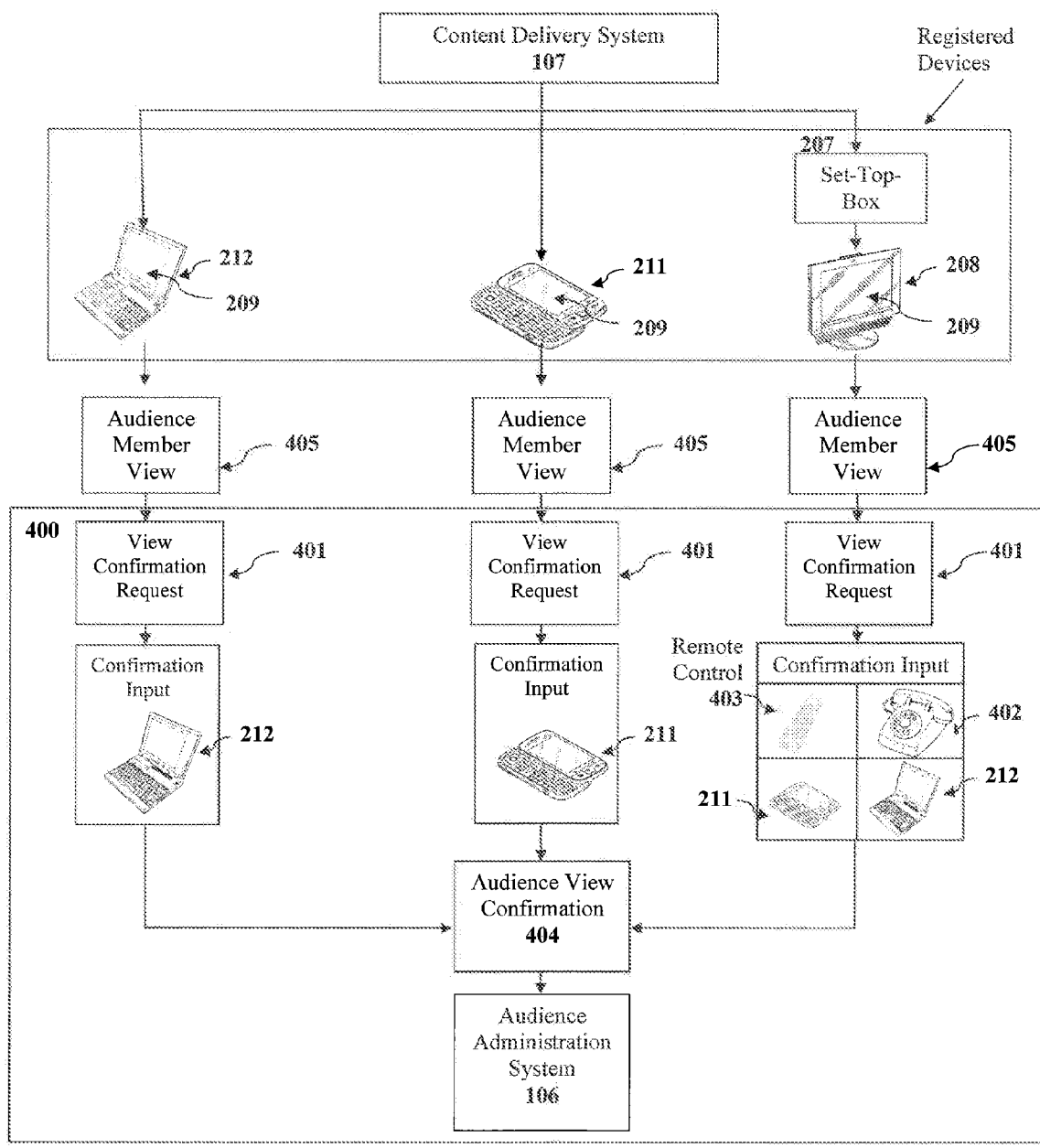
FIG. 4 is an overhead view of steps of a process flow for audience member view confirmation and feedback, in accordance with an embodiment of the present invention.

FIG. 4 illustrates a basic audience view confirmation and feedback process 400, consistent with disclosed embodiments. The Content Delivery System 107 transmits the assigned content to the Audience Member/Subscriber 104 on display screen of one of any number of devices. In such an embodiment, by way of example, and without limitation, the content from the Audience Consumer 103 is viewed by Audience Member/Subscriber 104 at 405. Furthermore, Audience Member/Subscriber 104 is prompted by the Audience Administration System 106 to provide View Confirmation 404. Furthermore, the view confirmation data is transmitted to the Audience Administration System 106 for analysis, storage, and payment processing.

In an exemplary embodiment, the Audience Member/Subscriber 104 is viewing, at 405, a show from NBC™ on his Television 208. During a commercial break, a commercial queued in the Content Queue 1812 for him from the Content Delivery System 107 is displayed at 405. In such an embodiment, by way of example, and without limitation, upon the complete viewing of the commercial, an embedded data object within the commercial is utilized by the Audience Administration System to confirm that the commercial content has been delivered. Further, the viewer is prompted by the presentation of an icon or some other graphical element on the screen that appears in the Content Display Area 1812, for some period of time, one or more times, to provide feedback regarding how much he liked or disliked the commercial. In such an embodiment, by way of example, and without limitation, using the Television Remote Control 403 the Audience Member/Subscriber 104 selects and submits the response or another triggering action is taken by the Audience Member/Subscriber 104 to select and submit the response, without departing from the spirit or scope of the disclosed embodiments. Additionally, the response data is transmitted to the Audience Administration System 106 for storage, analysis, and payment processing.

Figure 18:
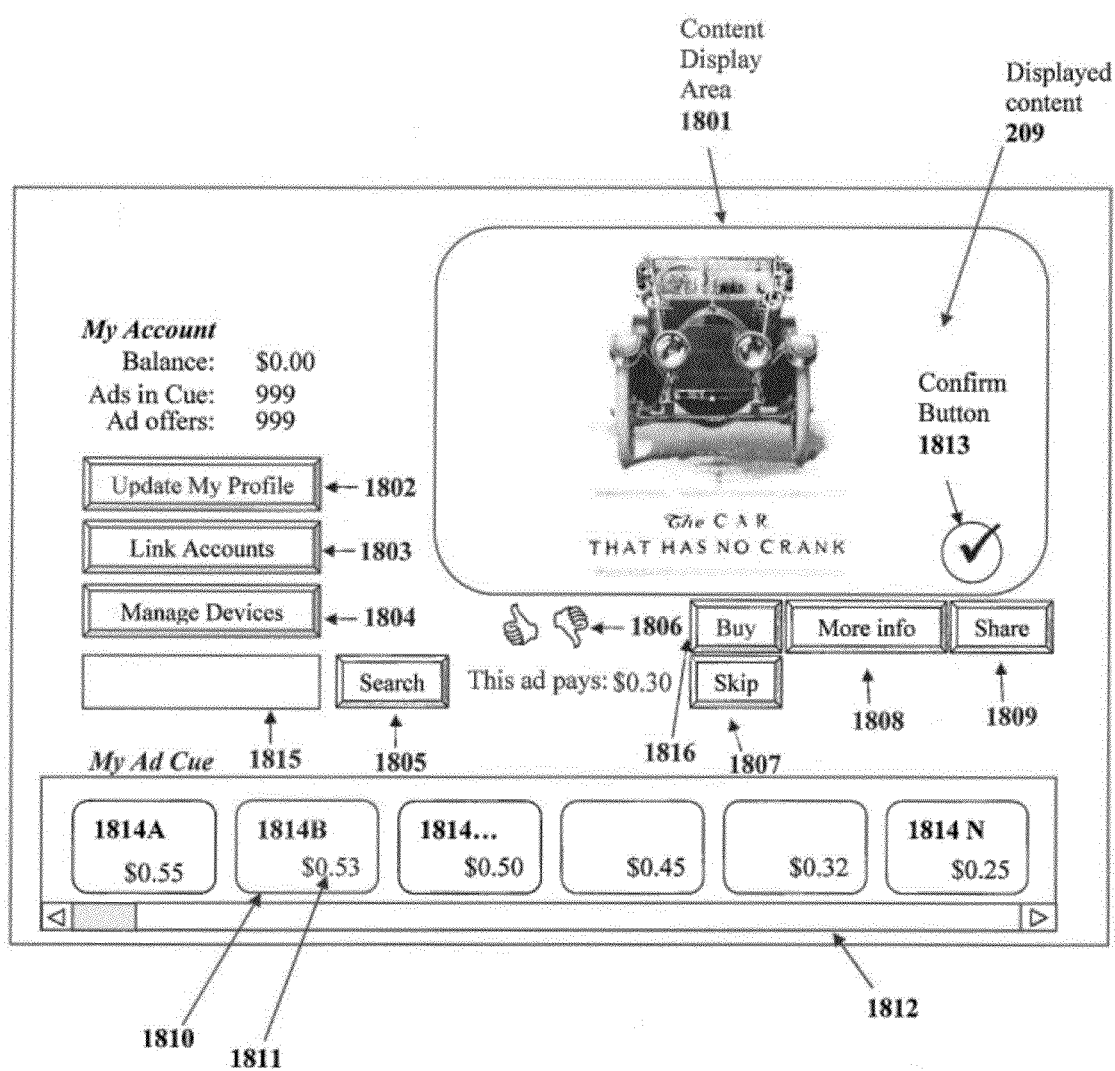
FIG. 18 depicts features of an exemplary subscriber user interface for computer based systems, in accordance with an embodiment of the present invention.

In an embodiment, the Audience Member/Subscriber 104 uses a Personal Computer 212 to log into a website, e.g., displayed through the exemplary interface of FIG. 18, to access his account and view content assigned to that account by the Audience Administration System 106. In such an embodiment, by way of example, and without limitation, the Audience Member/Subscriber 104 is presented with one or more advertisements in the Content Queue 1812 that may be viewed. Furthermore, after Audience Member/Subscriber 104 views each of any number of advertisements (e.g., through Audience Member Views 405), a Viewer Confirmation Request 401 is provided for the Audience Member/Subscriber 104 to complete. In such an embodiment, by way of example, and without limitation, by entering an alphanumeric code embedded in the advertisement, using the Personal Computer 212, the Audience Member/Subscriber 104 provides Audience View Confirmation 404 of the advertisement. The Audience Member/Subscriber 104 may provide an opinion about the commercial. The confirmation data and opinion data are sent to the Audience Administration System 106 for storage and analysis. In the embodiment described herein, Audience Member/Subscriber 104 provides Audience View Confirmation 404 of Advertisement 213 using a modality other than that of entering an alphanumeric code embedded in the advertisement, for example, by using a formatted button on the Personal Computer 212 presented for the purpose of confirmation input, or other forms of confirmation, that would be apparent to one skilled in the art. Such other means include, but are not limited to, voice command, touch, and gesture.

Figure 19:
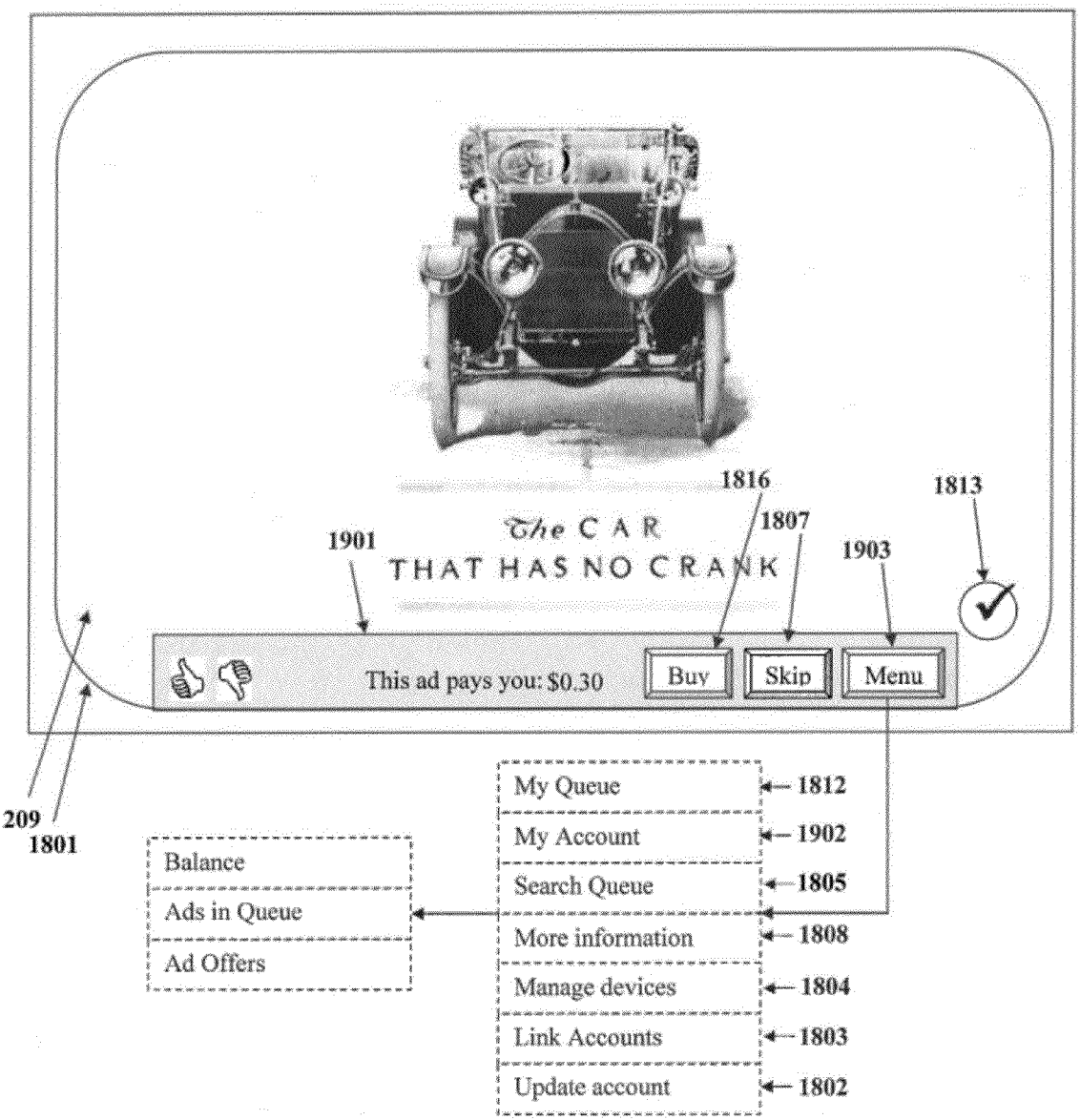
FIG. 19 depicts features of an exemplary subscriber user interface for portable computer, mobile computer, and internet protocol enabled television based systems, in accordance with an embodiment of the present invention.

In yet another embodiment, the Audience Member/Subscriber 104 accesses an application on their Mobile Phone 211 that is a user interface, FIG. 19, to access his account and view content, at 405, assigned to that account by the Audience Administration System 106. In such an embodiment, by way of example, and without limitation, prior to viewing, the Audience Member/Subscriber 104 is prompted to accept a displayed price and, subject to conveying acceptance, is subsequently presented with one or more Advertisements 213, 214, 215 that can be viewed, at 405. After viewing each of any advertisements as shown in Content Queue 1812, a Viewer Confirmation Request 401 is displayed for the Audience Member/Subscriber 104 to complete. In such an embodiment, by way of example, and without limitation, the Audience Member/Subscriber 104 provides the Audience View Confirmation 404 of the completely viewed advertisement by entering an alphanumeric code embedded in the commercial, clicking on a button or otherwise activating an actionable region of a displayed interface, or using any additional or alternate triggering action by the Audience Member/Subscriber 104 apparent to one skilled in the art. In such an embodiment, as a follow-up, the Audience Member/Subscriber 104 may provide an opinion about the commercial. The data confirmation and opinion data, if any, are sent to the Audience Administration System 106 for reporting, storage, and analysis in real-time or otherwise.

FIG. 5 illustrates a simplified structure for the payment or incentive for the Audience Member/Subscriber 104 for the viewership of specific content from an Audience Consumer 103, consistent with disclosed embodiments. In such an embodiment, the process comprises the transmission of content to the Audience Member/Subscriber 104 via the Content Delivery System 107. Furthermore, subject to receiving the Audience View Confirmation 404 by the Audience Administration System 106, the Subscriber View Credit 501 is transmitted to a linked account of the Audience Member/Subscriber 104.

In an embodiment, Audience Member/Subscriber 104 turns on Television 208, triggering Set-Top-Box 207 to signal the Audience Administration System 106 that Audience Member/Subscriber 104 is available and requires identification confirmation. Furthermore, the Audience Member/Subscriber 104 logs in to the Audience Administration System 106 through the Set-Top-Box 207 to implement the Pay-to-Audience 500. As a way of explanation, the Content Delivery System 107 cues a set of advertisements for view. At the first commercial break in the show, the Content Delivery System 107 begins inserting advertisements to fill the commercial break, in lieu of viewing advertisement delivered by the primary broadcaster. As the first advertisement completes its showing, Displayed Content 209, the Audience Member/Subscriber 104 is prompted to provide the confirmation input using keys or the touch screen of the Television Remote Control 403, or using any additional or alternate triggering action from that device or any other device apparent to one skilled in the art, without departing from the spirit or scope of the disclosed embodiments. Additionally, the confirmation data is transmitted to the Audience Administration System 106 for reporting, storage, and analysis. In such an embodiment, the Audience Administration System 106 enables payment to the account of the Audience Member/Subscriber 104 and sends view confirmation data to the Audience Consumer 103. In this embodiment, Audience Member/Subscriber 104 is a female age 32, Hispanic, and living in Chicago, Ill. has an audience member profile matching the parameters of a group of units purchased by the Ford Motor Corporation™ (NYSE: F). In an additional embodiment, view confirmation may not be required.

In an embodiment, Audience Member/Subscriber 104 logs in to Audience Administration System 106 on his Mobile Phone 211. In such an embodiment, by way of example, and without limitation, Audience Member/Subscriber 104 is notified, by a visual indicator or one of a number of other means, that there are one or more advertisements is queued for Audience Member/Subscriber 104 to view. Furthermore, Audience Member/Subscriber 104 views the one or more advertisements. In such an embodiment, the content completes its showing, Displayed Content 209, and the Audience Member/Subscriber 104 is prompted to provide confirmation input that each of the Displayed Content 209 was viewed using the Mobile Phone 211. Additionally, the confirmation data is transmitted to the Audience Administration System 106 for reporting, storage, and analysis. In such an embodiment, the Audience Administration System 106 enables payment to the account of the Audience Member/Subscriber 104 and sends view confirmation data to the Audience Consumer 103. In this embodiment, Audience Member/Subscriber 104 is a male age 17, African American, and living in Wichita, Kans. has an audience member profile matching the parameters of a group of units purchased by the McDonald's Corporation (NYSE: MCD). For example, an Audience Member/Subscriber 104 commutes to and from work on a bus, and while passing time, he chooses to watch personalized advertisement on his iPhone in exchange for payment or economic benefit of some kind such as credit to a debit card or reward points.

Process Flow

Figure 9:
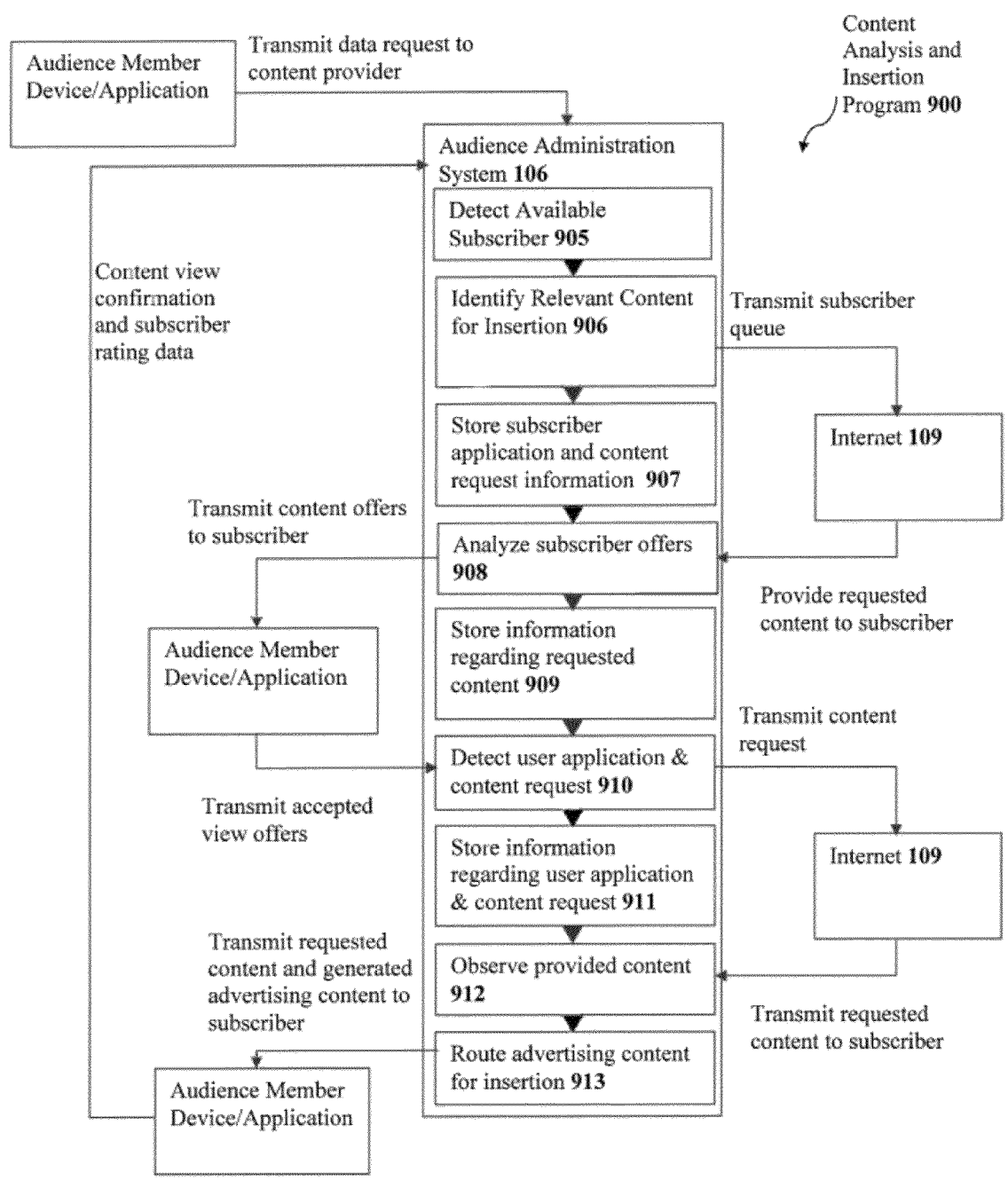
FIG. 9 is an overhead view of steps of a process flow for a content analysis and insertion program, in accordance with an embodiment of the present invention.

FIG. 9 is an illustrative process flow 900 between an Audience Device/Application (e.g., a set-to-box 207, a Television 208, a Personal Computer 212, etc.), a network device (e.g., Content Delivery System 107), and a content provider (e.g., Audience Consumer 103), consistent with disclosed embodiments. The process flow 900 may be implemented as a method, a process, a device, or as part of a system, without departing from the spirit or scope of the disclosed embodiment.

In an embodiment, process flow 900 is used as an alternative to direct advertisement viewing where an advertisement is not embedded in entertainment or other types of content. For example, the process illustrates a system that allows the integration of a Content Delivery System 107 with existing content delivery infrastructure (e.g. network television, websites, radio etc.) by overlaying, replacing, or circumventing existing advertisements embedded in that media.

In such embodiment, it is of key importance to clarify that in operation on a Television 208, the disclosed embodiments augment and enhances the existing advertising content. For example, the Set-To-Box 207 and/or internal Television 208 hardware or software, may detect the queued advertisements and the approaching commercial break, and may instantly change the channel to one presenting a targeted advertisement from a Content Queue 1812 of the Audience Member/Subscriber 104.

In operation, an Audience Member/Subscriber 104 launches an Audience Device/Application, such as a Television 208, a Personal Computer 212, a Mobile Phone 211, a Tablet Computer 213, an eReader 214, or other device. The Audience Member/Subscriber 104 then utilizes the device or application to request information (e.g. content in the Content Queue 1812 from the Content Delivery System 107) from the content provider. This may be, for example, an HTTP request to retrieve a content offer queued for the audience member to watch as a part of the pay-to-audience view processes. As this request passes through the internet or other connectivity method, the packets or basic unit of communications over digital or analog networks containing this request are intercepted and routed to the Audience Administration System 106 and the Content Delivery System 107. The Audience Administration System 106 may detect available subscribers at 905 and identify relevant content for insertion at 906. The information about the Audience Member/Subscriber 104 and new offered content in the queue of the Audience Member/Subscriber 104 is stored in a database (e.g., the Audience Administration System 106) for later analysis at 907. As more information about the Audience Member/Subscriber 104 is received over time, the Audience Administration System 106 provides data for Audience Consumers 103(A-N) to bid for profiles based on, but not limited to, historical content view data or other data gather by the Audience Administration System 106. In such an embodiment, if the Content Analysis and Insertion Program 900 does not identify a suitable content display opportunity, the Audience Administration System 106 transmits instructions to the Audience Device/Application not to modify the broadcast stream.

In responding to the request, the Content Delivery System 107 provides the requested queue content to the Audience Device/Application. This requested content is intercepted by the Audience Administration System 106 as it passes through the Content Delivery System 107, and the requested content provided by the Content Delivery System 107, or any additional or alternate content management system, is analyzed by the Content Analysis and Insertion Program 900 at 908. At 909, Information regarding the requested queue content is stored in the Audience Administration system 106 to provide additional information regarding the Audience Member/Subscriber 104.

Next, the Audience Member/Subscriber 104 selects one or more of the content offers within their queue for viewing. For example, the Audience Member/Subscriber 104 accepts an offer to view an advertisement for a BMW™ automobile. The content request for the advertisement content is transmitted from the Audience Device/Application, detected at 910, stored at 911, and transmitted to the content provider. In response to this request, the Content Delivery System 107 provides the requested content to the Audience Member/Subscriber 104. The Audience Administration System 106 analyzes the requested content at 912. The content for display is transmitted to the Audience Device/Application and inserted into the data flow such that the requested content and the generated advertising content are transmitted to the Audience Member/Subscriber 104. Alternatively, the content data may be transmitted to the Set-Top-Box 207 and inserted by the Set-Top-Box 207 for Audience Member/Subscriber 104 viewing.

The display content may be generated in a variety of ways. For example, a library of display content may be previously stored and retrieved by the Content Delivery System 107 subject to Audience Member/Subscriber 104 or automated request. Alternatively, the Content Delivery System 107 may retrieve the advertising content from another entity based on specified criteria. For example, the Audience Administration System 106 may have determined that the Audience Member/Subscriber 104 is a fan of cars, a 'gearhead' and has determined there is a matched bid and offer for placement of advertising to this profile. In this case, the Content Delivery System 107 may request from a third party advertising provider advertising content relevant. Upon a completed view and a submitted Audience View Confirmation 404, the Audience Device/Application transmits the confirmation data to the Audience Administration System 106.

In one embodiment, the Audience Administration System 106 can further enhance the value of the advertisement service by dynamically correlating Audience Member/Subscribers 104(A-N) behaviors in different applications communicated via a variety of application specific protocols. One benefit of such correlation is the more accurate measurement of the conversion rate of an Audience Member/Subscriber 104 being shown an advertisement. This conversion rate is a critical indicator of the effectiveness of an advertising campaign and thus a critical factor deciding the rate an Audience Consumer 103 or an Audience Producer 102 would be willing to bid or offer for a specific Audience Member/Subscriber 104 profiles.

In some embodiments, the Audience Administration System 106 recognizes that a file or a streaming video downloaded by an Audience Member/Subscriber 104 is a television show. In response, the Content Delivery System 107 inserts into the file, or the stream, an advertisement that is to be displayed when the show is played. In addition, the Content Delivery System 107 recognizes that the show is being downloaded and shown concurrently. In such a case, the Content Delivery system 107 detects that a suitable buffer is available to the Audience Member/Subscriber 104 in which event it interrupts and buffers the stream of traffic for a period of time to allow it to seamlessly alter the content flow. Variations of the Set-Top-Box 207 also have memory buffers where movies, or portions of movies, or other content being flowed to the Audience Member/Subscriber 104 are stored. The Set-Top-Box 207 uses the interrupted time to display advertising in the streaming flow (e.g., in an IPTV service). For example, an Audience Member/Subscriber 104 streams a movie using the Netflix, Inc. (NASDAQ: NFLX) streaming service. In such an example, the Audience Member/Subscriber 104 elects to have advertisements inserted into the streamed content to offset the cost of the Netflix, Inc. (NASDAQ: NFLX) subscription. In this example, the advertisements may precede the streamed content, be inserted in the content during time periods defined by the Audience Member/Subscriber 104, may follow the entire content, or may be automatically inserted based on Content Delivery System 107 parameters.

V. Purchasing or Selling Audience Share and Display Space Access Rights

Registering to Participate

Figure 7A:
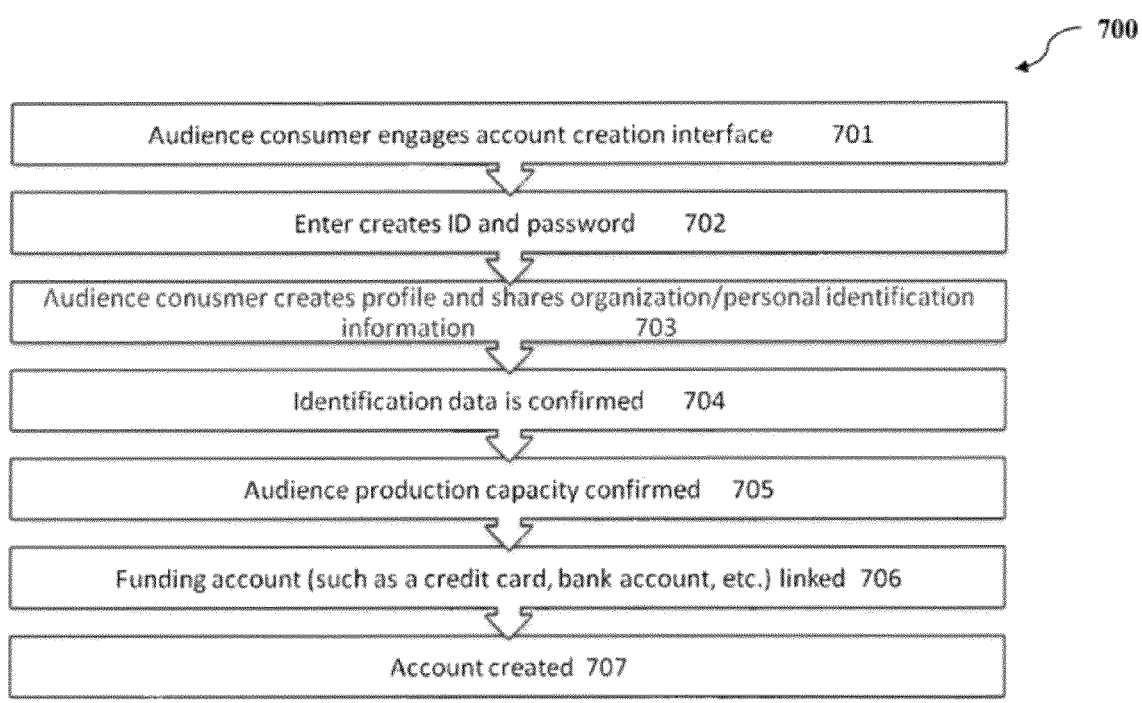
FIG. 7A is an overhead view of steps of a process flow for an audience consumer to set up an account for participation in binary advertising asset markets, in accordance with an embodiment of the present invention.

FIG. 7 is an illustration of the process flow 700 used by an organization to create an account for participation in the Profile-based Market 101, consistent with disclosed embodiments. In such embodiments, a market participant creates an account to establish itself as an Audience Consumer 103, an Audience Producer 104, or both.

In an embodiment, the Account Creation Interface 701 is implemented to create an Audience Consumer 103 account, an Audience Producer 104 account, or both. For example, using the disclosed embodiments, an organization may engage an Account Creation Interface 701 using any number of devices, including, but not limited to, mobile phones and personal computers, that interface with a network, such as the Internet, an intranet, a wired or wireless telephone network, or any additional or alternate network apparent to one of skill in the art.

In an embodiment, a market participant provides funding for use in transactions. Funding the account may be achieved with a direct deposit, credit card, or a variety of other financial payment methods. In such an embodiment, to enable the consumption of audiences, the Audience Consumer Content Repository 201 is linked to the Content Delivery System 107. As a condition to establishing an account, each Audience Consumer 103 and each Audience Producer 102 acknowledge they agree with the rules and regulations of the Profile-based Market 101 by executing an account agreement or its equivalent. Further, upon creation of Account 707 and linking of the Audience Consumer Content Repository 201, or of multiple repositories, to the audience consumer account, payment for audience share and participation in the Profile-based Market 101 is enabled.

For example, a small family owned pizzeria owner is looking to place a video advertisement in its community. Creating an account and funding it with a few hundred dollars from the business credit card, and linking the Audience Consumer 103 account to an advertisement the family posted on YouTube.com™, the pizzeria is able to target audience members solely within a two mile radius of their business and only pay for completed views, providing a more efficient way to buy advertising, as compared to, for example, conventional placement in local radio broadcast media. In another example, a large consumer packaged goods manufacturer is looking to place a series of highly targeted advertisements for one product across the nation. Creating an account and funding it with a few hundred thousand dollars from the business bank account, and linking the Audience Consumer 103 account to an advertisement the company posted using the Google Apps™ platform, the consumer packaged goods company is able to target audience members across the nation based on their individual demographic profiles and only pay for completed views, thereby providing a more efficient way to buy advertising, as compared to conventional placement in local print media.

Figure 8:
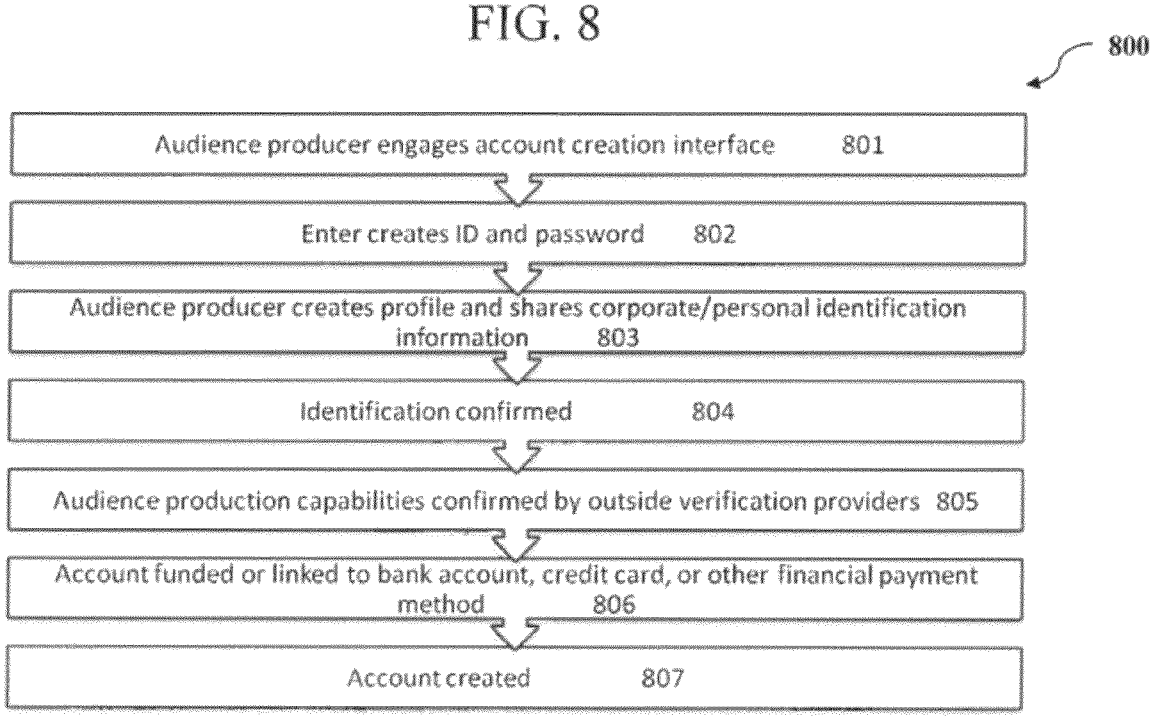
FIG. 8 is an overhead view of steps of a process flow for an audience producer to set up an account for participation in profile-based markets, in accordance with an embodiment of the present invention.

FIG. 8 is an illustration of the process flow 800 used by an organization to create an account for participation in Profile-based Market 101, consistent with disclosed embodiments. In such embodiments, a market participant can create an account to establish itself as an Audience Consumer 103, Audience Producer 104, or both.

In an embodiment, using the disclosed embodiments, organizations can engage an account creation interface 801 through any a number of devices, including, but not limited to, mobile phones and personal computers, that interface with a network, such as the Internet, an intranet, a wired or wireless telephone network, or any additional or alternate network apparent to one of skill in the art. For example, the interface 501 enables user to create an Audience Consumer 103 account, Audience Producer 104 account, or both.

In an embodiment, the audience production capabilities of the Audience Producer 102 are verified. In such an embodiment, the Audience Producer's 102 production capabilities is verified using data that independently attests to the capacity of the Audience Producer 102. Data stored within the Subscriber Database 1126, or from an outside data provider, indicates the number of participating audience members.

Exemplary Ordering Interface

Figures 15C, 15D:
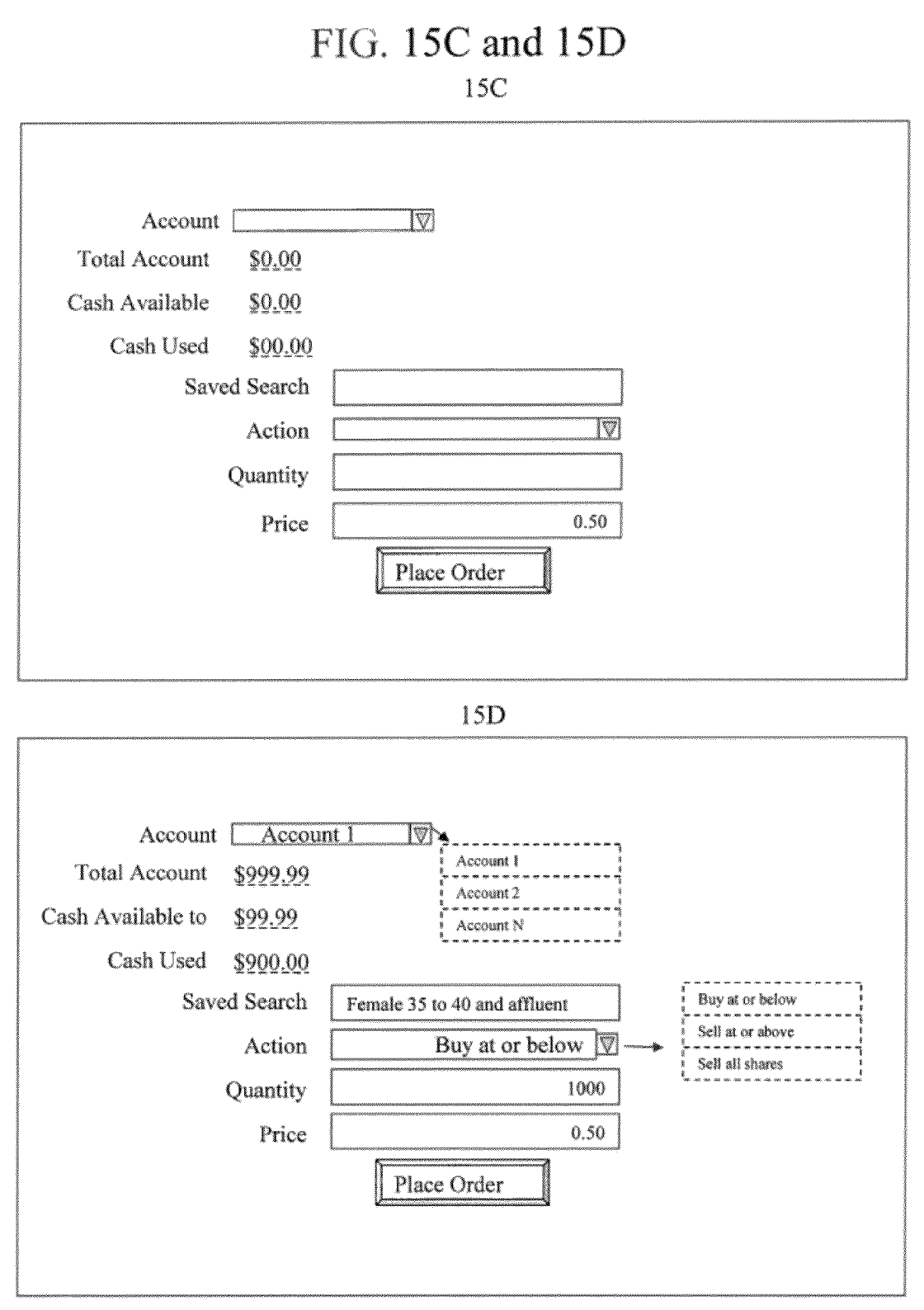

FIG. 15 illustrates a user interface for a computer based Brokerage System 111, consistent with disclosed embodiments. In FIG. 15, a user is presented with the exemplified interface 1500 (A&B) to process buy and sell orders using the Brokerage System 111 and transact within the Profile-based Market 101. To allow for individual users to have multiple accounts that are tradable from a single interface, the account menu 1503 and 1503B provides the user the ability to select within which account the transactions are to take place. Below, the user is presented with the total value of their account 1505, the cash available to invest 1507, and the cash used in pending transactions 1509. In an embodiment, an order is entered with the user inputting the symbol 1511 indicating what type or types of audience share or display space he is interested in transacting. The user indicates the type of action 1513 that he would like to transact; a buy, sell, or sell all shares order types (1513B). The user then indicates the quantity 1515 of shares or display space units that he would like to buy or sell. The quantity 1515 can be denominated in dollars, other currency, or any additional or alternate unit apparent to one of ordinary skill in the relevant art. Once each of the aforementioned fields has the required data to define the transaction, the user submits the order to the market by clicking, touching, or otherwise activating the Place Order 1523 field.

Order Matching

Figure 3:
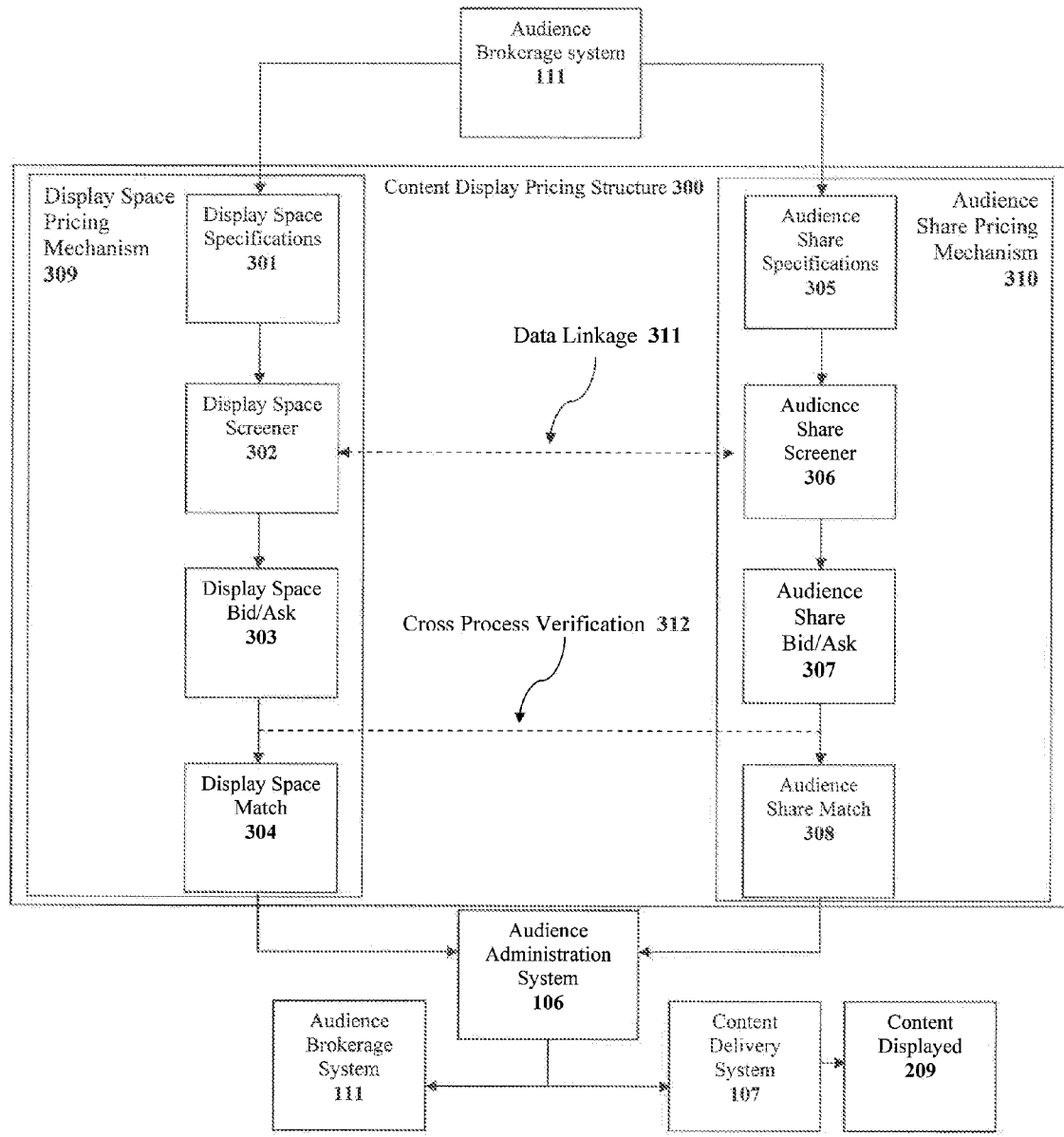
FIG. 3 is an overhead view of steps of a process flow for display content purchase and placement using a binary advertising asset market, in accordance with an embodiment of the present invention.

FIG. 3 shows an example of the mechanism for content placement using Brokerage System 111, consistent with disclosed embodiments. The Content Display Pricing Structure 300 enables an audience share purchaser to display content exclusively to the target audience. The disaggregation of the Audience Share Pricing Mechanism 310 and the Display Space Pricing Mechanism 309 enables the creation of the Profile-based Market 101.

in such an embodiment, by way of example, and without limitation, using the Content Display Pricing Mechanism 300, the Audience Consumer 103 uses the Audience Matching System 108 to define the Audience Share Specifications 305 that it is seeking to purchase, discovers the available inventory and asking price(s) of display, profiles, or both using the Audience Share Screener 306, and enters an Audience Share Bid/Ask 307. Data Linkage 311 between the Display Space Screener 302 and the Audience Share Screener 306 allows the Audience Consumer 103 to ensure that both audience and display are available. Orders may be specified as co-contingent such that the execution of a matched display space access rights order is not executed unless a corresponding profile access right is also executed or such that the execution of a matched profile access rights order is not executed unless a corresponding display space access right is also executed. For simplicity purposes, a single order entry screen may be used comprising both types of access rights.

In such an embodiment, the Cross Process Verification 312 is used to match the accepted Display Space Bid/Ask 303 and accepted Audience Share Bid/Ask 307, the purchase by the Audience Consumer 103 is executed and sent to the Audience Administration System 106 for storage of data, units are delivered in exchange concurrent for payment or in some instance payment in the future, units of the audience inventory are released to the Content Delivery System 107, and final Display Content 209 is transmitted. In such an embodiment, audience share delivered to the Audience Consumer 103 are released for real-time fulfillment by the Content Delivery System 107/or held in an account of the Audience Consumer 103 for later fulfillment. In such an embodiment, by way of example, and without limitation, the Audience Consumer 103 enters an Audience Share Bid/Ask 307 for 10,000 profiles of a certain type and a corresponding Display Space Bid/Ask 303 for 10,000 30-second display slots. For example, the implementation described above might be used by a consumer packaged goods company (e.g., Audience Consumer 103) seeking to place a 30 second video advertisement targeted only at 5,000 married females, age 31 to 40, with two children all living in zip code 10075, thus avoiding inefficient costs of traditional television advertising and enabling it to only target markets or broadcasts that attract its target demographic with granular data on an individual viewer. In another embodiment, a publisher may enter an order to sell access to display space or profile access rights prior to the time an advertiser enters its bids to either of said access rights. In a further embodiment, a publisher may have one or more queues representing one or more different profiles.

In accordance with embodiments of the present invention, an order for both profile and display, or an order comprised of both, is entered and, subject to a match, is executed when content is delivered to an audience member or publisher queue. Delivery to the publisher queue triggers a settlement opportunity in embodiments of the present invention, in which case settlement occurs subject to an audience member viewing content with or without confirmation.

In accordance with embodiments of the present invention, if a settlement opportunity is not converted into a settlement, then one or more individuals with the same profile characteristics may be presented with settlement opportunities in a continuous manner during the publishing period defined by the contract until such time as the first settlement occurs.

For clarification purposes, for future embodiments and each embodiment where Bid/Ask 307 and Bid/Ask 303 are referenced, Bid/Ask 307 and Bid/Ask 303 are presented by way of non-limiting example, and should be interpreted by the reader to mean one or both sides of an order, Bid (buy side) or Ask (sell side), depending on the context in which it is used.

However, the disclosed embodiments are not limited to such configurations, and in additional embodiments, personalized advertising or other content may be delivered to any human interface device, without departing from the spirit or scope of the disclosed embodiments. Therefore, a comprehensive activity profile can be developed for each Audience Member/Subscriber 104 of the Profile-based Market 101, which, in an embodiment, can be used to target advertisements, and other relevant content, to an Audience Member/Subscriber 104 with pinpoint accuracy. In such an embodiment, the activity profile can direct Audience Consumer 103 to consume audience share that the Audience Consumer 103 is likely to find valuable.

In an additional embodiment, the Audience Administration System 106 captures and stores pricing and other executed matched data for the creation of reports to market participants including, but not limited to, Audience Members/Subscribers 104(A-N), Audience Consumers 103(A-N), Audience Producers 102(A-N), and Alternative Market Participant 105. In such an embodiment, by way of example, and without limitation, monthly statements to market participants are created for the purpose of reporting transactions, pricing, commissions, if any, account status, and other relevant data. In such an embodiment, by way of example, and without limitation, transactions and account status information are accessed in real-time by logging into an account, using a Personal Computer 212, Mobile Phone 211, or any additional or alternate type of device, without departing from the spirit or scope of the disclosed embodiments.

In an embodiment, by way of example and without limitation, time stamping and storage of time-stamp data is recorded, and relevant reports may be available from time-to-time for purposes of compliance and other purposes. For example, the placement of orders may be time-stamped, matched orders may be time-stamped, queue content insertions may be time-stamped, view confirmations may be time-stamped, or content rating may be time stamped.

In accordance with embodiments of the present invention, a settlement ratio is a factor representing the likelihood of a settlement opportunity converting to a settlement, relative to a specific profile. This settlement ratio is understood, in accordance with embodiments of the present invention, to mean a calculation of a value representing the percentage of executed orders that are likely to result in a confirmed view at a given price, based on historical data.

In accordance with embodiments of the present invention, content placement opportunities also referred to as available float (i.e., inventory of display space) is determined by the product of the number of profiles matching certain parameters multiplied by the aggregate number of available display spaces available in the queue of the profiles.

In an embodiment, an Alternative Market Participant 105 invests in audience share that he believes is undervalued, or alternatively, overvalued. In such an embodiment, by way of example, and without limitation, the Alternative Market Participant 105 defines the bid parameters using the Audience Share Specifications 305, discovers the available inventory and visible asking price(s) of audience share offered using the Audience Share Screener 306, and places an Audience Share Bid/Ask 307 using the Brokerage System 111. In such an embodiment, the Audience Share Bid/Ask 307 is matched and the Audience Share Transaction 308 is thus executed. Furthermore, the Cross Process Verification 312 is bypassed and the audience share is delivered to the Alternative Market Participant 105 account, in exchange for payment, in the Brokerage System 111, with the appropriate data collected and stored, for reporting and compliance, in the Audience Administration System 106.

In an additional embodiment, the Audience Consumer 103 match of Audience Share Bid/Ask 307 is subject to the Audience Consumer 103 having funds on deposit in a linked bank account where the funds on account at least equal the value of the executed match, or other types of financial payment processes where the payment is made, apparent to one skilled in the art without departing from the spirit or scope of the disclosed embodiments.

In an embodiment, a magazine publisher matches their reader profile data with Audience Consumer 103 bids for Audience Member/Subscriber 104 profiles, in the Profile-based Market 101, to place advertisement in the magazine. In such an embodiment, the publisher may sell specific profile and display space units, such that each reader is provided with a personalized magazine where the advertising content of the magazine is targeted at that individual using the profile matching capabilities of the Profile-based Market 101, where said ads may or may not have embedded confirmation codes (not shown in figure).

In an embodiment, a display space access right symbol and a profile access right symbol may be entered for trading but combined by the Audience Brokerage System 111 into a single buy or sell order. In such an embodiment, the display space access right and profile access right may be priced separately, but traded together in a single order.

Exemplary Matching Implementation

Figure 11:
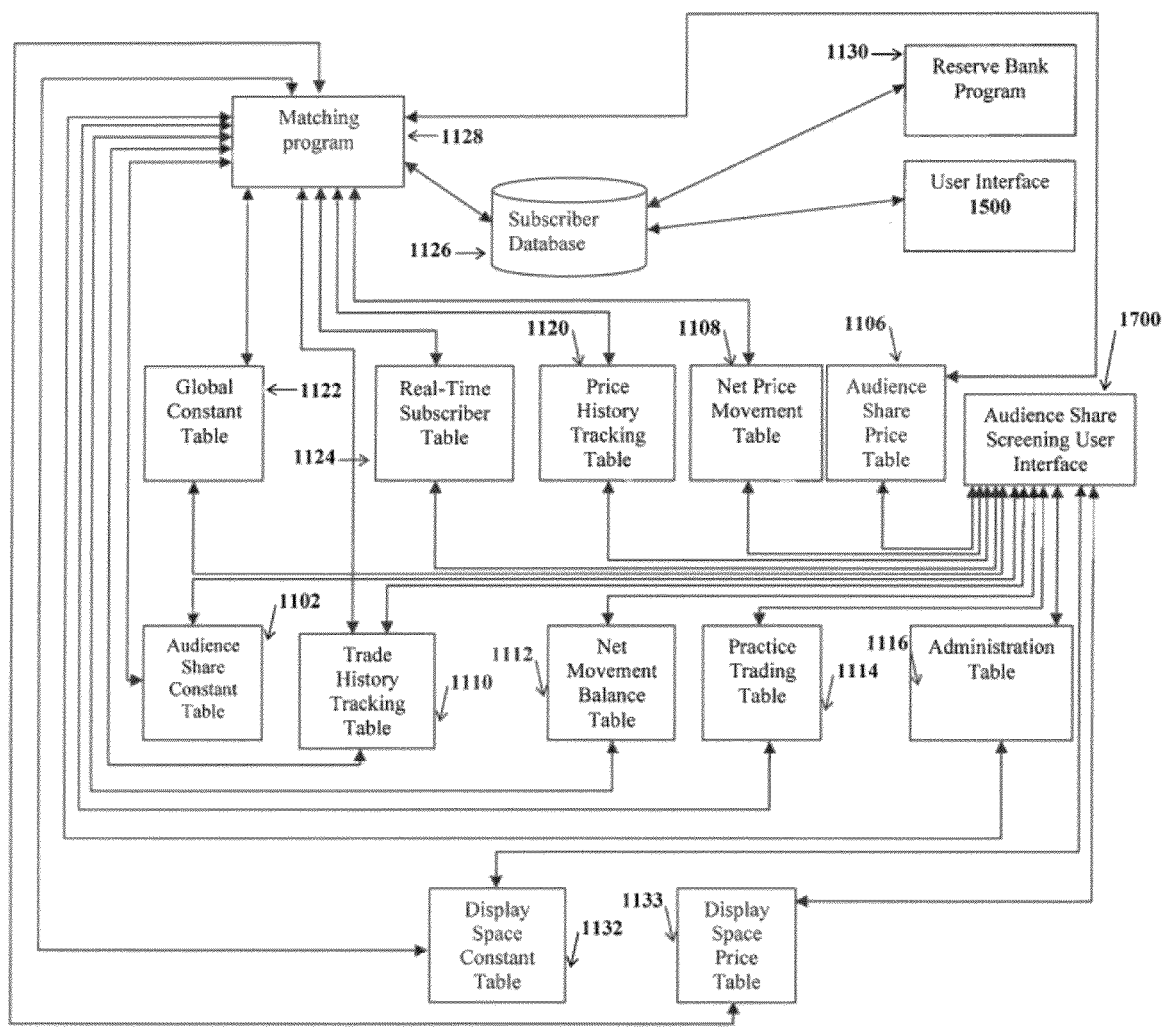
FIG. 11 depicts features of an exemplary audience market administration system, in accordance with an embodiment of the present invention.

FIG. 11 illustrates a plurality of tables that may be included within the Audience Matching System 108, according to disclosed embodiment. For example, the plurality of tables may include, but are not limited to, a Global Constant Table 1122, Real-Time Subscriber Table 1124, Price History Tracking Table 1120, Net Price Movement Table 1108, Audience Share Price Table 1106, Audience Share Constant Table 1102, Trade History Tracking Table 1110, Net Price Movement Balance Table, 1112, Practice Trading Table 1114, Administration Table 1116, Display Space Constant Table 1132, Display Space Price Table 1133, and a User Database 1126. Connecting with these tables are the Matching Program 1128, which passes economic and price control data among all of the tables, a Reserve Bank Program 1130, which passes economic control data among all of the tables, and the User Interface 1500, which passes trade and portfolio information among itself and the Subscriber Database 1126. Also interfaced is the Audience Share Screening User Interface 1700. In an embodiment, rights to access profile-based markets and display content to select profiles are implemented by accepting bids and offers wherein said bids and offers are from a set of prices specified relative to said profiles, said display space, or both and matching said bids and offers.

Further, although described in terms of a number of exemplary tables and programs, the discussed embodiments are not limited to such exemplary configurations. In additional embodiments, the plurality of tables in FIG. 11 may include any additional or alternate table and program apparent to one of skill in the art, without departing from the spirit or scope of the disclosed embodiments.

Figure 12:
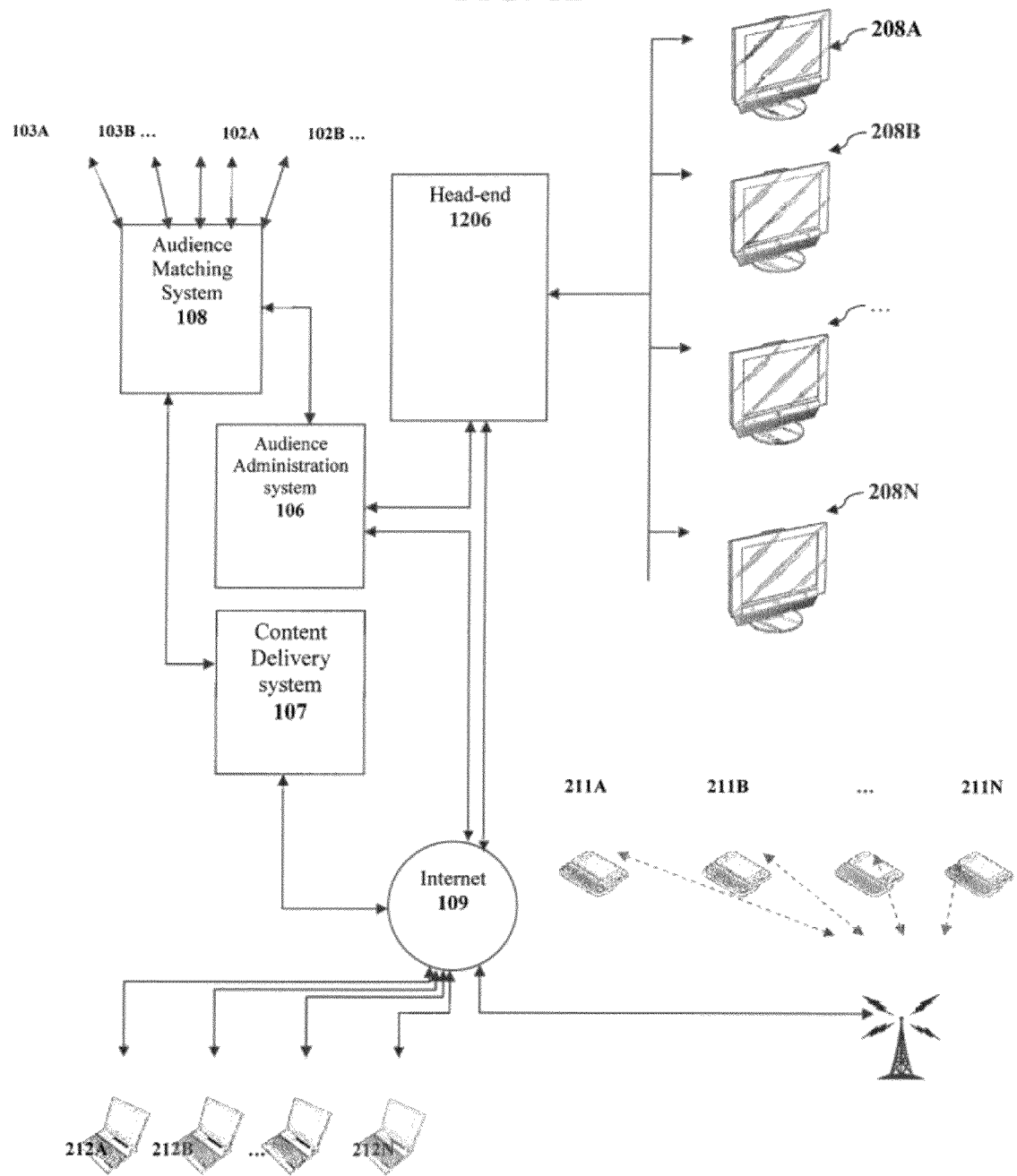
FIG. 12 illustrates features of a system for a real-time content placement system, in accordance with an embodiment of the present invention.

FIG. 12 illustrates a combination of systems and processes that provide a Subscriber Matching Program 1128 within the Audience Matching System 108, for use in matching orders in real time, or otherwise, consistent with disclosed embodiments. In such embodiments, the Subscriber Matching Program 1128 is accessible by a plurality of Audience Consumers 103(A-N) and Audience Producers 102(A-N). Access may be provided using, for example, the Audience Share Trading User Interface (FIG. 15A, 15B, 15C, or 15D). The Subscriber Matching Program 1128 enables Audience Consumers 103(A-N) to bid on Audience Members/Subscribers 104(A-N) profiles and display space on one or more broadcast channels. The Subscriber Matching Program 1128 allows Audience Consumers 103(A-N) to upload content using the Content Delivery System 107, such that said content may be inserted into broadcast content or the Content Queue 1812 of the Audience Member/Subscriber 104.

In another embodiment, Audience Consumers 103(A-N) bid for Audience Members/Subscribers 104(A-N) profiles using data, accessed from the Audience Administration System 106, indicating devices (Television 208, a Personal Computer 212, a Mobile Phone 211, a Tablet Computer 213, an eReader 214, or other device) of active Audience Members/Subscribers 104(A-N). For example, an Audience Consumer 103 seeking immediate advertisement placement, for an upcoming event which has had poor ticket sales, would like to deeply discount the price of tickets in inventory on short notice to fill the venue. To achieve this objective, the Audience Consumer 103 uses stored advertisements in the Content Delivery System 107, or Audience Consumer Content Repository 201, and the Audience Share Trading User Interface, FIG. 15, to bid for audience views from Audience Members/Subscribers 104(A-N) concurrently logged into the Audience Administration System 106, to transmit for delivery numerous locally driven ads in a timely manner. This transaction enables the Audience Consumer 103 to immediately place advertising, across all devices (a Television 208, a Personal Computer 212, a Mobile Phone 211, a Tablet Computer 213, eReader 214, or other device) based on specific audience criteria, to drive timely awareness of its discounted ticket inventory.

Figure 16:
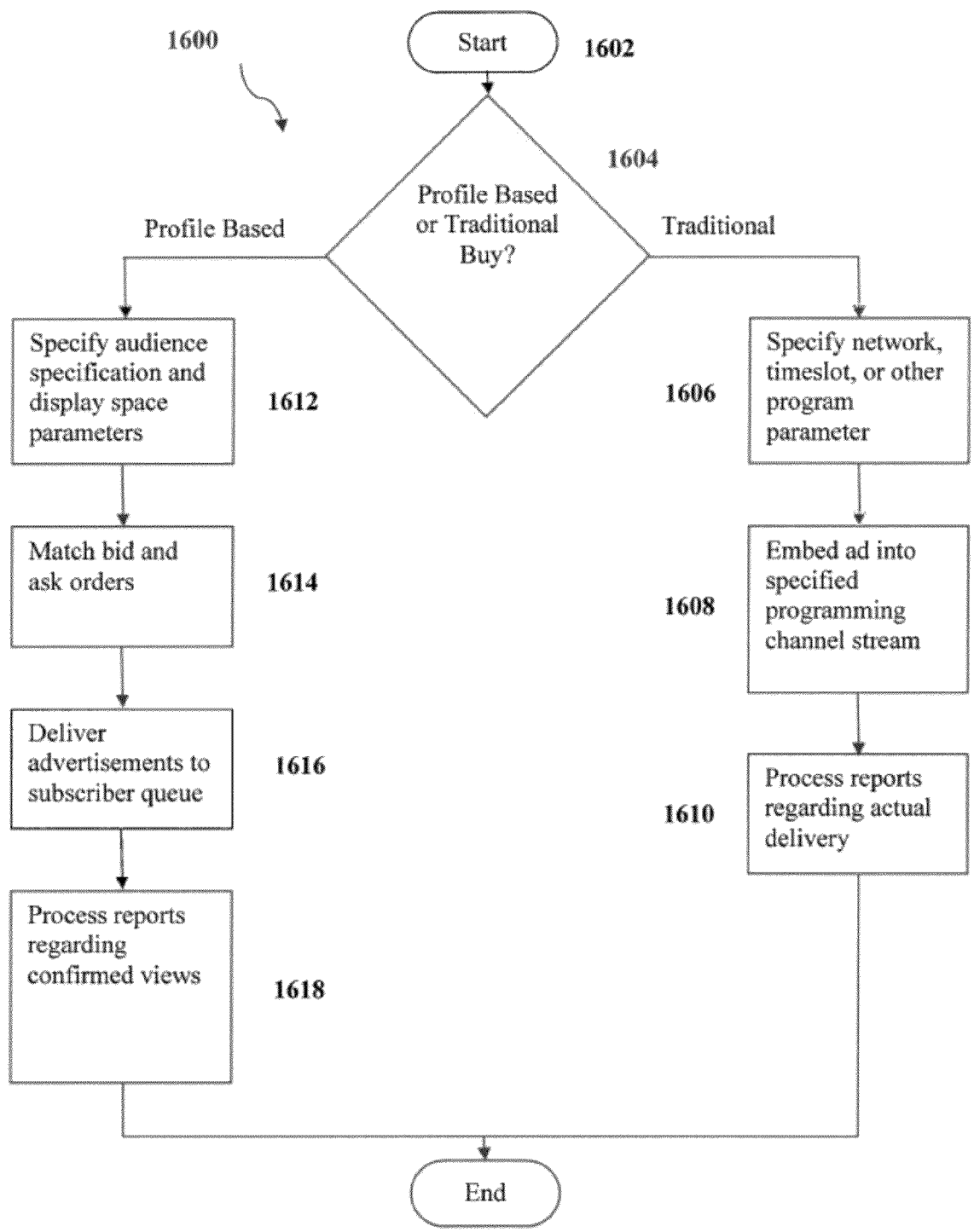
FIG. 16 is an overhead view of steps of a process flow for integrating profile-based advertising placement in a hybrid environment for advertising placement, in accordance with an embodiment of the present invention.

FIG. 16 is a flow chart illustrating advertising placement process flow for integrating profile-based advertising placement in a hybrid environment 1600, consistent with disclosed embodiments. Audience Consumer 103 (or agent thereof) initiates the illustrated process 1600 by accessing a user interface in step 1602, e.g., the interface of FIG. 15 described above. Alternatively, an Audience Consumer 103 can work with the sales department or other personnel of a system operator or other party who accesses such a platform. In an additional embodiment, an automated buying system may be employed to interface with such a platform via a system-to-system interface. This platform may provide a graphical user interface, e.g., as described above in reference to FIG. 15, by which an Audience Consumer 103 designs a dissemination strategy (e.g., an ad campaign) and enters into a corresponding contract for purchase of audience share for his content. The Audience Consumer 103 then uses the interface in step 1604 to execute either a traditional buy strategy, or a targeted audience profile-based strategy. This is accomplished by selecting symbols 1511 indicative of a time slot based audience share definition. In the case of a time-slot buy strategy, the Audience Consumer 103 can then use the user interface to specify in step 1606 a network and time-slot, or other program parameter identifying the desired air times and frequency for the audience. Thus, for example, an Audience Consumer 103 airs the content in connection with specifically identified programs believed to have an appropriate audience. In addition, the Audience Consumer 103 specifies that the content is to appear during the first break or during multiple breaks during the program. The Audience Consumer 103 further specifies that the Content 1814 is to be, for example, aired during the first spot within the break, the last spot within the break or otherwise designate the specific Content 1814 delivery slot.

Once the time-slots for the content have thus been specified, the Content Delivery System 107 transmits in step 1608 the content to be presented as a portion of or in conjunction with the specified programming stream. The content is then available to be consumed by all audience members of the programming channel. The Content Delivery System 107 subsequently reports to the Audience Consumer 103 in step 1610, based on Audience Members/Subscribers 104(A-N) viewer confirmations and/or ratings.

In an embodiment, in the case of audience share matched orders, the Audience Consumer 103 accesses the user interface as described above in reference to FIG. 15A-D to specify audience classification and other dissemination parameters in step 1612. In such an embodiment, audience classification parameters comprise at least one of gender, age range, income range, geographical location, lifestyle interest or other information of a targeted audience. Additional dissemination parameters may include, but are not limited to, parameters relating to delivery time, frequency, audience size, or any additional or alternate information apparent to one of skill in the art and useful to define a target audience. Combinations of parameters may also be specified. For example, an Audience Consumer 103 may specify an audience share of 100,000 profiles in a particular demographic group and further specify that the Content 1814 is not placed in the Content Queue 1814 of any Audience Member/Subscriber 104 who has already received the asset a predetermined number of times.

In an embodiment, the Audience Administration System 106 may be operative to target appropriate Audience Members/Subscribers 104(A-N). For example, Audience Administration System 106 may target only selected Audience Members/Subscribers 104(A-N) of a major network. Additionally or alternatively, Audience Administration System 106 may engage Audience Members/Subscribers 104(A-N) across multiple networks in step 1614, to satisfy the audience bid specifications. For example, selected Audience Members/Subscribers 104(A-N) from multiple programming channels receive content within a designated time period, in order to provide an audience of the desired size, where the audience is composed of audience members matching the desired audience classification. The user interface may estimate the target universe based on the audience classification and dissemination parameters such that the asset provider receives an indication of the likely delivery timeframe and/or audience size.

In an embodiment, the Audience Matching System 108 is accessed to implement time of day display. In such an embodiment, a content provider specifies audience classification parameters for a target audience and further specifies a time and channel for airing of the content. In such an embodiment, Audience Members/Subscribers 104(A-N) tuned to that channel and confirms viewing the content based on the process as described herein. Also, Audience Consumers 103 (A-N) designate audience classification parameters and a run time or time range, but not the programming channel. In this embodiment, significant flexibility is enabled for designing a dissemination strategy. It is also possible for a network operator to disable some of these strategy options, e.g., for business reasons, such as preference to make options inoperable on the Audience Producer 102 platform.

In an embodiment, the Content Delivery System 107 is operative to provide the content as an option during one or more time-slots of one or more View Times 1312. In the case of spot optimization, multiple content options are disseminated together with information identifying the target audience so that the most appropriate asset can be transmitted to an individual Audience Member/Subscriber 104. In the case of audience aggregation, the content may be provided as an option in connection with multiple breaks on multiple programming channels. The system then receives and processes (1618) reports, regarding actual view confirmation by the Audience Member/Subscriber 104, and information indicating how well the content was received as measured by the optional audience member rating process. It will thus be appreciated that an audience profile-based delivery paradigm is defined by which advertisements or other content are targeted to specific Audience Members/Subscribers 104(A-N), rather than being associated with particular programs. The audience profile-based delivery paradigm may, in an embodiment, enable both better targeting of individual Audience Members/Subscribers 104(A-N) for a given program and improved reach to target Audience Members/Subscribers 104 (A-N) on low market share networks with cost transparency and a riskless cost to display.

From the foregoing, it will be appreciated that various steps in the messaging sequence are directed to matching Audience Members/Subscribers 104(A-N) to Audience Consumers 103 (A-N), based on classification parameters, allowing for "goodness of fit" determinations based on such matching, or otherwise depending on communicating audience classification information across the network. In exemplary embodiments, such messaging may be implemented in a manner that is respectful of user privacy concerns and relevant regulatory regimes

VI. Symbology

In an embodiment, a wide range of profile-defined instruments, matching techniques, and processes may be accommodated with order formats having a common element of subscriber profile. By way of example, without limitation, one matching mechanism and process to be accommodated by the disclosed embodiments may be audience share based upon similar profiles of subscribers that permits settlement of buying and selling rights for placement, in real-time or near real-time, or in the future. Each of these matching mechanisms and processes may be characterized by settlement terms, that may be determined by the subscriber or audience member profile; location of placement based on geography, time, physical location within media, or device; time of placement; and/or some other variable or some combination of said variables, that sets the transaction specifications, once the one or more determining variables have been specified. Transactions may have whole units traded in currency, with a special symbol, with or without any number of formatted extensions or prefixes or both, with no limit on character count or special symbol, to designate the rights instrument, and in some instances whole and fractional currency units may be used. In an alternative embodiment, standardized symbology may not be required to place the order.

In an embodiment, subject to a match, the right may be traded anytime throughout the day, 24 hours each day, although a symbol might represent a single trade time for that day, e.g., noon, allowing all market participants to transact around a specific time. The aim of using a single trading time, most probably only in an alternative market, may be to ensure that market participants may realize executed orders with improved price discovery.

In an embodiment, order entry systems and quotation standards are utilized to reflect a price at which rights to access and display content to audience members may be exchanged, and the size of the position to be purchased or sold. If a unit is available to trade for around $0.50, the bid might be $0.49 and the offer $0.51. The quotation structure may also reflects the respective quantities bid (e.g. 1,000 profiles) for and offered (e.g. 500 profiles). There is no limitation on the number and type of characters that can be accommodated in various data fields of a quotation or order entry system. It can, therefore, be useful to use a root symbol which might have, in a typical case, three or four characters and an extension or prefix or both, consisting of any number of additional characters, which describe the nature of the instrument and a profile being traded in more detail and/or the basis for trading, i.e., delivery of audience in a designated period such as the future or real-time.

The symbol of a certain demographic segment, e.g., male Hispanics between the age of 21 and 30 years of age, HIS.2130.MR, might be followed by a decimal point and the letters MR for males, real- or near real-time trading. An extension with letters FF might represent females and a future delivery period. These extensions might be further modified by changing extensions, in any number of ways, to represent the intended right. Such conventions may accommodate a range of innovative order variations, with a readily understood symbology, useful to market participants.

Further, by way of example, and without limitation, the symbol for a certain category of display space, a 30 second television advertisement during a broadcast, in the 8 pm to 9 pm time slot, may be represented by the symbol V.30.T.20-21. Extensions may be modified in any number of ways, to represent the intended right. Such conventions can accommodate a range of innovative order variations, with a readily understood symbology, useful to market participants. In an embodiment, the Profile-base market may use separate symbols for profile and display space or a single symbol combining both profile and display characteristics.

The following list shows some sample symbology and trading variations for various types of transactions:

TABLE 1

Exemplary Symbology for Audience Shares

| Sample Symbols | Audience Representation |
|---|---|
| HIS.2130.MR | Hispanic |
| | Ages 21 to 30 |
| | Males |
| | Real-time display |
| HIS.2130.FF | Hispanic |
| | Ages 21 to 30 |
| | Female |
| | Future display |
| MR.AA.2130 | African American |
| | Ages 21 to 30 |
| | Males |
| | Real-time display |
| AA.FR.4150 | African American |
| | Ages 21 to 30 |
| | Females |
| | Real-time display |
| HIS.2130MR.DIS | Hispanic |
| | Ages 21 to 30 |
| | Males |
| | Real-time display |
| | Display |
| CAU.5160.MR10075 | Caucasian |
| | Ages 51 to 60 |
| | Males |
| | Real-time display |
| | Zip code 10075 |

TABLE 2

Exemplary Symbology for Display Spaces

| Sample Symbols | Display Space Representation |
|---|---|
| V.30.T.20-21 | 30 Second |
| | Video Advertisement |
| | Television |
| | 8 pm time slot |
| B.I.TP | Banner Ad |
| | Internet Advertisement |
| | Top of page |
| P.FP.2 | Full Page |
| | Print Advertisement |
| | 2$^{nd}$ Page |

In accordance with an additional embodiment of the present invention, symbology may be used to denote household profiles. These are useful for the purpose of targeting a household for advertisements such as those delivered on a television, where the household comprises one or more people.

The disclosed embodiments are not limited to such exemplary symbology and variations. In additional embodiments, the disclosed processes may incorporate any additional or alternate symbology or set of variations that are apparent to one of skill in the art and appropriate to the order entry systems and participants.

Further, in additional embodiments, the profile-based market may not need use of symbols to represent the audience profiles that are transacted within the market. In such embodiments, profile-based market participants may use an audience share screening user interface to identify the profiles considered appropriate to bid for or offer. To ease the process of repetitive profile purchases or sales, without the use of symbols, profile-based market participants may save and may re-run their searches within an audience share screening user interface. Since there are multiple facets to a single individual's profile, multiple symbols can be used to define different profiles, which ultimately may represent a single unique individual.

In an embodiment, an Audience Consumer 103 enters an order for 1000 units of a profile access right described by a symbol. The symbol represents a number of profile attributes including, by way of non-limiting example, age, gender, and location. With defined values for age, gender, and location within the symbology, a set of all available inventory is defined. By entering this order, the Audience Consumer 103 is seeking to purchase the rights for all of or a portion of the entire set of available inventory. In such an embodiment the Audience Matching System 108 recognizes that the aforementioned order placed by the audience consumer represents a set which can also be defined as a subset or a greater set (superset) represented by a smaller number of variables. In such an embodiment the age, gender, and location set my be defined as a subset of the sets (i) age (ii) gender (iii) location (iv) age and gender (v) age and location (vi) gender and location. In such an embodiment, the Audience Matching System 108 will match all profiles meeting the criteria set forth in the Audience Consumer's 103 aforementioned order.

In accordance with an embodiment of the present invention, the Audience Matching System 108 may not simply match buy and sell orders on a one-to-one basis using identical buy-order symbols and sell-order symbols, but rather the Audience Matching System 108 may match all profiles meeting the criteria set forth in the Audience Consumer's 103 aforementioned order to any profile in the set defined by the symbol used for the buy-order or other supersets defined by symbols used for other sell-orders. In such an embodiment, the process for multi-symbol matching using sets, subsets, supersets, union sets, intersection sets, and powers sets is applied in both the buying and selling processes as apparent to one skilled in the art without departing from the spirit or scope of the disclosed embodiments.

VII. Order Book

Figure 21A:
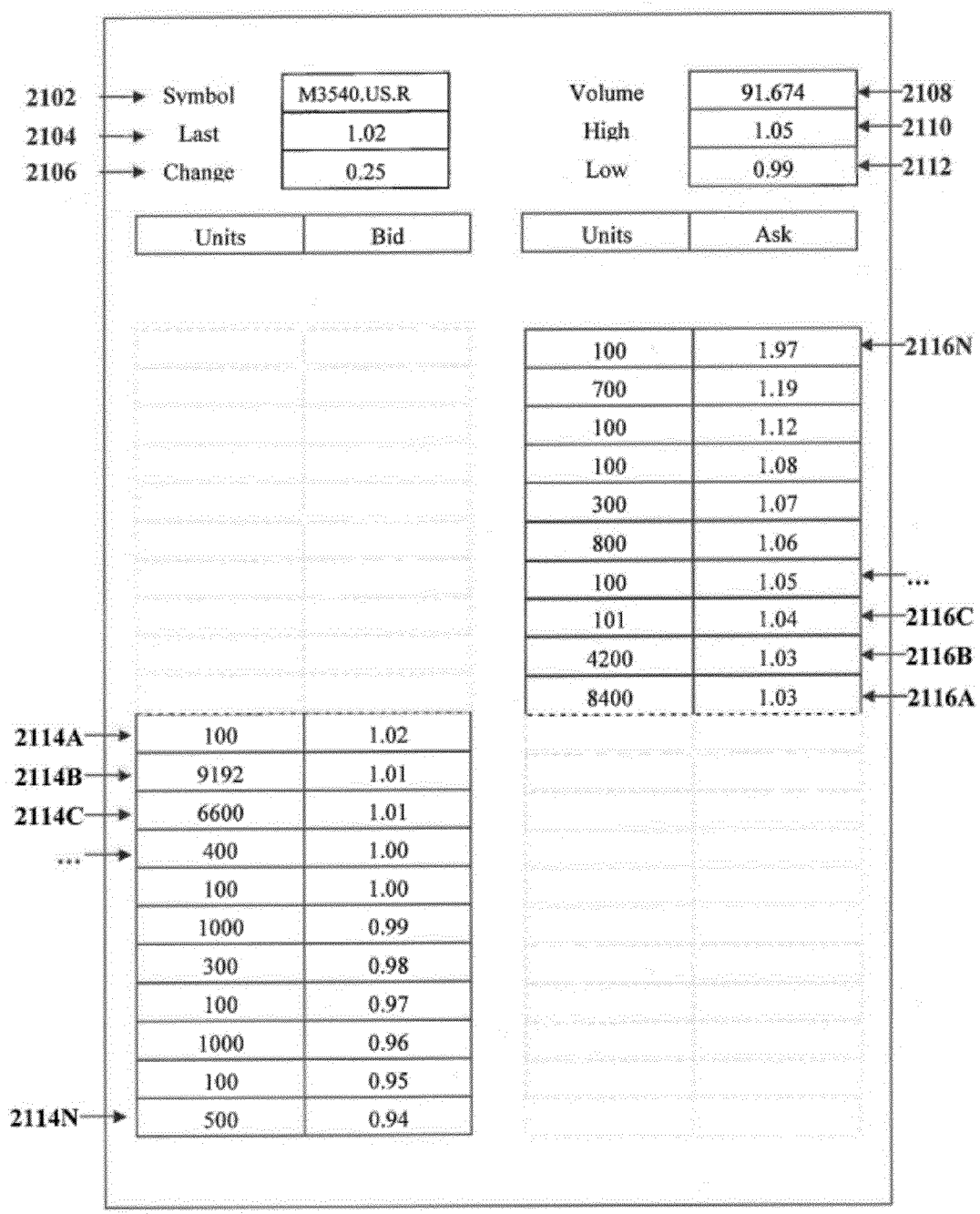
FIG. 21A depicts features of an exemplary user interface for an electronic order book using matching symbols, in accordance with an embodiment of the present invention.

FIG. 21A depicts features of an exemplary user interface for an electronic order book using symbology, consistent with disclosed embodiments. The user interface is composed of numerous descriptive data about the audience share, a group of Audience Members/Subscribers 104(A-N), available within the Audience Matching System 108. FIG. 21A illustrates an order book of data describing audience share defined by a constant Symbol 2102. The user interface in FIG. 21A provides data indicating the price of the last matched bid/ask in the Last 2104 field, the change in the price of the profiles indicated in the Change 2106 field, the number of profile units matched in the Volume 2108 field, the highest price paid during that day in the High 2110 field, the lowest price paid during that day in the Low 2112 field, a list of Unmatched Bids 2114 (A-N) for the profiles described by the Symbol 2102, a list of Unmatched Asks 2116 (A-N) for the profiles described by the Symbol 2102. It should apparent to one skilled in the art, that there may be other method to convey symbology, volume, inventory, and/or price, without departing from the spirit or scope of the disclosed embodiments.

Figure 21B:
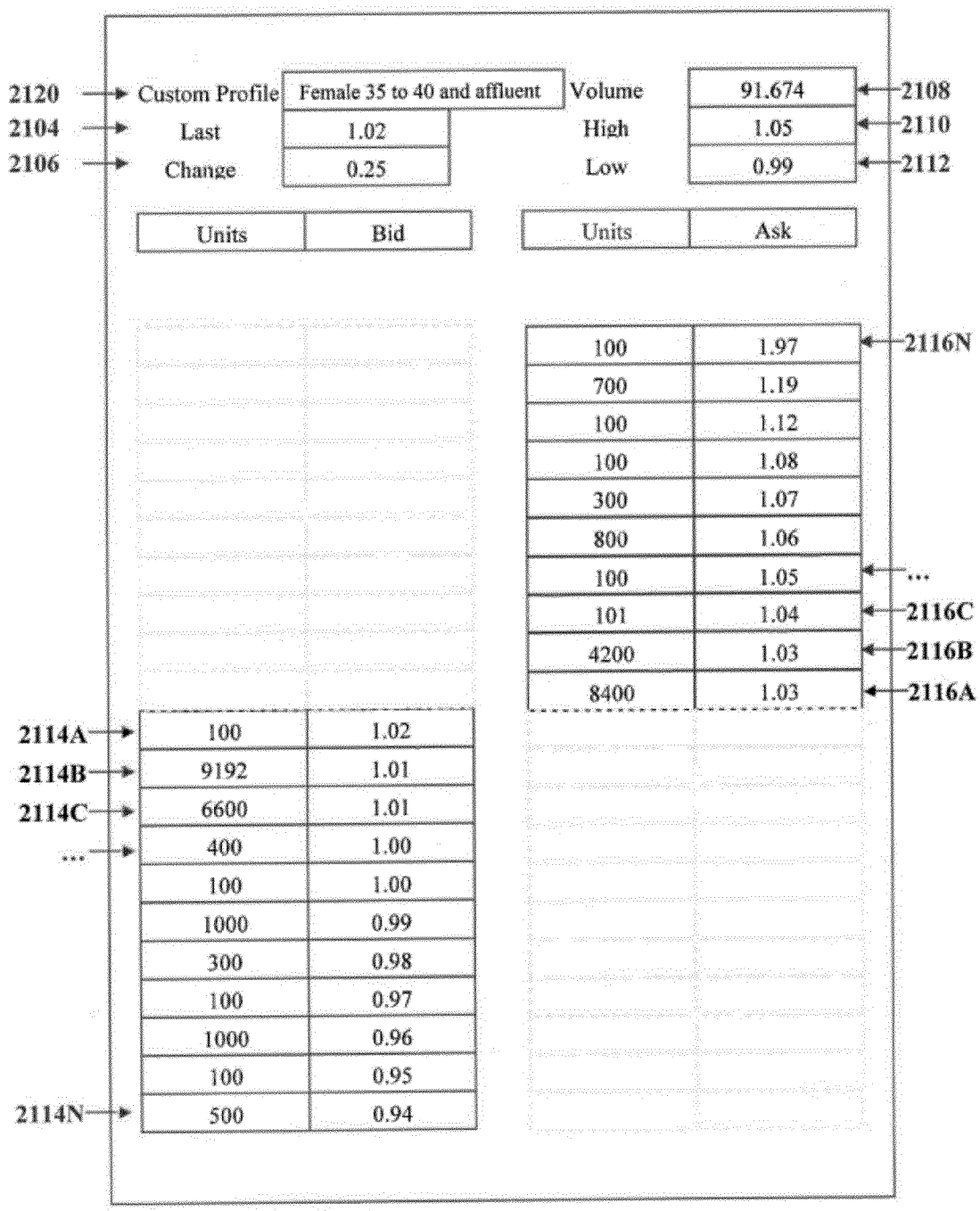
FIG. 21B depicts features of an exemplary user interface for an electronic order book using custom profiles identified in a previously saved search, in accordance with an embodiment of the present invention.

FIG. 21B depicts features of an exemplary user interface for an electronic order book using custom profiles identified in a previously saved search using the Audience Share Screener 306, consistent with disclosed embodiments. The user interface is composed of one or more elements of descriptive data about the audience share, a group of Audience Members/Subscribers 104 (A-N), available within the Audience Matching System 108. FIG. 21B illustrates an order book of data describing audience share defined by a Custom Profile 2120. The user interface in FIG. 21A provides data indicating the price of the last matched bid/ask in the Last 2104 field, the change in the price of the profiles indicated in the Change 2106 field, the number of profile units matched in the Volume 2108 field, the highest price paid during that day in the High 2110 field, the lowest price paid during that day in the Low 2112 field, a list of Unmatched Bids 2114 (A-N) for the profiles described by the Custom Profile 2120, a list of Unmatched Asks 2116 (A-N) for the profiles described by the Custom Profile 2120.

Figure 25A:
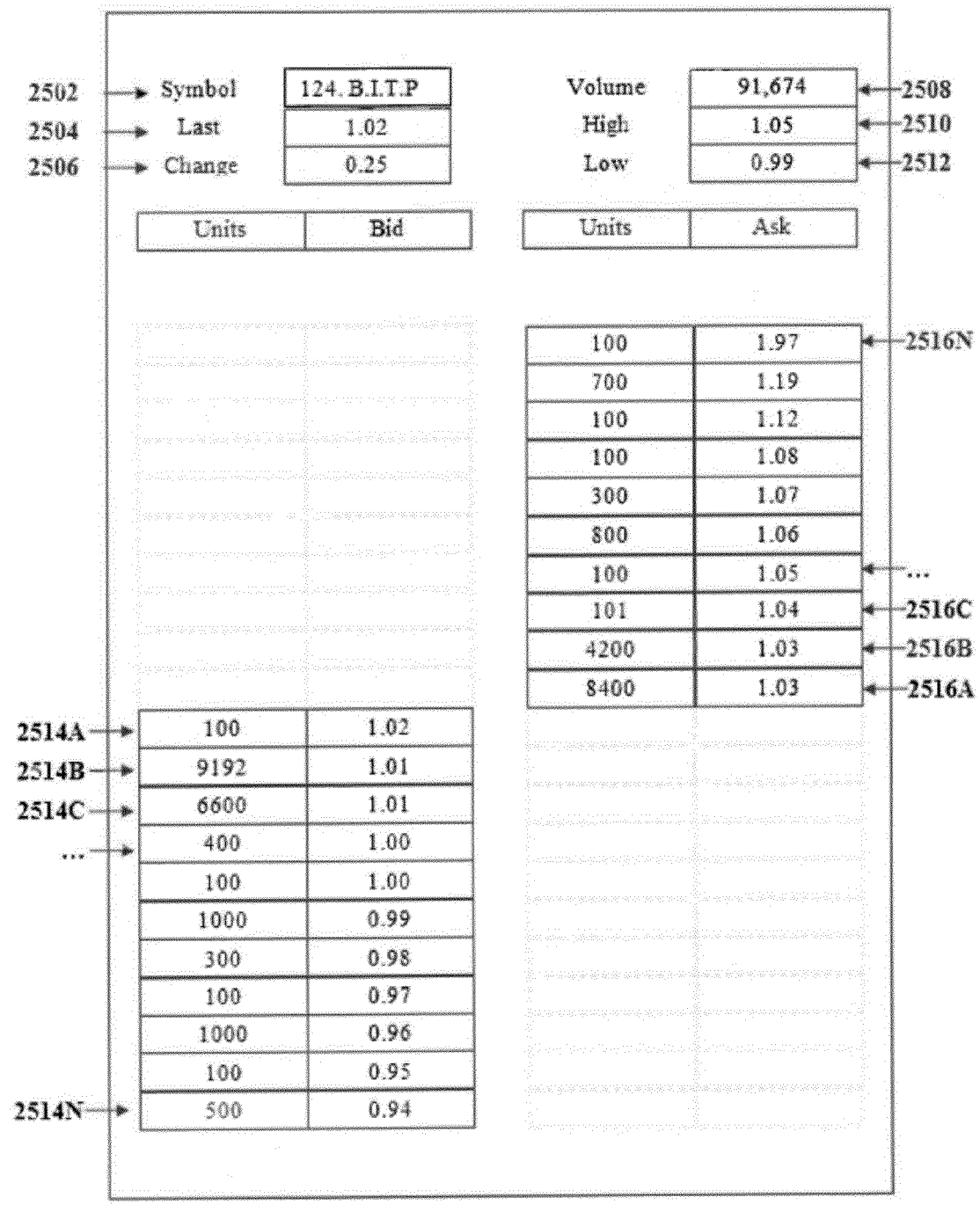
FIGS. 25A and 25B depict an illustration of an order book, in accordance with an embodiment of the present invention.

FIG. 25A depicts features of an exemplary user interface for an electronic order book using symbology, consistent with disclosed embodiments. The user interface is composed of numerous descriptive data about the display space access rights, the space a publisher makes available for the placement of content, available within the Audience Matching System 108. FIG. 25A illustrates an order book of data describing display space access rights defined by a constant Symbol 2502. The user interface in FIG. 25A provides data indicating the price of the last matched bid/ask in the Last 2504 field, the change in the price of the profiles indicated in the Change 2506 field, the number of display space access rights matched in the Volume 2508 field, the highest price paid during that day in the High 2510 field, the lowest price paid during that day in the Low 2512 field, a list of Unmatched Bids 2514 (A-N) for the display space access rights described by the Symbol 2502, a list of Unmatched Asks 2516 (A-N) for the display space access rights described by the Symbol 2502. It should apparent to one skilled in the art, that there may be other method to convey symbology, volume, inventory, and/or price, without departing from the spirit or scope of the disclosed embodiments.

Figure 25B:
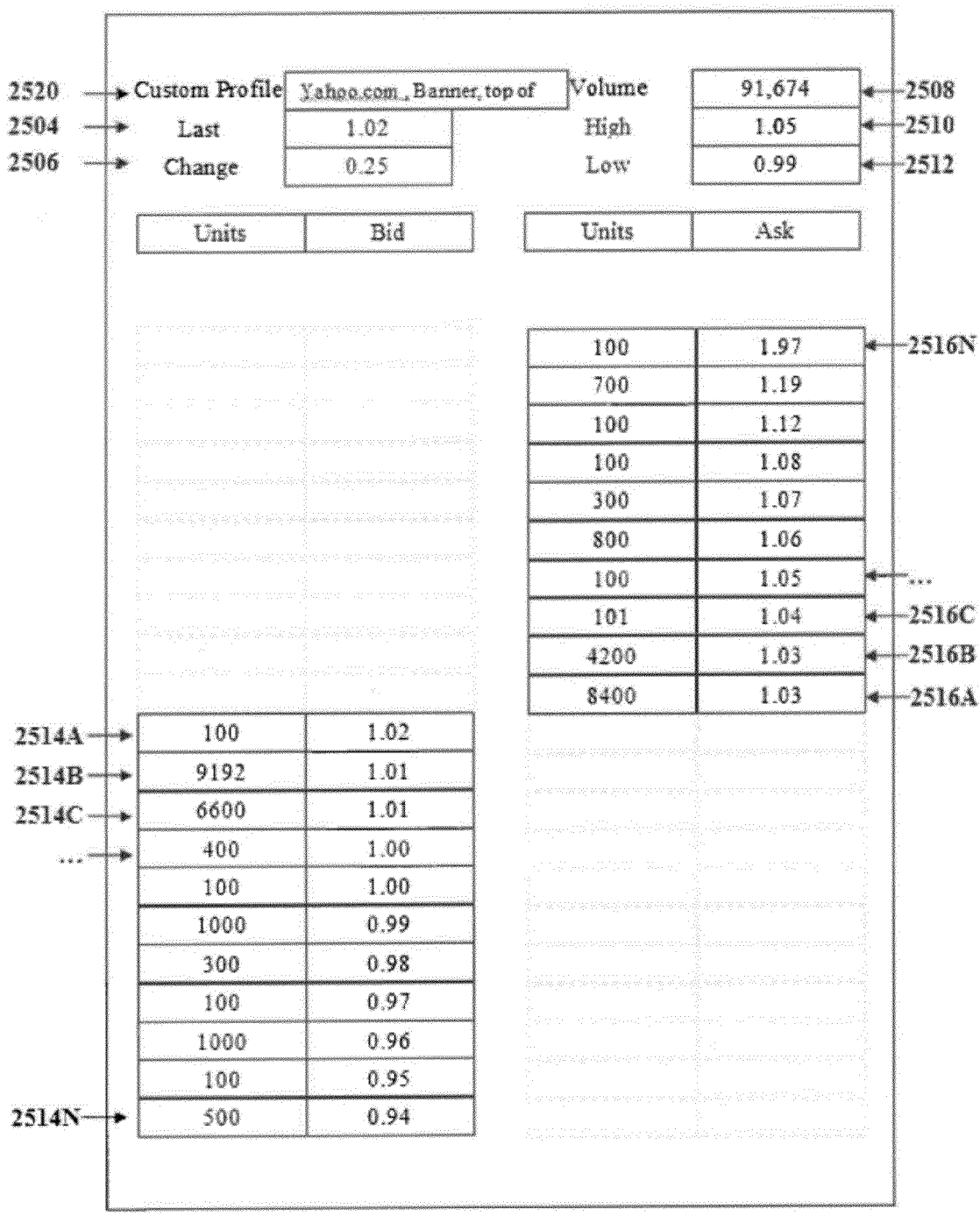

FIG. 25B depicts features of an exemplary user interface for an electronic order book using custom display space access rights identified in a previously saved search using the Display Space Screener 302, consistent with disclosed embodiments. The user interface is composed of one or more elements of descriptive data about the display space access rights, the space a publisher makes available for the placement of content, available within the Audience Matching System 108. FIG. 25B illustrates an order book of data describing display space access rights defined by a Custom Display Space Search 2520. The user interface in FIG. 25A provides data indicating the price of the last matched bid/ask in the Last 2504 field, the change in the price of the display space access rights indicated in the Change 2506 field, the number of display space access rights matched in the Volume 2508 field, the highest price paid during that day in the High 2510 field, the lowest price paid during that day in the Low 2512 field, a list of Unmatched Bids 2514 (A-N) for the display space access rights described by the Custom Display Space Search 2520, a list of Unmatched Asks 2516 (A-N) for the profiles described by the Custom Display Space Search 2520.

VIII. Management of Funds

Figure 22:
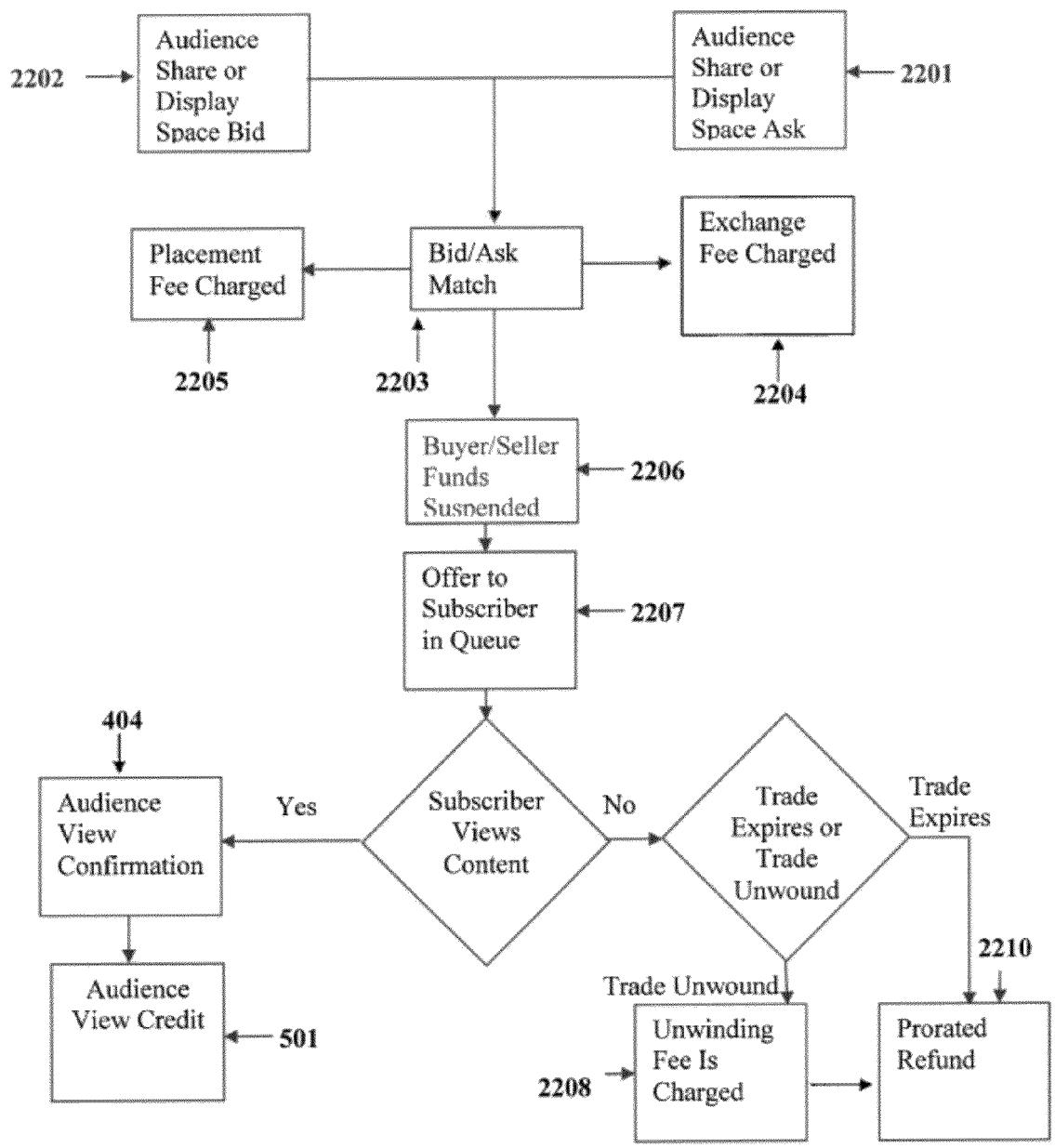
FIG. 22 is an overhead view of steps of a process flow detailing the movement of fund in transaction within a profile-based market, in accordance with an embodiment of the present invention.

FIG. 22 is a process flow detailing the movement of funds in transaction within a Profile-based Market 101, consistent with disclosed embodiments. The process starts with a bid for an audience share or display space, at 2202, that is matched with an offer for an audience share or display space at 2201. The match results in a transaction comprising matched profiles, matched display space, or both.

As illustrated in FIG. 3, the placement of Content 1814 for display comprises matches for both display space and audience share. When a match is identified, the seller and buyer are both charged an exchange fee, at 2203, to their account for use of the Profile-based Market 101. Following step 2203, a the bid and ask are matched at 2204, the match is processed, subject to the payment of a placement fee, at 2205, debited to the account of each transacting party and the rules and regulations of the Profile-based Market 101, and rights to access audience share and funds are exchanged, with buyer and seller funds suspended, at 2206, to and from their respective accounts. Upon completion of the transaction, an offer is made to the Subscriber with their Content Queue 1812, at 2207. The Audience Member/Subscriber 104 views the Content 1814, provides an Audience View Confirmation 404, and receives the Audience View Credit 501 in their account. Settlement of transaction occurs and suspended funds and shares are released to respective counter parties. Alternatively, the Audience Member/Subscriber 104 implements an action triggering the Skip 1807 button or does not elect to view the Content 1814 in its time allotted in the Content Queue 1812. In either case, the Audience Member/Subscriber 104 did not view the content and provide an Audience View Confirmation 404, and therefore does not receive Audience View Credit 501.

In the case of an Audience Member/Subscriber 104 implementing use of the Skip 1807 button, the Audience Matching System 108 seeks other Audience Members'/Subscribers' 104(A-N) profiles for fulfillment of the matched order. If no additional profiles for placement in the Content Queue 1812 are available, or if the match fulfillment time exceeds the time defined by the matching parameter, or if ads are skipped, refunds for all unconfirmed views of audience share matched profiles paid for by the Audience Consumer 103 are processed and the match is unwound subject to a Prorated Refund 2210 of the unused portion of the audience share and the rules and regulations of the matching system.

In an alternative process flow, illustrated in FIG. 22, one of the parties to the matched transaction has a partially fulfilled match for which it does not wish to have additional fulfillment or completed fulfillment. In such an embodiment, the matched transaction is unwound by either one of the parties and one or more Unwinding Fees Is Charged 2208 to the party initiating the unwind and credited to the profile match counterparty, the Profile-based Market 101, or both.

In an embodiment, an Audience Consumer 103, The Procter & Gamble Company (P&G), places an audience share bid for 250,000 profiles of individuals with children between the ages of 0 and 2 years with a household income of more than $40,000 annually. In such an embodiment, P&G places an audience share bid at $0.50 per profile and a display space bid $0.10 per Content 1814 display in one or two separate orders. In such an embodiment, the ABC Network, an Audience Producer 102, has an audience share ask price which matches the P&G bid price for the 250,000 specified profiles. With a pending match in place, the P&G and ABC accounts have an Exchange Fee Charged 2203 to each, a Bid/Ask Match 2204 is confirmed, both accounts have a Placement Fee Charged 2205, the funds and audience share units are removed from their respective account and are held by the Brokerage System 111 for fulfillment with Audience Member/Subscriber 104 Audience View Confirmations 404. In such an embodiment, the Audience Matching System 108 places the Audience Consumer's 103 Content 1814 in the Content Queue 1812 of profiles identified and 250,000 Audience View Confirmations 404 are received. Additionally, in such an embodiment, the audience match was confirmed and the match is settled when all audience share units are in the Audience Consumer 103 account, all funds are in the Audience Producer 102 account, and all views are confirmed.

In some instances, matched orders for multiple profiles and display space rights may generate multiple access rights contracts and multiple display space access rights contracts equal in number to the number of profile and display space access rights. Alternatively, matched orders for multiple profiles and display space access rights may generate a single contract. In a case where contracts each represent a single profile and display space unit, contracts can only settle through a confirmed view or the contract will expire without a confirmed view. In the case where a contract represents multiple profile and display space access rights, settlement may occur where each individual unit results in a confirmed view, each individual unit contract expires without a confirmed view, or some combination of units with confirmed views and expired units. Regardless of the difference between the single and multiple unit contracts, each settlement occurs subsequent to a settlement opportunity.

Settlement opportunities occur when a profile matching an executed order is presented to a publisher as viewing a publisher's property. When an individual matching an executed contract, sold by a publisher, arrives at the publisher's property, the Audience Member/Subscriber 104 is provided the opportunity to view the contract presented by the advertiser that purchased the contract.

In another embodiment, P&G has placed a time limit on the aforementioned audience share bid for 250,000 profiles that requires all Audience View Confirmations 404 to be received within 48 hours following the time of the match. In such an embodiment, at the conclusion of the time limit, 48 hours immediately following the time of the match, only 125,000 Audience View Confirmations 404 have been received. In such an embodiment, the funds associated with the remaining unconfirmed 125,000 views are credited to the Audience Consumer Account (P&G) with a corresponding debit to the Audience Producer 102 account and the associated audience share units are removed from the Audience Consumer Account (P&G) and returned to the Audience Producer 102 account.

In another embodiment, P&G has placed a time limit on the aforementioned audience share bid for 250,000 profiles that requires all Audience View Confirmations 404 to be received within 60 days immediately following the time of the match. 30 days after the matched audience share 125,000 Audience View Confirmations 404 have been processed P&G is no longer interested in fulfilling the remainder of the outstanding audience shares. In such an embodiment, the Unwinding Fee Is Charged 2208 to P&G, the party initiating the unwind, and funds are credited to the counterparty to the match.

IX. User Interfaces for Audience Members/Subscribers

FIG. 18 is an example of a user interface for an Audience Member/Subscriber 104 to use to manage his account and view content on a Personal Computer 212, consistent with disclosed embodiments. The user interface includes of a Content Display Area 1801 in which Display Content 209 is viewed and confirmed using the Confirmation Button 1813 or by providing a Rating 1806 or another responsive action to one skilled in the art. The Rating 1806 system may be any type of measurement such as, but not limited to, nominal, ordinal, interval and ratio type scales. Additionally, the user interface includes of a Content Queue 1812 that includes a series of small images each representing Content 1814(A-N) that is identified by the Audience Matching System 108 as meeting the requirements of a matched profile transaction. Each Content 1814 item image also includes a numerical representation of the Amount Offered 1811 to the Subscriber 104 for a confirmed view of the Content 1814 item. Items within the Content Queue 1812 may be arranged in any order based on time, subject matter, length, or any other custom order defined by the Audience Member/Subscriber 104.

The user interface further includes information for the Audience Member/Subscriber 104 about the viewership, balance of funds on account, the number of ads in the subscriber's Content Queue 1812, and the numbers of ad offers matching the his profile. Further, the user interface includes a number of buttons that when implemented may, for example, (i) allow the Audience Member/Subscriber 104 to update account information and settings using the Update My Account 1802 button, (ii) link to other accounts containing data that may enhance the profile of the Audience Member/Subscriber 104 such as Yodlee.com™, Facebook.com™, email accounts, and any other type of online account that can be used to enhance the Audience Member/Subscriber 104 profile using the Link Accounts 1803 button, (iii) manage the devices that are registered for use by the subscriber using the Manage Devices 1804 button, (iv) search the available Content 1814(A-N) using the Search 1805 button, (v) skip Content 1814 using the Skip 1807 button, (vi) make a purchase linked to the viewed content using the Buy 1816 button, (vii) request more information about the content using the More Info 1808 button, (viii) and share the content via email, or other communication method, with others using the Share 1809 button, and/or (ix) link to an outside website for additional content consumption (button not shown).

In an embodiment, an Audience Member/Subscriber 104 logs into his account and is presented with the subscriber user interface. Upon arrival, Content 1814 is automatically streamed and displayed in the Content Display Area 1801. In such an embodiment, content automatically streamed is delivered in any predefined order or some default order and the Audience Member/Subscriber 104 views Content 1814. When the Content 1814 item is nearly or completely viewed, a Confirmation Button 1813 appears. The Audience Member/Subscriber 104 responds to the confirmation prompt by either clicking the displayed Confirmation Button 1813, another acceptable response action, or provides a Rating 1806. The data from the Confirmation Button 1813 or the Rating 1806 is stored, analyzed, reported, and used to inform Audience Producer 103 of the number of matched profiles that have viewed the desired content. Further, the data is used to access the Audience Producer 103 funded account for payment of matching fees, transactions costs, and placement costs.

In another embodiment, the Audience Member/Subscriber 104 views an Advertisement 213, and decides to purchase the item. The subscriber clicks, touches, or otherwise activates the Buy 1816 button that connects him to an additional user interface for the purchase of the advertised item. In such an embodiment, the Audience Member/Subscriber 104 returns to the subscriber user interface, e.g., that described in FIG. 18, and views more Content 1814. After a number of Content 1814(A-N) items have been viewed and confirmed or rated, the Audience Member/Subscriber 104 is presented with a Content 1814 item he dislikes. Before the Content 1814 completes its viewing period the Subscriber 104 clicks, touches, or otherwise activates the Skip 1807 button to view the next item in the Content Queue 1812. In such an embodiment, the Subscriber 104 then views another Content 1814 item that he wishes to share with others. The Subscriber 104 clicks, touches, or otherwise activates the Share 1809 button and is provided a sub-interface to enter data that can be used to share the Content 1814. In such an embodiment, the Content 1814 viewed by the Audience Member/Subscriber 104 is be view during a commercial break, as part of a broadcast, or in a stand-alone format where the Content 1814 is not embedded during a break in a broadcast, but rather is transmitted as part of a series of Content 1814(A-N) items. However, the disclosed embodiments are not limited to such configurations, and in additional embodiments, links to web sites with or without digital coupons may be implemented, without departing from the spirit or scope of the disclosed embodiments.

FIG. 19 is an example of a user interface for Audience Member/Subscriber 104 to use to manage his account and view content on a Tablet Computer 213, a Mobile Phone 211, an IP (Internet Protocol) enabled Television 208, or other electronic device, consistent with disclosed embodiments. The user interface illustrated in the figure is an alternative structure to enable Audience Members/Subscribers 104(A-N) to manage their account and view Content 1814(A-N). The user interface in FIG. 19 provides all of the functionality described in FIG. 18 using alternative graphical elements, alternative navigational architecture, and alternative informational architecture. In an embodiment, a Task Bar 1901 includes navigation and informational elements that reside at the bottom of the user interface. In additional embodiments, Task Bar 1901 may be presented on any part and in any area of the user interface. By way of example, and without limitation, the Task Bar 1901 may be fixed or be hidden by the Audience Member/Subscriber 104 when desired. Further, the Task Bar 1901 may be placed on the bottom, top, left, right, or center of the user interface or any other location apparent to one of skill in the art.

In an additional embodiment, an Audience Member/Subscriber 104 uses his Mobile Phone 211 to log into his account. In such an embodiment, upon transmission of the log-in credentials, the Audience Member/Subscriber 104 is presented with the user interface illustrated in FIG. 19. In such an embodiment, the Audience Member/Subscriber 104 is interested in viewing content in the Content Queue 1812, but in a different order than the one currently defined. In such an embodiment, the Audience Member/Subscriber 104 formerly had the Content Queue 1812 ordered by date and is now seeking to view the content by the highest amount of money offered in exchange for a confirmed or rated view. In such an embodiment, Content Queue 1812 reordering is implemented subject to the Audience Member/Subscriber 104 clicking the Menu 1903 button to update account information and settings using the Update My Account 1802 button. Additionally, an Audience Member/Subscriber 104 can link to one or more other accounts containing data that may enhance the profile of the Audience Member/Subscriber 104 such as Yodlee.com™, Facebook.com™, email accounts, and any other type of online account that can be used to enhance the Audience Member/Subscriber 104 profile using the Link Accounts 1803 button; manage the devices that are registered for use by the subscriber using the Manage Devices 1804 button; search the available Content 1814(A-N) using the Search 1805 button; request more information about the content using the More Info 1808 button; and share the content via email, or other communication method, with others using the Share 1809 button. In such an embodiment, the Audience Member/Subscriber 104 may use the skip Content 1814 using the Skip 1807 button and make a purchase linked to the viewed content using the Buy 1816 button. In such an embodiment, the Content 1814 viewed by the Audience Member/Subscriber 104 is be view during a commercial break, as part of a broadcast, or in a stand-alone format where the Content 1814 is not embedded during a break in a broadcast, but rather is transmitted as part of a series of Content 1814(A-N) items.

FIG. 20 is an example of a user interface for a subscriber to use view content on a traditional (non-internet protocol enabled) Television 208 with a Set-Top-Box 207, or some other off-board hardware device, consistent with disclosed embodiments. FIG. 20 illustrated a user interface for a viewing platform that requires an external device for the transmission of data or other information from the Audience Member/Subscriber 104 to the Audience Administration System 106. Viewing platforms on devices that receive or transmit data, such as, but not limited to an IP enabled Television 208, a Personal Computer 211, a Mobile Phone 211, a Tablet Computer 213, or an eReader 213 will have user interfaces similar to those presented in FIGS. 18 and 19. The user interface illustrated in FIG. 20 has Display Content 209 shown on the Content Display Area 1801 and provides a Confirmation Code 2001 that the Audience Member/Subscriber 104 inputs for transmission to the Audience Administration System 106 for confirmation and payment, using one of a plurality of devices, including, but without limitation a Personal Computer 211, a Mobile Phone 211, a Tablet Computer 213, an eReader 213, a Remote Control 403, or a Telephone 402. In such an embodiment, the Content 1814 viewed by the Audience Member/Subscriber 104 is be view during a commercial break, as part of a broadcast, or in a stand-alone format where the Content 1814 is not embedded during a break in a broadcast, but rather is transmitted as part of a series of Content 1814(A-N) items.

In an embodiment, an Audience Member/Subscriber 104 views Content 1814 that is an advertisement for Dove™ bath soap. In such an embodiment, the Audience Member/Subscriber 104 is offered $0.30 to view the advertisement and confirm the view. In such an embodiment, the Audience Member/Subscriber 104 is viewing the advertisement on a traditional (non-internet protocol enabled) Television 208 and Confirmation Code 2001 appears in the Content Display Area 1801, with a unique code for transmission to the Audience Administration System 106. In such an embodiment, the Audience Member/Subscriber 104 uses a Mobile Phone 211 to submit the Confirmation Code 2001 using a text messaging protocol transmission to the Audience Administration System 106, or another means to confirm view, such as email or a web based interface requesting code input.

Additional Exemplary Confirmation Techniques

In an embodiment, an audience producer, without limitation, such as The New York Times, The Wall Street Journal, and Fortune Magazine, may use their own profile data to create audience share. In such an embodiment, the audience producer may simultaneously provide its profile data for ad placement matching within the profile-based market. Further, in such an embodiment, the audience producer may customize the printing of a publication such that any one or more of the advertisements within said publication are personalized for the subscriber and one or more codes may be embedded in advertisements for confirmation purposes. An image of an embedded code is shown, by way of non-limiting example, at element 2001 of FIG. 20, and may be included in a printed version of the advertisement.

In an embodiment, by way of example, and without limitation, during and/or after the advertisement is displayed or otherwise presented, code markings, such as "w" or "xa" or any combination of letters, numbers, and characters, may be displayed on a portion of the display screen (similarly to the printed publication advertisement described above). In such an embodiment, to confirm that the content was viewed, a subscriber may input such code using the screen which displayed the advertisement or the screen of another device such as a remote control, an iPad, or a Blackberry. "W" and "xa" are provided by way of example, and without limitation, any code combination may be used without departing from the spirit or scope of the disclosed embodiments. Such code may be implemented using a registered or non-registered device, such as but not limited to a smartphone.

Figure 24:
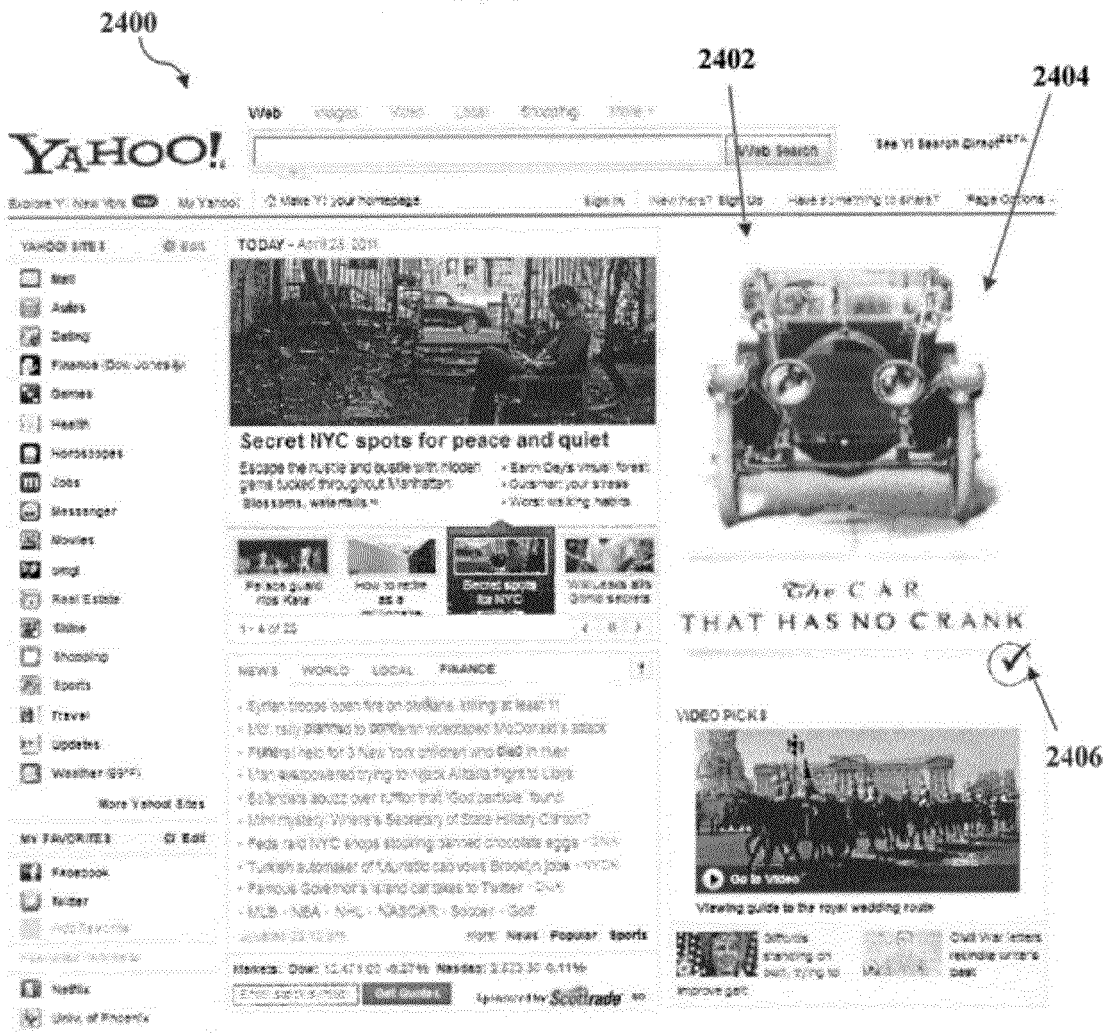
FIG. 24 depicts and illustration of a cost per confirmed view of an ad delivered onto a web site visited by an audience member, in accordance with an embodiment of the present invention.

FIG. 24 illustrates a "cost per confirmed view" advertisement delivered onto a web page 2400, in accordance with an embodiment of the present invention. A web site, including third party web sites such as Yahoo! depicted in FIG. 24, can display an advertisement 2404 in a display space 2402. The audience member can then click on a confirmation button 2406 to confirm that the advertisement has been viewed, in accordance with an embodiment of the present invention, although one of ordinary skill in the relevant arts will appreciate that other mechanisms may be used to confirm viewing of the advertisement.

X. Additional Embodiments

In an embodiment, standardized contracts may be utilized to enable trading of rights to placement and audience access, to pre-determined subscribers, for broadcast to televisions, personal computers, smartphones and other types of digital devices, at prices and in volumes that may be based partially on time and manner of consumption, particular information about each subscriber, and actual audience count.

In an embodiment, the system receives and publishes, and parties may obtain quotations in the form of, bids and offers in sizes that reflect terms on which they can transact, including price and other parameters, such as audience size and audience profile. In such an embodiment, price of display may or may not be a specific trade parameter.

In an embodiment, a party, that is unaffiliated with the parties to the transaction, may process bids and offers in an organized manner, accommodating matching parameters and requirements.

In an embodiment, a matching symbol may be utilized, representing the profile of a specified audience, allowing a buyer to bid for and a seller to offer rights to audience access and rights to content placement, in some instances without knowledge of viewing device and/or its location.

In an embodiment, a matching symbol may be utilized, representing the display specification, allowing a buyer to bid for and a seller to offer rights to placement, in some instances without knowledge of viewing device and/or its location.

In an embodiment, standardized trading in formats appropriate for exchange execution may provide a suitable interface for advanced algorithmic trading mechanisms. Access for algorithmic trading engines to an increased variety of audience profile types may increase the liquidity in a market.

In an embodiment, an audience producer may sell a specified audience share within a specified time frame, or on demand, to audience consumers (advertisers) at specified terms of pricing, such as a limit price, a market price, or based on other price parameters. In such an embodiment, one of a plurality of devices may be used to display such advertisement including, without limitation, a television, a smartphone, an iPad™, a tablet computer, a cellular phone, a music player, a game device, video player, navigation devices within vehicles, and a personal computer.

In an embodiment, an audience producer, such as social media provider Facebook™, may use its own profile data to create audience share. In such an embodiment, Facebook™ may act as the audience producer while simultaneously providing its profile data for viewership matching on the profile-based market.

In an embodiment, a user establishes an account as a subscriber with or without charge, logs into his account, may view one or more advertisements or content and may confirm such viewings by using one of an array of devices, such as an iPad, a smartphone, a remote control, or other external device accessible to the subscriber. In such an embodiment, an audience member may provide view confirmation through a human interface device, such that data may be aggregated for real-time or subsequent reporting, to audience consumers and other market participants, in order to process debits and credits for accounts associated with the confirmed view.

In the embodiment or embodiments described herein, without departing from the spirit or scope, advertising and content may be in the form of audio, video, text, imagery, or other media that is not an obvious form of advertisement, such as news.

In an embodiment, a subscriber may view and or listen to content, of any length, displayed on a cell phone, a television, or any other type of digital device with a display screen, at a time specified by the subscriber or any other party. In such an embodiment, by way of example, and without limitation, content may comprise any combination of video, text, imagery, and audio. In such an embodiment, prior to the time the subscriber views such content, the subscriber may be prompted to accept a price contingent upon his viewing the content in its entirety. In such an embodiment, should the subscriber indicate his acceptance of price, content may be transmitted for view. The subscriber may subsequently confirm that the content was viewed, or rates the content. Various types of devices can be used to confirm or rate. By way of example, and without limitation, two examples follow: first, in the case of a television advertisement, the keyboard of a remote control, or the touch screen of an iPad, may be used by the subscriber to confirm or rate. Second, in the case that the advertisement was viewed on a smartphone, buttons or the touch screen of the viewing device may be used, by the subscriber, to confirm or rate.

In an embodiment, there may be no need for the subscriber to confirm or rate in order to receive economic benefit such as when a TV is turned on and content is delivered. In such an embodiment, queued inventory may be automatically delivered for view. In such an embodiment, audience consumers may access viewership using a pricing structure that does not require audience confirmation or compensation.

In such an embodiment, audience consumers and audience producers may offer and bid for audience and display rights separately whereby the owner of display space assets may not have rights to access pending profiles and the owner of rights to access audience may not have rights to display space.

In an embodiment, by way of example, and without limitation, during and/or after the content is displayed, a subscriber may select from one or more buttons on a cell phone, or screen, or another device, such as a remote control, for the purpose of rating that the advertisement was liked, disliked, or that there was no opinion, or uses another rating paradigm available to him, such as a scalar rating system from 1 to 10, where 10 represents the highest or lowest rating, or A, B, or C, where A represents the highest or lowest rating, although in both examples it is intuitive to think that both 10 and A would represent the highest rating. By selecting the applicable button, or other action, to trigger transmission, the viewer may confirm that the content was viewed and rated.

In an embodiment, in exchange for a subscriber viewing an advertisement, subject to receipt of confirmation and transmission of a rating, payment may be processed for the benefit of the audience member crediting funds to a checking account, savings account, a credit card, or a check payable to the subscriber, or other type of economic benefit, such as reward points. In such an embodiment, account statements may be provided, from time-to-time, to the subscriber. Furthermore, by way of example, and without limitation, the amount paid to the subscriber in exchange for viewing the content, may be determined by the subscriber first acknowledging acceptance of a displayed price, offered by an Audience Consumer, net of placement and other costs, by using any of an array of communication functions.

In an embodiment, different advertisements may be transmitted to subscribers having similar or differing profiles, at the same or different times, to the same geographic market. By way of example, and without limitation, two examples follow: males 21 to 30 years of age receive one advertisement in zip code 10075 while females 31 to 40 years of age receive a different advertisement within the zip code 10075. In another embodiment, the same advertisements are transmitted to subscribers having similar profiles, at the same or different times, to the same geographic market.

In an embodiment, a unit of exchange known as an audience share, representing a share of the available audience market, may be made available through the matching system, governed by a set of rules, and traded electronically. In such an embodiment, contracts to access both the display space and audience share are exchanged. In such an embodiment, sellers in a secondary market may forward sell their asset. Furthermore, in such an embodiment, execution of a time-based contract may provide benefits of tighter cost controls for the Audience Consumer of an advertisement, and corresponding revenue stability for the Audience Producer.

In an embodiment, audience producers, audience consumers, or through their agents, may, for the purpose of realizing liquidity, securing third party valuation, accessing an alternative market, and inventory and value risk management, transact with other parties.

In an embodiment, account information and/or content for an audience member may be stored in the cloud on the Internet, on a remote computer system, or locally on an electronic device.

In an embodiment, audience members and subscribers may have virtually seamless access, at any time, to view content on personal computers, mobile devices, set-top boxes, and networked appliances. In such an embodiment, content may be stored locally on an electronic device of the subscriber and viewed at any time, may be retrieved from the Internet, or may be stored on a remote computer system to which an audience member has access.

In an embodiment, personalized advertising may be transmitted to a television for display, or to a set-top-box for display on a traditional television. In such an embodiment, a subscriber may be automatically logged into his account by the device. During the commercial break of a broadcast television show, the broadcast channel may be automatically switched to a location where personalized advertisement is displayed for the subscriber. At the conclusion of said advertisement, the channel may be automatically switched back to the broadcast channel. In such an embodiment, a digital box may be attached to a television using an Ethernet jack, a wireless connection, or through any other appropriate connection apparent to one of skill in the art. In such an embodiment, by way of example, and without limitation, the set top box and/or the television may also be connected to the Internet using Wi-Fi, Bluetooth™, or through any additional or alternate connection apparent to one or skill in the art and appropriate to the television and/or set to box. Additionally, by way of example, and without limitation, the television may be configured internally with hardware and/or software whereby internet access is achieved, without use of a set top box or other external means. In additional embodiments, by way of example, and without limitation, when a subscriber is logged into his account, a personalized alternative advertisement may be transmitted to the viewed television, thus altering the signal flow and substituting the personalized advertisement for the original broadcasted advertisement.

In yet another embodiment, personalized advertisement may be transmitted to a dedicated advertisement only channel. In such an embodiment, by way of example, and without limitation, a subscriber may not watch broadcast television in order to watch the advertisements personalized for them. Instead, advertisements may be viewed on a dedicated advertisement-only channel, accommodating view of content during similar time periods.

In an embodiment, a subscriber may log into his account, view one or more advertisements, e.g., on a device, and confirm such one or more viewings by using said device. In such an embodiment, by way of example, and without limitation, advertisements may be delivered, in a single streamer or any combination of streamers, during a scheduled television broadcast or otherwise, and additionally or alternatively, a graphical user interface can provide audible alerts of incoming communications and media. For example, a subscriber may be presented with an awaiting queue of advertisements. In such an example, the awaiting queue comprises a list of priced advertisements, personalized for the subscriber, that may be clicked on by the subscriber, or where another triggering action is taken by the subscriber, to view the actual advertisement. In such an example, without limitation, the subscriber may take a counter party position by accepting or not accepting the price displayed for confirmed or rated viewership. Alternatively, the subscriber may be presented with text based advertisements within the streamer, which may or may not have embedded links. By way of example, and without limitation, compensation may be displayed for consideration by the subscriber before he chooses to view any content.

In an embodiment, advertisements may be delivered through e-mail. Other information may be included in this or related e-mail correspondence, including, but not limited to, profile-based couponing.

In an embodiment, time-management may be supported via a universal future function. In such an embodiment, the display of the advertisement may be delayed to a future time for viewing. Within such functionality, the content may be stored locally on an electronic device of the subscriber, may be stored on a remote computer system to which a subscriber has access, or remotely on the Internet in the cloud and accessed by the subscriber, from time-to-time.

XI. Exemplary Computer System Implementation

Figure 26:
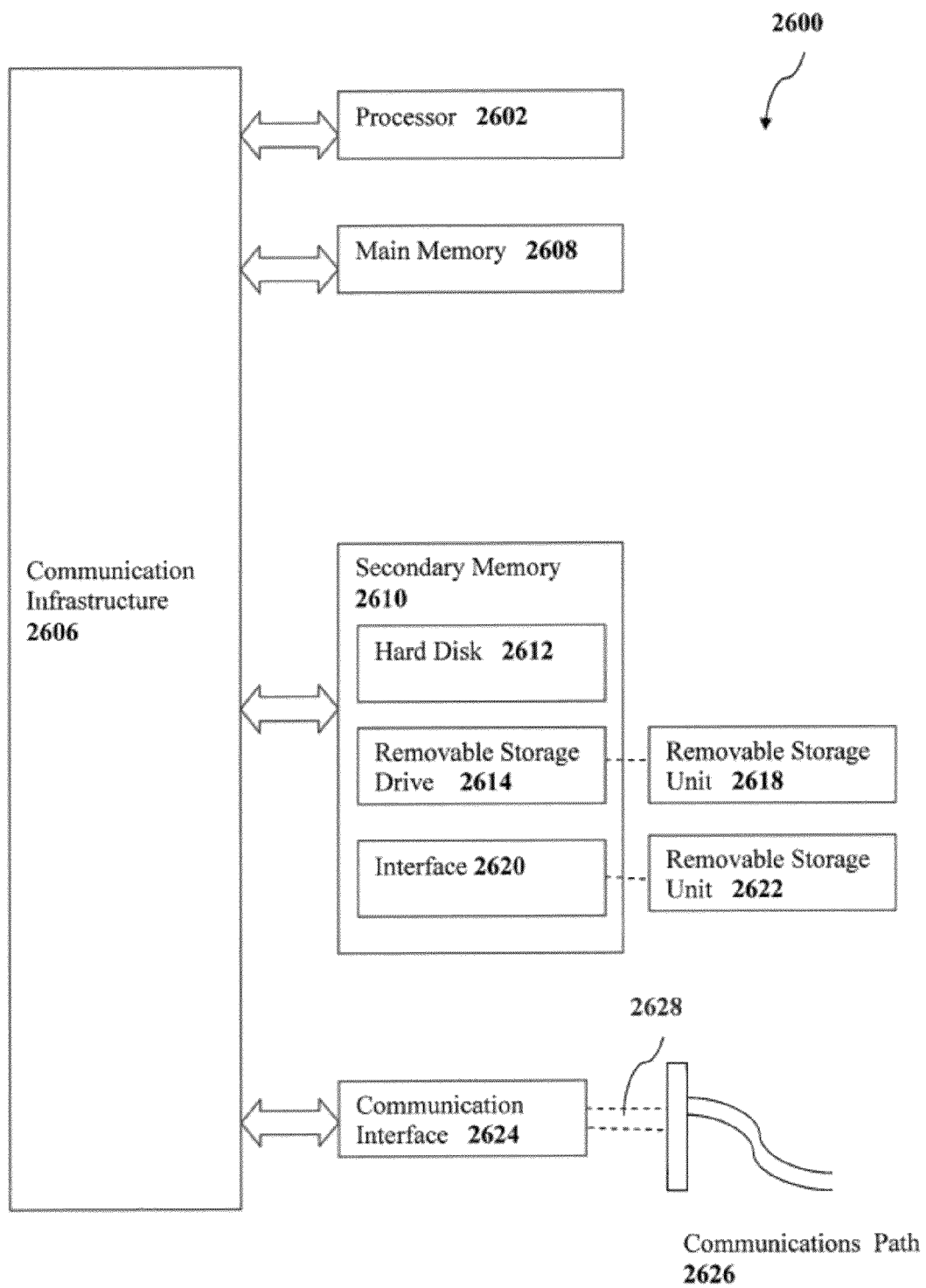
FIG. 26 illustrates an exemplary computer architecture upon which embodiments of the present invention can be implemented.

FIG. 26 is an exemplary computer architecture 2600 upon which the graphical user interfaces, methods, and computer program products may be implemented, according to disclosed embodiments. Exemplary computer system 2600 includes one or more processors, such as processor 2602. The processor 2602 is connected to a communication infrastructure 2606, such as a bus or network. Various example software implementations are described in terms of this exemplary computer system. After reading this description, it will become apparent to a person skilled in the relevant art how to implement the embodiments using other computer systems and/or computer architectures.

Computer system 2600 also includes a main memory 2608, preferably random access memory (RAM), and may include a secondary memory 2610. The secondary memory 2610 may include, for example, a hard disk drive 2612 and/or a removable storage drive 2614, representing a magnetic tape drive, an optical disk drive, CD/DVD drive, etc. The removable storage drive 2614 reads from and/or writes to a removable storage unit 2618 in a well-known manner Removable storage unit 2618 represents a magnetic tape, optical disk, or other storage medium that is read by and written to by removable storage drive 2614. As will be appreciated, the removable storage unit 2618 can include a computer usable storage medium having stored therein computer software and/or data.

In alternative implementations, secondary memory 2610 may include other means for allowing computer programs or other instructions to be loaded into computer system 2600. Such means may include, for example, a removable storage unit 2622 and an interface 2620. An example of such means may include a removable memory chip (such as an EPROM, or PROM) and associated socket, or other removable storage units 2622 and interfaces 2620, which allow software and data to be transferred from the removable storage unit 2622 to computer system 2600.

Computer system 2600 may also include one or more communications interfaces, such as communications interface 2624. Communications interface 2624 allows software and data to be transferred between computer system 2600 and external devices. Examples of communications interface 2624 may include a modem, a network interface (such as an Ethernet card), a communications port, a PCMCIA slot and card, etc. Software and data transferred via communications interface 2624 are in the form of signals 2628, which may be electronic, electromagnetic, optical or other signals capable of being received by communications interface 2624. These signals 2628 are provided to communications interface 2624 via a communications path (i.e., channel) 2626. This channel 2626 carries signals 2628 and may be implemented using wire or cable, fiber optics, an RF link and other communications channels. In an embodiment, signals 2628 comprise data packets sent to processor 2602. Information representing processed packets can also be sent in the form of signals 2628 from processor 2602 through communications path 2626.

The terms "computer program medium" and "computer usable medium" are used to refer generally to media such as removable storage units 2618 and 2622, a hard disk installed in hard disk drive 2612, and signals 2628, which provide software to the computer system 2600.

Computer programs are stored in main memory 2608 and/or secondary memory 2610. Computer programs may also be received via communications interface 2624. Such computer programs, when executed, enable the computer system 2600 to implement embodiments as discussed herein. In particular, the computer programs, when executed, enable the processor 2602 to implement the present invention. Where embodiments are implemented using software, the software may be stored in a computer program product and loaded into computer system 2600 using removable storage drive 2614, hard drive 2612 or communications interface 2624.

In an embodiment, computer-program code for an operating system can be stored on one or more of removable storage drive 2614 or hard drive 2612, or alternatively, can be loaded into computer system 2600 over communications interface 2624. The operating system can, in various embodiments, manage the activities of and the sharing of resources of computer system 2600, serve as a host for application programs executed by processor 2602, and manage the operation of any hardware associated with computer system 2600.

Exemplary operating systems include, but are not limited to, Windows XP and Windows Vista, Mac OS X Leopard, variants of Linux, variants of Unix, Xbox Game Console OS, and Sony PS3 OS. Further, additional exemplary operating systems include those commonly used on personal digital assistants (PDAs), smartphones and tablet PCs. Such operating systems include, but are not limited to, Blackberry OS, Palm OS, Windows CE, Symbian, Android, Apple iPod OS, Apple iPad OS and various operating systems based on the Linux operating system, such as LiMo, LinuxCE and OpenPDA.

In an embodiment, the user interfaces and graphical user interfaces, as described above, may be applications executed on the operating system of a user's desktop computer, laptop computer, PDA, smartphone, or other device. In such an embodiment, said interfaces of the disclosed embodiments serve as interfaces between the operating system and a user, and said interfaces leverage existing file system structure of the operating system to generate the above-described embodiments. Further in such an embodiment, said interfaces can be obtained and installed by the user on the device after the operating system is installed and operational, or alternatively, the operating system and said interfaces may be bundled and installed as a single unit.

However, the disclosed embodiments are not limited to user interfaces and graphical interfaces executed by an operating system. In additional embodiments, the said interfaces of disclosed herein can serve as an operating system for the user's desktop computer, laptop computer, PDA, smartphone, or other device apparent to one skilled in the art. In such an embodiment, no additional operating system would need be installed on the device, and the user interfaces would be stored and executed natively on any hardware associated with the user's device (e.g., stored on removable storage drive 2614 or hard drive 2612 and executed by processor 2602). Moreover, said interfaces disclosed in the embodiments can be provided in any combination of software, hardware, firmware, embedded systems, or other means by which a device may read and process said interfaces.

Moreover, the systems, methods, and computer-implemented methods of the disclosed embodiments can be provided in any combination of software, hardware, firmware, embedded systems, or other means apparent to one of skill in the art.

While the invention has been described in terms of particular embodiments and illustrative figures, those of ordinary skill in the art will recognize that the invention is not limited to the embodiments or figures described. For example, devices utilized by the Audience Members/Subscribers 104 (A-N) in embodiments described above are a personal computer, an iPhone, a BlackBerry, an iPad, and an e-Reader. In other embodiments, the device may be any type of computing devices, such as a mobile telephone, a personal digital assistant (PDA), or the like. In some instances, viewing may be on a television set whereby confirmation and other triggering actions may be implemented using a device, or alternatively, a remote control of the television.

XII. Conclusion

It is to be appreciated that the entire specification, including the claims, is intended to be used to interpret the invention, and not any individual portion alone. For example, the Abstract section may set forth one or more but not all exemplary embodiments of the present invention as contemplated by the inventors, and thus is not intended to limit the claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments fully reveal the general nature of the invention so that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
providing, by one or more computing devices, an electronic marketplace to trade profile access right contracts and display space access right contracts;
receiving, by the one or more computing devices, a first order from a buyer to buy a profile access right contract;
receiving, by the one or more computing devices, a second order from the buyer to buy a display space access right contract, wherein said profile access right contract and said display space access right contract are managed as separate assets using separate instruments, and wherein the profile access right contract and the display space access right contract are priced independently; and
fulfilling the first and second orders, comprising:
matching the first order to buy the profile access right contract with a corresponding profile access right contract sell order by a seller,
matching the second order to buy the display space access right contract with a corresponding display space access right contract sell order by the seller, and
executing a purchase of the profile access right contract and the display space access right contract based on the matching of the first and second orders, the executing comprising conveying, to the buyer, a right to deliver content on a profile access right specified by the profile access right contract and a display space access right specified by the display space access right contract.

2. The method of claim 1, wherein the first order comprises a trading symbol representing the profile access right contract and wherein the second order comprises a trading symbol representing the display space access right contract.

3. The method of claim 1, further comprising:
receiving confirmation of a triggering action performed by an audience member viewing content in a display space corresponding to the display space access right contract.

4. The method of claim 1, further comprising settling at least one of the first and second orders, wherein settling the at least one of the first and second orders comprises transferring funds to a seller of at least one of the profile access right contract or the display space access right contract contingent on a triggering action or completed view.

5. The method of claim 4, wherein an unsettled portion of the profile access right contract or the display space access right contract is permitted to be resold.

6. The method of claim 1, wherein matching the first and second orders comprises:
matching a bid to buy the profile access right contract with an offer to sell the profile access right contract; and
matching a bid to buy the display space access right contract with an offer to sell the display space access right contract.

7. The method of claim 1, further comprising:
receiving a request for information about the profile access right contract or the display space access right contract; and
providing an order book listing bid/ask information for the profile access right contract or the display space access right contract.

8. A computer-readable storage device having instructions stored thereon that, when executed by one or more computing devices, causes the one or more computing devices to perform operations comprising:
providing an electronic marketplace to trade profile access right contracts and display space access right contracts;
receiving a first order from a buyer to buy a profile access right contract;
receiving a second order from the buyer to buy a display space access right contract, wherein said profile access right contract and said display space access right contract are managed as separate assets using separate instruments, and wherein the profile access right contract and the display space access right contract are priced independently; and
fulfilling the first and second orders, comprising:
matching the first order to buy the profile access right contract with a corresponding profile access right contract sell order by a seller,
matching the second order to buy the display space access right contract with a corresponding display space access right contract sell order by the seller, and
executing a purchase of the profile access right contract and the display space access right contract based on the matching of the first and second orders, the executing comprising conveying, to the buyer, a right to deliver content on a profile access right specified by the profile access right contract and a display space access right specified by the display space access right contract.

9. The computer-readable storage device of claim 8, wherein the first order comprises a trading symbol representing the profile access right contract and wherein the second order comprises a trading symbol representing the display space access right contract.

10. The computer-readable storage device of claim 8, the operations further comprising:
receiving confirmation of a triggering action performed by an audience member viewing content in a display space corresponding to the display space access right contract.

11. The computer-readable storage device of claim 8, operations further comprising settling at least one of the first and second orders, wherein settling the at least one of the first and second orders comprises transferring funds to a seller of at least one of the profile access right contract or the display space access right contract contingent on a triggering action or completed view.

12. The computer-readable storage device of claim 11, the operations further comprising permitting an unsettled portion of the profile access right contract or the display space access right contract to be resold.

13. The computer-readable storage device of claim 8, wherein matching the first and second orders comprises:
matching a bid to buy the profile access right contract with an offer to sell the profile access right contract; and
matching a bid to buy the display space access right contract with an offer to sell the display space access right contract.

14. The computer-readable storage device of claim 8, the operations further comprising:
receiving a request for information about the profile access right contract or the display space access right contract; and
providing an order book listing bid/ask information for the profile access right contract or the display space access right contract.

15. A system comprising:
a memory configured to store modules comprising:
a providing module configured to provide an electronic marketplace to trade profile access right contracts and display space access right contracts,
a receiving module configured to receive a first order from a buyer to buy a profile access right contract and to receive a second order from the buyer to buy a display space access right contract, wherein said profile access right contract and said display space access right contract are managed as separate assets using separate instruments, and wherein the profile access right contract and the display space access right contract are priced independently, and
a fulfilling module configured to fulfill the first and second orders, comprising matching the first order to buy the profile access right contract with a corresponding profile access right contract sell order by a seller, matching the second order to buy the display space access right contract with a corresponding display space access right contract sell order by the seller, and executing a purchase of the profile access right contract and the display space access right contract based on the matching of the first and second orders, the executing comprising conveying, to the buyer, a right to deliver content on a profile access right specified by the profile access right contract and a display space access right specified by the display space access right contract; and
one or more processors configured to process the modules.

16. The system of claim 15, wherein the first order comprises a trading symbol representing the profile access right contract and wherein the second order comprises a trading symbol representing the display space access right contract.

17. The system of claim 15, further comprising:
a second receiving module configured to receive confirmation of a triggering action performed by an audience member viewing content in a display space corresponding to the display space access right contract.

18. The system of claim 15, further comprising a settlement module configured to settle at least one of the first and second orders, wherein settling the at least one of the first and second orders comprises transferring funds to a seller of at least one of the profile access right contract or the display space access right contract contingent on a triggering action or completed view.

19. The system of claim 18, further comprising a resale module configured to permit an unsettled portion of the profile access right contract or the display space access right contract to be resold.

20. The system of claim 15, wherein matching the first and second orders comprises matching a bid to buy the profile access right contract with an offer to sell the profile access right contract, and matching a bid to buy the display space access right contract with an offer to sell the display space access right contract.

21. The system of claim 15, further comprising:
a second receiving module configured to receive a request for information about the profile access right contract or the display space access right contract,
wherein the providing module is further configured to provide an order book listing bid/ask information for the profile access right contract or the display space access right contract.

22. A method comprising:
providing, by one or more computing devices, an electronic marketplace to trade profile access right contracts and display space access right contracts;
receiving, by the one or more computing devices, a first order from a seller to sell a profile access right contract;
receiving, by the one or more computing devices, a second order from the seller to sell a display space access right contract, wherein said profile access right contract and said display space access right contract are managed as separate assets using separate instruments, and wherein the profile access right contract and the display space access right contract are priced independently; and
fulfilling the first and second orders, comprising:
matching the first order to sell the profile access right contract with a corresponding profile access right contract buy order by a buyer,
matching the second order to sell the display space access right contract with a corresponding display space access right contract buy order by the buyer, and
executing a sale of the profile access right contract and the display space access right contract based on the matching of the first and second orders, the executing comprising conveying, to the buyer, a right to deliver content on a profile access right specified by the profile access right contract and a display space access right specified by the display space access right contract.

* * * * *